(12) United States Patent
Dinan et al.

(10) Patent No.: US 11,696,282 B2
(45) Date of Patent: *Jul. 4, 2023

(54) SEMI-PERSISTENT SCHEDULING IN A WIRELESS DEVICE AND NETWORK

(71) Applicant: Ofinno, LLC, Reston, VA (US)

(72) Inventors: Esmael Hejazi Dinan, McLean, VA (US); Alireza Babaei, Fairfax, VA (US)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 187 days.

This patent is subject to a terminal disclaimer.

(21) Appl. No.: 17/092,433

(22) Filed: Nov. 9, 2020

(65) Prior Publication Data

US 2022/0141853 A1 May 5, 2022

Related U.S. Application Data

(63) Continuation of application No. 15/676,545, filed on Aug. 14, 2017, now Pat. No. 10,834,743.

(Continued)

(51) Int. Cl.
*H04W 72/1268* (2023.01)
*H04L 1/1822* (2023.01)
(Continued)

(52) U.S. Cl.
CPC ....... *H04W 72/1268* (2013.01); *H04L 1/1822* (2013.01); *H04L 1/1896* (2013.01); *H04W 72/21* (2023.01); *H04W 72/23* (2023.01)

(58) Field of Classification Search
CPC . H04W 72/1268; H04W 72/21; H04W 72/23; H04L 1/1822; H04L 1/1896
See application file for complete search history.

(56) References Cited

U.S. PATENT DOCUMENTS 10,356,758 B2 7/2019 Pan et al.
2010/0077100 A1 3/2010 Hsu et al.
(Continued)

FOREIGN PATENT DOCUMENTS

CN 102204203 A 9/2011
CN 102342059 A 2/2012
(Continued)

OTHER PUBLICATIONS

Office Action of the Indian Application No. 201917005876, dated Nov. 23, 2021, (7p).
(Continued)

*Primary Examiner* — Asghar H Bilgrami
(74) *Attorney, Agent, or Firm* — Arch & Lake LLP

(57) ABSTRACT

A wireless device receives at least one message. The at least one message comprises an uplink semi persistent scheduling (SPS) radio network temporary identifier (RNTI), and a sequence of at least one uplink SPS information element (IE). An uplink SPS IE of the sequence comprises: at least one uplink SPS configuration parameter comprising an uplink SPS interval, and an SPS configuration index for the at least one uplink SPS configuration parameter. A downlink control information (DCI) corresponding to the uplink SPS RNTI may be received. The DCI comprises a first SPS configuration index of one of the at least one uplink SPS IE. At least one transport block may be transmitted employing at least one first uplink SPS configuration parameter corresponding to the first SPS configuration index.

13 Claims, 37 Drawing Sheets

Related U.S. Application Data

(60) Provisional application No. 62/399,442, filed on Sep. 25, 2016, provisional application No. 62/399,443, filed on Sep. 25, 2016, provisional application No. 62/374,580, filed on Aug. 12, 2016.

(51) Int. Cl.
  H04L 1/1867  (2023.01)
  H04W 72/21  (2023.01)
  H04W 72/23  (2023.01)

(56) References Cited

U.S. PATENT DOCUMENTS

| | | | |
|---|---|---|---|
| 2010/0115355 | A1 | 5/2010 | Hsu et al. |
| 2010/0195614 | A1 | 8/2010 | Nimbalker et al. |
| 2011/0103327 | A1 | 5/2011 | Lee et al. |
| 2011/0317643 | A1 | 12/2011 | Gaal et al. |
| 2012/0014328 | A1 | 1/2012 | Goransson et al. |
| 2012/0069805 | A1 | 3/2012 | Feuersanger et al. |
| 2012/0176996 | A1 | 7/2012 | Kim et al. |
| 2012/0320782 | A1 | 12/2012 | Seo et al. |
| 2014/0022904 | A1 | 1/2014 | Ahmad et al. |
| 2014/0071868 | A1 | 3/2014 | Berquist et al. |
| 2014/0241323 | A1* | 8/2014 | Park .................. H04W 36/0069 370/332 |
| 2015/0098371 | A1* | 4/2015 | Vajapeyam ............. H04L 1/189 370/280 |
| 2015/0131578 | A1 | 5/2015 | Baek et al. |
| 2015/0271798 | A1 | 9/2015 | Chen et al. |
| 2015/0359028 | A1* | 12/2015 | Iyer ...................... H04W 76/15 370/329 |
| 2016/0057771 | A1* | 2/2016 | Quan .................... H04L 1/1887 370/329 |
| 2016/0127955 | A1 | 5/2016 | Damnjanovic et al. |
| 2016/0183241 | A1 | 6/2016 | Lee et al. |
| 2016/0249298 | A1* | 8/2016 | Larsson ............ H04W 72/0446 |
| 2016/0278048 | A1 | 9/2016 | Nory et al. |
| 2016/0278049 | A1 | 9/2016 | Nory et al. |
| 2016/0278050 | A1 | 9/2016 | Nory et al. |
| 2016/0366682 | A1 | 12/2016 | Tseng et al. |
| 2017/0019887 | A1 | 1/2017 | Jiang et al. |
| 2017/0071010 | A1 | 3/2017 | Lim et al. |
| 2017/0215059 | A1 | 7/2017 | Agiwal et al. |
| 2017/0289733 | A1 | 10/2017 | Rajagopal et al. |
| 2017/0331670 | A1* | 11/2017 | Parkvall .............. H04W 52/028 |
| 2018/0176945 | A1 | 6/2018 | Cao et al. |
| 2019/0037539 | A1 | 1/2019 | Jung et al. |
| 2019/0182639 | A1 | 6/2019 | Basu Mallick et al. |
| 2020/0329489 | A1 | 10/2020 | Li et al. |
| 2021/0376985 | A1* | 12/2021 | Zhou ..................... H04L 5/0053 |

FOREIGN PATENT DOCUMENTS

| | | |
|---|---|---|
| CN | 105594150 A | 5/2016 |
| EP | 2802091 A1 | 11/2014 |
| JP | 2011511528 A | 4/2011 |
| JP | 2011524701 A | 9/2011 |
| WO | 2017172479 A1 | 10/2017 |

OTHER PUBLICATIONS

First Office Action of the Korean Application No. 10-2019-7007067, dated Nov. 25, 2021, (8p).
3GPP TS 36.321 V13.1.0 (Mar. 2016), 3rd Generation Partnership Project; Technical Specification Group Radio Access Network; Evolved Universal Terrestrial Radio Access (E-UTRA); Medium Access Control (MAC) protocol specification (Release 13), (85p).
Ericsson, "SPS Support for eMTC UEs in Rel-13", 3GPP TSG-RAN WG2 #93bis, R2-162838, Dubrovnik, Croatia, Apr. 11-15, 2016, (5p).
Notice of Allowance of the U.S. Appl. No. 15/676,586, dated Nov. 19, 2021, (16p).
R2-162848, 3GPP TSG-RAN WG2 #93bis; Dubrovnik, Croatia, Apr. 11-15, 2016; Agenda Item: 7.4; Source: Sequans Communications; Title: Corrections to UL SPS operation; Document for: Discussion and Decision.
First Office Action of the European application No. 17765284.9, dated Mar. 25, 2019.
Second Office Action of the European application No. 1 7765284.9, dated Sep. 24, 2019.
R2-164420; 3GPP TSG-RAN WG2 Meeting #94; Nanjing, China, May 23-27, 2016; Agenda Item: 13.1.2 Source: Vice-Chairwoman (Inter Digital); Title: Report from LTE Break-Out Session (V2V,V2X, FeD2D, LATRED); Document for: Approval.
R2-167999; 3GPP TSG RAN WG2 Meeting #96, Reno, USA, Nov. 14-18, 2016; Source: Potevio; Title: Discussion on SPS configuration related issues; Agenda Item: 8.13 2; Document for: Discussion and Decision.
R2-1700782; 3GPP TSG-RAN WG2 #97; Athens, Athens, Feb. 13-17, 2017; Agenda Item: 8.13.3; Source: ZTE; Title: Discussion on UE assistance information related issues; Document for: Discussion.
First Office Action of the Japanese application No. 2019-507835, dated Nov. 20, 2020.
Non-Final Office Action of the U.S. Appl. No. 15/676,545, dated Nov. 2, 2018.
Final Office Action of the U.S. Appl. No. 15/676,545, dated May 6, 2019.
Notice of Advisory Action of the U.S. Appl. No. 15/676,545, dated Aug. 9, 2019.
Non-Final Office Action after RCE of the U.S. Appl. No. 15/676,545, dated Jan. 23, 2020.
Notice of Allowance after RCE of the U.S. Appl. No. 15/676,545, dated Jul. 22, 2020.
Non-Final Office Action of the U.S. Appl. No. 15/676,586, dated Oct. 10, 2018.
Final Office Action of the U.S. Appl. No. 15/676,586, dated Mar. 19, 2019.
Non-Final Office Action after RCE of the U.S. Appl. No. 15/676,586, dated Jul. 12, 2019.
Final Office Action after RCE of the U.S. Appl. No. 15/676,586, dated Feb. 13, 2020.
Non-Final Office Action after RCE of the U.S. Appl. No. 15/676,586, dated Jan. 26, 2021.
Non-Final Office Action of the U.S. Appl. No. 15/676,642, dated Oct. 26, 2018.
Notice of Allowance of the U.S. Appl. No. 15/676,642, dated Apr. 3, 2019.
Non-Final Office Action of the U.S. Appl. No. 16/531,186, dated Sep. 11, 2019.
Notice of Allowance of the U.S. Appl. No. 16/531,186, dated Jan. 15, 2020.
Non-Final Office Action of the U.S. Appl. No. 16/870,783, dated Jul. 7, 2020.
First Office Action of the Canadian application No. 3033851, dated Aug. 24, 2020.
Decision of Refusal of the European application 20212155.4, dated Apr. 8, 2021.
Notice of Allowance of the U.S. Appl. No. 16/870,783, dated Jun. 3, 2021.
First Office Action of the Japanese Application No. 2021-096826, dated Aug. 31, 2022, (5p).
ZTE, "Remaining issues on UCI transmission for NB-IoT", 3GPP TSG RAN WG1 #84bis, R1-162763, Busan, Korea, Apr. 11-15, 2016, (3p).
Notice of Allowance of the Korean Application No. 10-2019-7007067, dated May 25, 2022, (3p).
3GPP TS 36.213 V13.2.0 (Jun. 2016), Technical Specification, 3rd Generation Partnership Project; Technical Specification Group Radio Access Network; Evolved Universal Terrestrial Radio Access (E-UTRA); Physical layer procedures (Release 13).
3GPP TS 36.300 V13.4.0 (Jun. 2016), Technical Specification, 3rd Generation Partnership Project; Technical Specification Group Radio Access Network; Evolved Universal Terrestrial Radio Access (E-UTRA)

(56) References Cited

OTHER PUBLICATIONS and Evolved Universal Terrestrial Radio Access Network (E-UTRAN); Overall description; Stage 2(Release 13).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA); Medium Access Control (MAC) protocol specification (Release 13).
3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource Control(RRC); Protocol specification (Release 13).
R1-164878, 3GPP TSG RAN WG1 Meeting #85, Nanjing, China May 23-27, 2016, Source: CMCC, Title: Discussion on SPS configurations.
R1-162122, 3GPP TSG RAN WG1 Meeting #84bis, Busan, Korea, Apr. 11-15, 2016, Agenda Item: 7.3 2.2.2, Source: Huawei, HiSilicon, Title: SPS enhancement for V2V.
R1-162340, 3GPP TSG RAN WG1 Meeting #84 bis, Busan, Korea, Apr. 11-15, 2016, Source: OPPO, Title: Discussion on the SPS configuration.
R1-162413, 3GPP TSG-RAN WG1 Meeting #84bis, Busan, Korea Apr. 11-15, 2016, Source: ZTE, Title: Discussion on V2V SPS resource scheme.
R1-162500, RAN WG1 Meeting #84bis, Busan, Korea, Apr. 11-15, 2016, Source: LG Electronics, Title: Discussions on UL enhancements for V2X.
R1-164421, 3GPP TSG-RAN WG1 #85, May 23-27, 2016, Nanjing, China, Agenda Item: 6.2.2.3.1, Source: Qualcomm Incorporated, Title: eNodeB signaling for SPS resource allocation.
R1-164422, 3GPP TSG-RAN WG1 #85, May 23-27, 2016, Nanjing, China, Agenda Item: 6.2.2.3 2, Source: Qualcomm Incorporated, Title: UE reporting for eNodeB resource allocation.
R1-164468, 3GPP TSG RAN WG1 Meeting #85, Nanjing, China, May 23-27, 2016, Source: Guangdong OPPO Mobile Telecom, Title: Discussion on the SPS configuration for mode-2.
R1-164514, 3GPP TSG RAN WG1 Meeting #85, Nanjing, China May 23-27, 2016, Source: LG Electronics, Title: Discussion on details of (E)PDCCH used for sidelink SPS.
R1-164515, 3GPP TSG RAN WG1 Meeting #85, Nanjing, China, May 23-27, 2016, Agenda Item: 6.2.2 3.2, Source: LG Electronics, Title: Discussion on details of UE reporting.
R1-164538, 3GPP TSG RAN WG1 Meeting #85, Nanjing, China, May 23-27, 2016, Source: LG Electronics, Title Discussion on UL SPS for V2X.
R1-164762, 3GPP TSG RAN WG1 Meeting #85, Nanjing, May 23-27, 2016, Agenda Item: 6.2.2.3.1, Source: Samsung, Title: Multiple SPS configuration support for SL.
R1-164763, 3GPP TSG RAN WG1 Meeting #85, Nanjing, May 23-27, 2016, Agenda Item: 6.2.2.3 2. Source: Samsung, Title: UE reporting procedure for SL SPS transmissions.
R1-164818, 3GPP TSG RAN WG1 Meeting #85, Nanjing, China, May 23-27, 2016, Agenda Item: 6.2.2 3, Source: Huawei, HiSilicon, Title: SPS enhancement for V2V.
R1-164906, 3GPP TSG RAN WG1 Meeting #85, Nanjing, China May 23-27, 2016, Source: Panasonic, Title: Signaling design to support SPS activation/release in V2V.
R1-164963, 3GPP TSG-RAN WG1 Meeting #85, Nanjing, China May 23-27, 2016, Source: ZTE, Title: Trigger and release of V2V SPS resources.
R1-164964, 3GPP TSG RAN WG1 Meeting #85, Nanjing, China May 23-27, 2016, Agenda Item: 6.2.2.3 2, Source: ZTE, Title: Discussion on UE reporting.
R1-165193, 3GPP TSG RAN WG1 Meeting #85, Nanjing, China May 23-27, 2016, Source: NTT Docomo, Inc, Title: (E)PDCCH for sidelink SPS configuration switching.
R1-165194, 3GPP TSG RAN WG1 Meeting #85, Nanjing, China May 23-27, 2016, Source: NTT Docomo, Inc., Title: UE reporting for sidelink SPS operation.
R1-165246, 3GPP TSG RAN WG1 Meeting #85, Nanjing, PRC, May 23-27, 2016, Source: Ericsson, Title: Contents of Downlink Control Information for V2V over PC5.
R1-165272, 3GPP TSG RAN WG1 Meeting #85, Nanjing, PRC, May 23-27, 2016, Source: Ericsson, Title: Mode-1 SPS for V2V over PC5.
R1-165274, 3GPP TSG RAN WG1 Meeting #85, Nanjing, May 23-27, 2016, Source: Ericsson, Title: UL SPS and reporting to eNB for V2X.
R1-165309, 3GPP TSG RAN WG1 Meeting #85, Nanjing, China May 23-27, 2016, Source: Panasonic, Title: Details an PC5 SPS enhancement.
R2-162197, 3GPP TSG-RAN2 Meeting #93bis, Dubrovnik, Croatia, Apr. 11-15, 2016, Agenda Item: 8.2.1. Source: OPPO, Title: Discussion on SPS Enhancements for V2V.
R2-162454, 3GPP TSG RAN WG2 Meeting #93bis, Dubrovnik, Croatia, Apr. 11-15, 2016, Agenda Item: 8.2.1, Source: Intel Corporation, Title: SL resource allocation in SPS manner.
R2-162927, 3GPP TSG-RAN2 Meeting #93bis, Dubrovnik, Croatia, Apr. 11-15, 2016, Agenda Item: 8.2.1, Source: LG Electronics Inc., Title: SL SPS enhancement for V2V.
R2-163406, 3GPP TSG-RAN2 Meeting #94, Nanjing, P. R. China, Apr. 23-27, 2016, Agenda Item: 8.11.1, Source: OPPO, Title: Discussion on SPS Enhancements for V2X.
R2-163421, 3GPP TSG-RAN WG2 Meeting #94, Nanjing, China, May 23-25, 2016, Source: CATT, Title: Consideration on SPS Enhancement.
R2-163451, 3GPP TSG RAN WG2 Meeting #94, Nanjing, China,Apr. 23-25, 2016, Agenda Item: 8.2.4, Source: Samsung, Title: UE reporting and dynamic SL SPS transmission.
R2-163807, 3GPP TSG-RAN WG2 Meeting #94, Nanjing, China, May 23-27, 2016, Agenda Item: 8.11.1, Source: Huawei, HiSilicon, InterDigital, LG Electronics Inc., OPPO, Title: Discussions on CAM Characteristics.
R2-163812, 3GPP TSG-RAN WG2 #94, Nanjing, China, 23-27, May 2016, Agenda Item: 8.2.4, Source: Huawei, HiSilicon, Title: Enhancements for Sidelink Resource Allocation.
R2-163840, 3GPP TSG RAN WG2 #94, Nanjing, China, May 23-27, 2016, Source: ZTE, Tile: SPS enhancements for V2X over Uu.
R2-163865, 3GPP TSG RAN WG2 Meeting #94, Nanjing, China, May 23-25, 2016, Source: ITL, Title; SL SPS for V2V.
R2-163885, 3GPP TSG RAN WG2 Meeting #94, Nanjing, China, May 23-27, 2016, Source: Potevio, Title: UE assisted information for SPS.
R2-163900, 3GPP TSG-RAN WG2 Meeting #94, Nanjing, China, May 23-27, 2016, Agenda Item: 8.11.1, Source: Nokia, Alcatel-Lucent Shanghai Bell, Title: Multiple inter-dependent UL SPS occasions.
R2-164063, 3GPP TSG-RAN WG2 Meeting #94, Nanjing, China, May 23-27, 2016, Agenda Item: 8.2.4, Source: Qualcomm Incorporated, Title: SPS for V2V Communication.
R2-164079, 3GPP TSG-RAN2 Meeting #94, Nanjing, China, Apr. 11-15, 2016, Agenda Item: 8.2.4, Source: LG Electronics Inc. Title: Support of Semi-Persistent Scheduling for PC5 mode 1.
R2-164082, 3GPP TSG-RAN2 Meeting #94, Nanjing, China, Apr. 11-15, 2016, Agenda Item: 8.11.1, Source: LG Electronics Inc, InterDigital, OPPO, Huawei, Title: Proposed TP for UL SPS enhancements.
R2-164377, 3GPP TSG-RAN WG2 Meeting #94, Nanjing, China, May 23-27, 2016, Agenda Item: 8.11.1, Source: Huawei, HiSilicon, Title: TP on CAM Characteristics.
Tdoc R2-161571, 3GPP TSG-RAN WG2 #93, St. Julians, Malta, Feb. 15-19, 2016, Agenda Item: 7.11, Source: Ericsson, Title: Overview of V2X Enhancements for Further RAN2 Work.
Tdoc R2-164112, 3GPP TSG-RAN WG2 #94, Nanjing, P.R. China, May 23-27, 2016, Agenda Item: 8.11.1, Source: Ericsson, Title: SPS Enhancements for Uu Operations in V2X.
International Search Report dated Jan. 10, 2018, in International Application No. PCT/US2017/046780.
Written Opinion of the International Search Authority in the international application No. PCT/US2017/046780, dated Jan. 10, 2018.

(56) References Cited

OTHER PUBLICATIONS

R2-163836, 3GPP TSG RAN WG2 #94, Nanjing, China, May 23-27, 2016, Source: ZTE, Title: SPS enhancements for V2V over PC5.

Tdoc R2-164105; 3GPP TSG-RAN WG2 #94; Nanjing, P.R. China, May 23-27, 2016; Agenda Item: 8.2.4; Source: Ericsson; Title: Sidelink Resource Allocation in V2X.

Supplementary European Search Report in the European application No. 1 8187542.8, dated Nov. 28, 2018.

First Office Action of the U.S. Appl. No. 15/676,586, dated Aug. 19, 2021, (27p).

3GPP TSG-RAN WG2 Meeting #95 R2-165400, "SPS enhancements for V2V over PC5", ZTE, 3GPP TSG RAN WG2 Meeting #95, Göteborg, Sweden, Aug. 22-26, 2016,(5p).

3GPP TSG-RAN WG2 Meeting #97bis R2-1703751, Spokane, WA, USA, Apr. 3-7, 2017, 3GPP TS 36.331 V14.2.0 (Mar. 2017), 3rd Generation Partnership Project; Technical Specification Group Radio Access Network; Evolved Universal Terrestrial Radio Access (E-UTRA); Radio Resource Control (RRC); Protocol specification (Release 14) (723p).

First Office Action of the Korean application No. 10-2022-7028966, dated Apr. 10, 2023,(8p).

\* cited by examiner

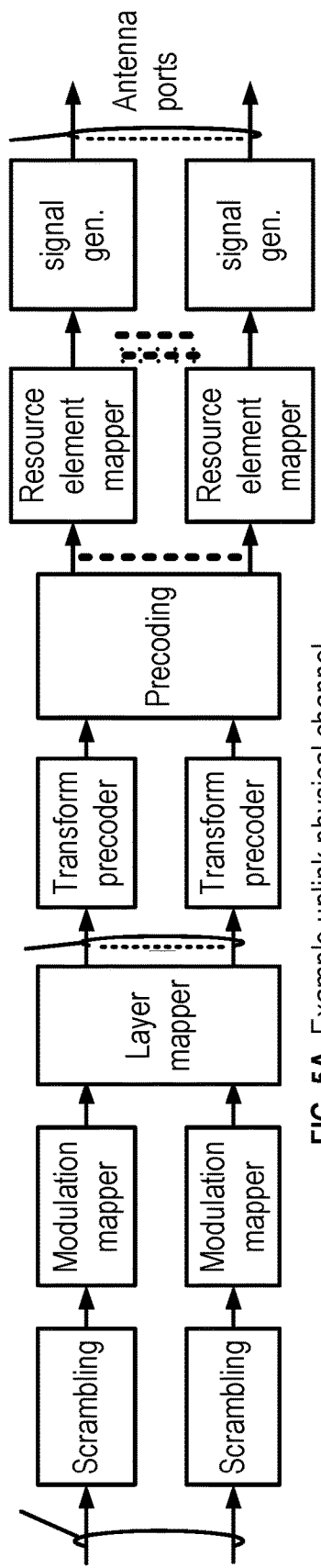
FIG. 5A Example uplink physical channel
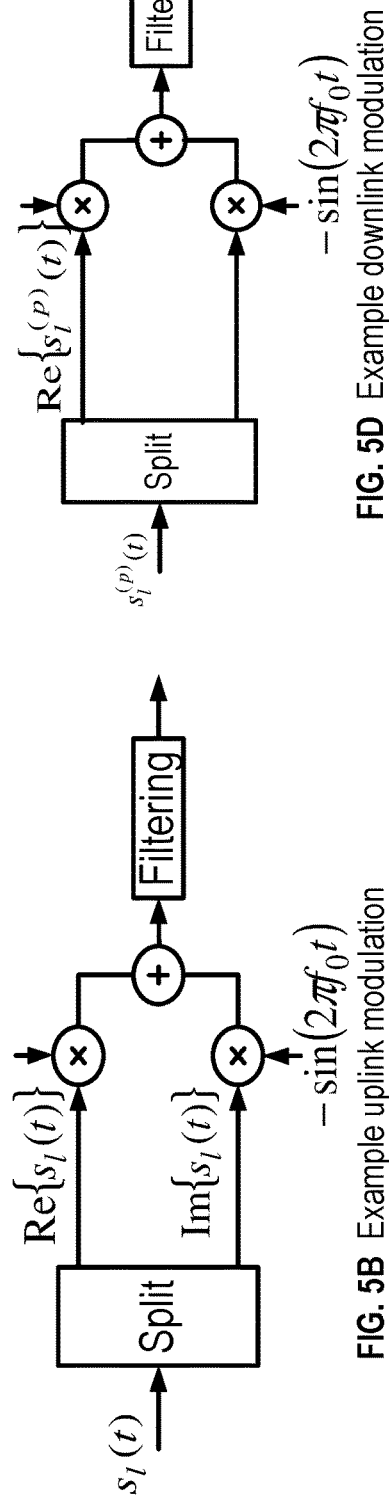
FIG. 5B Example uplink modulation
FIG. 5D Example downlink modulation
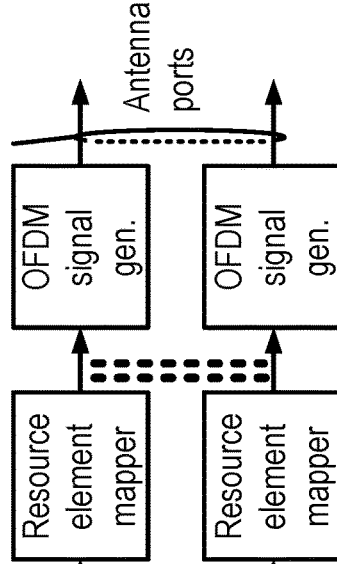
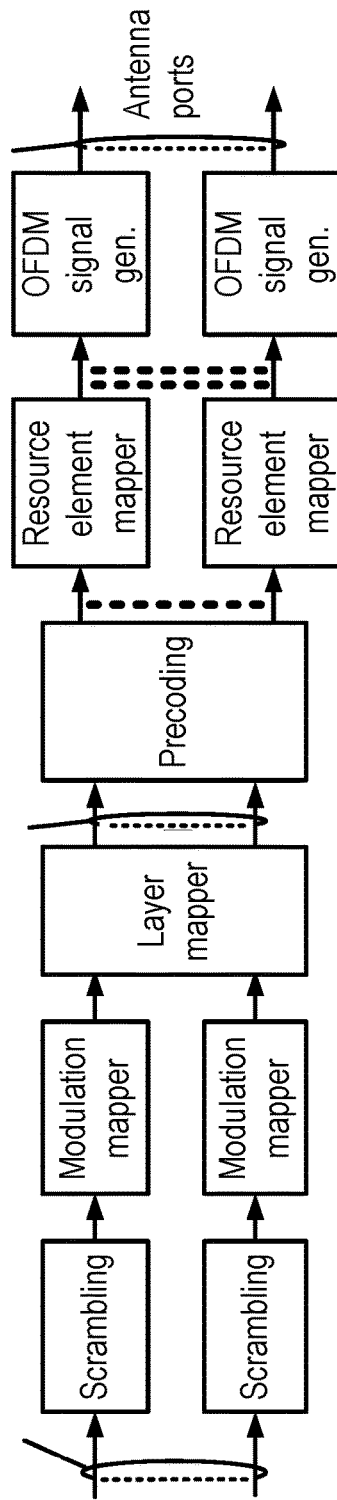
FIG. 5C Example downlink physical channel

Dual-Connectivity at eNB

FIG. 7  Dual-Connectivity- two MAC entities at UE side

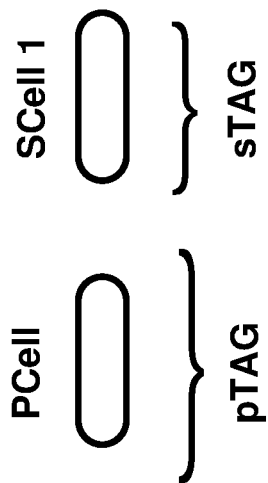
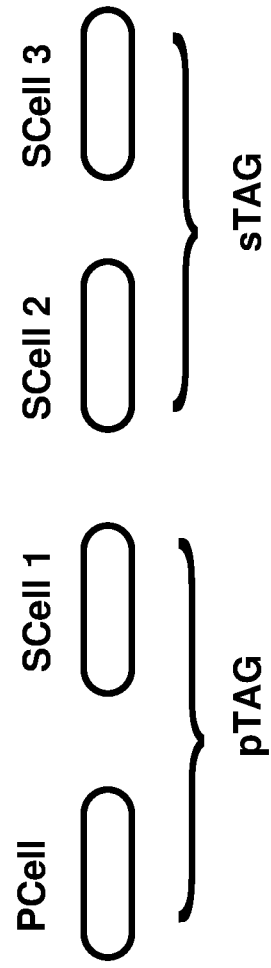
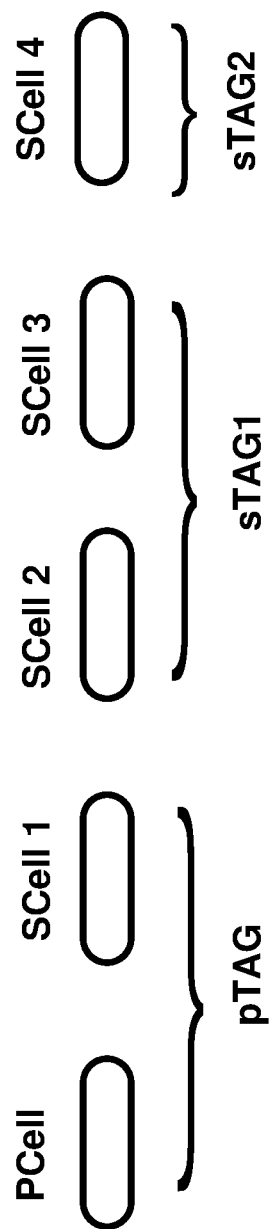
FIG. 8

| $C_7$ | $C_6$ | $C_5$ | $C_4$ | $C_3$ | $C_2$ | $C_1$ | R | Oct 1 |
|---|---|---|---|---|---|---|---|---|

Example Activation/Deactivation MAC control element of one octet

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

Example Activation/Deactivation MAC control element of four octets

FIG. 10

| TDD UL/DL configuration | Position of initial Semi-Persistent grant | Subframe_Offset value (ms) |
|---|---|---|
| 0 | N/A | 0 |
| 1 | Subframes 2 and 7 | 1 |
| 1 | Subframes 3 and 8 | -1 |
| 2 | Subframe 2 | 5 |
| 2 | Subframe 7 | -5 |
| 3 | Subframes 2 and 3 | 1 |
| 3 | Subframe 4 | -2 |
| 4 | Subframe 2 | 1 |
| 4 | Subframe 3 | -1 |
| 5 | N/A | 0 |
| 6 | N/A | 0 |

FIG. 11

SEMI-PERSISTENT SCHEDULING IN A WIRELESS DEVICE AND NETWORK

CROSS-REFERENCE TO RELATED APPLICATIONS

This application is a continuation of U.S. patent Ser. No. 15/676,545 file Aug. 14, 2017, which claims the benefit of U.S. Provisional Application No. 62/374,580, filed Aug. 12, 2016, U.S. Provisional Application No. 62/399,442, filed Sep. 25, 2016 and of U.S. Provisional Application No. 62/399,443, filed Sep. 25, 2016 which are hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 10 is an example diagram depicting Activation/Deactivation MAC control elements as per an aspect of an embodiment of the present disclosure.

FIG. 11 is an example diagram depicting example subframe offset values as per an aspect of an embodiment of the present disclosure.

DETAILED DESCRIPTION OF EMBODIMENTS

Figure 1:
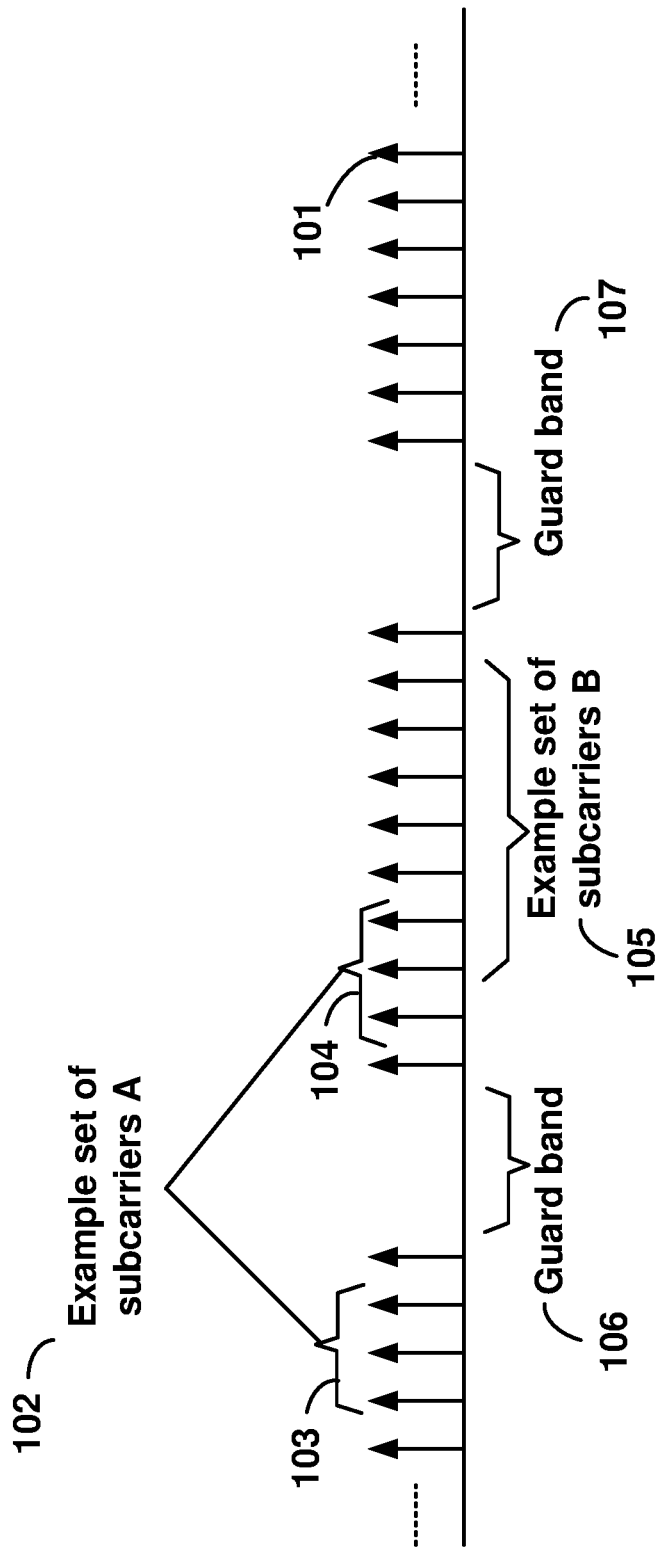
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
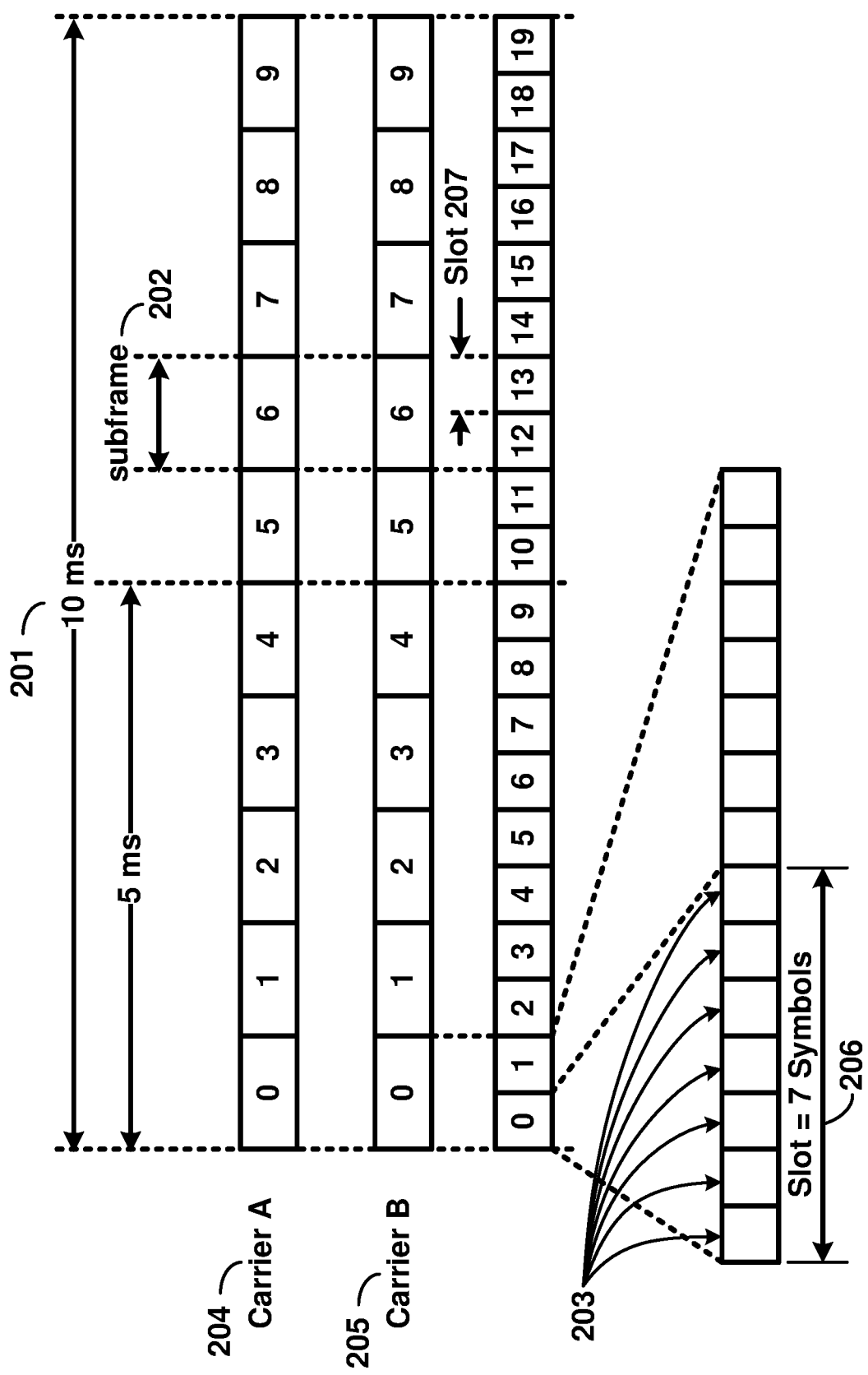
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
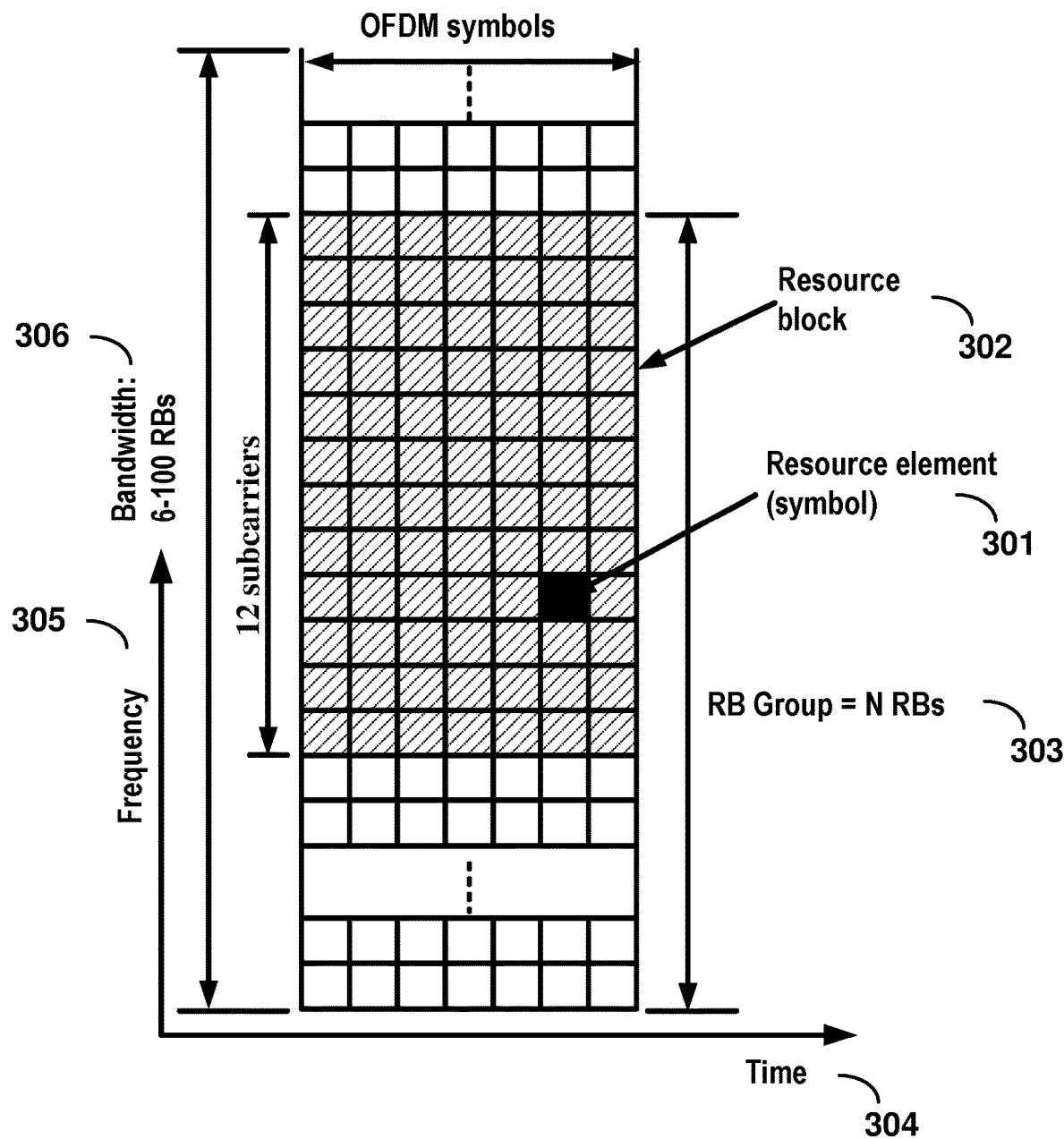
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
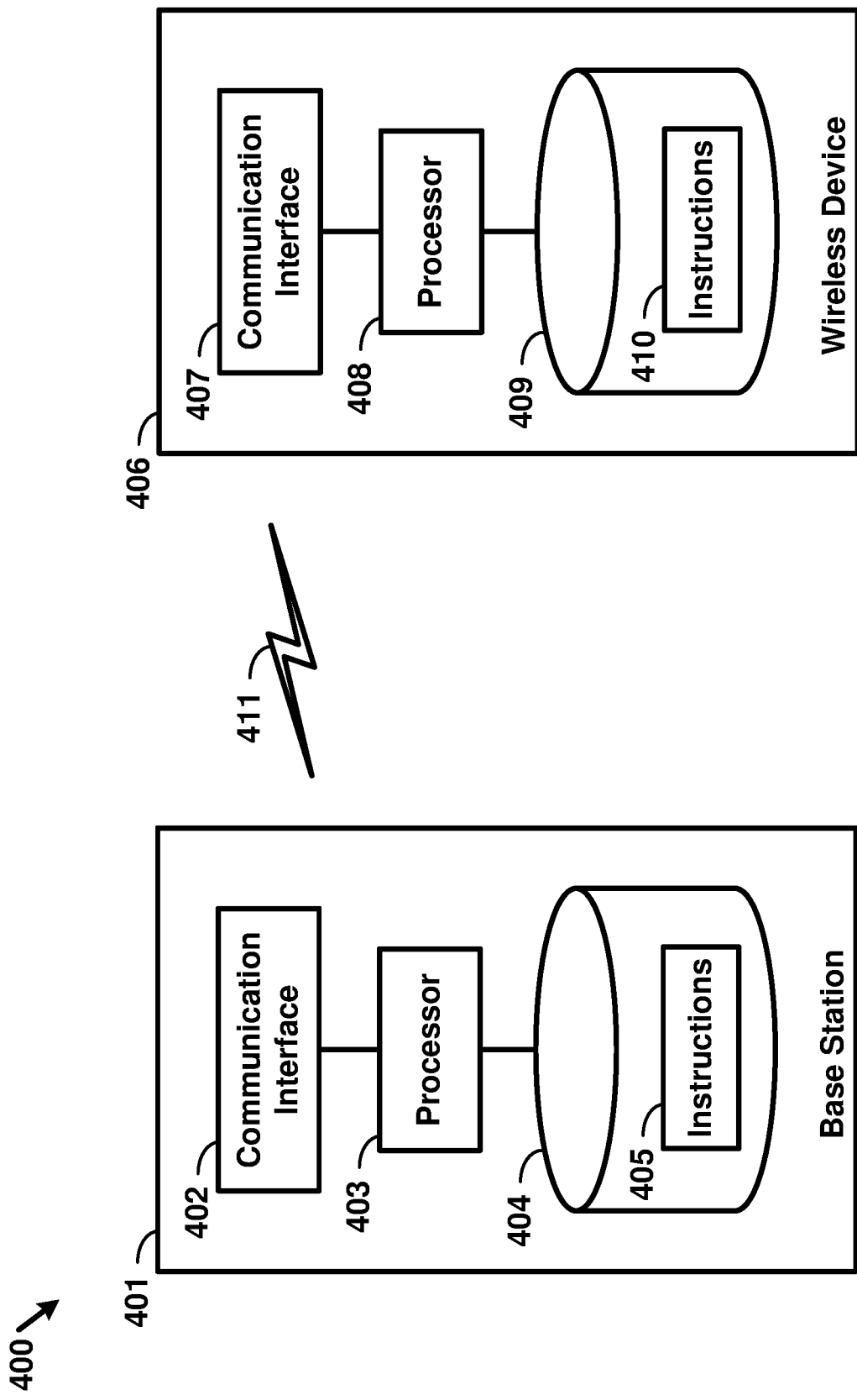
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
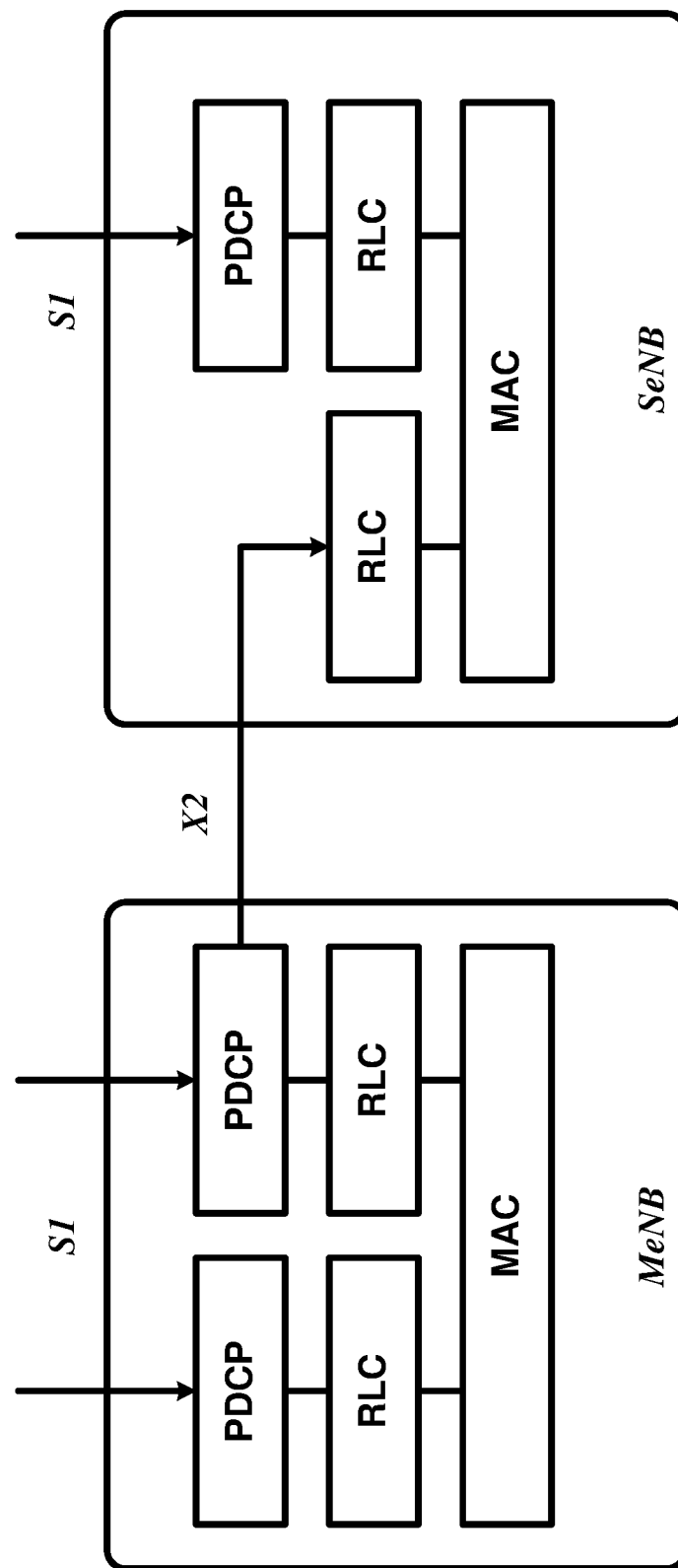
FIG. 6 is an example diagram for a protocol structure with CA and DC as per an aspect of an embodiment of the present disclosure.
Figure 7:
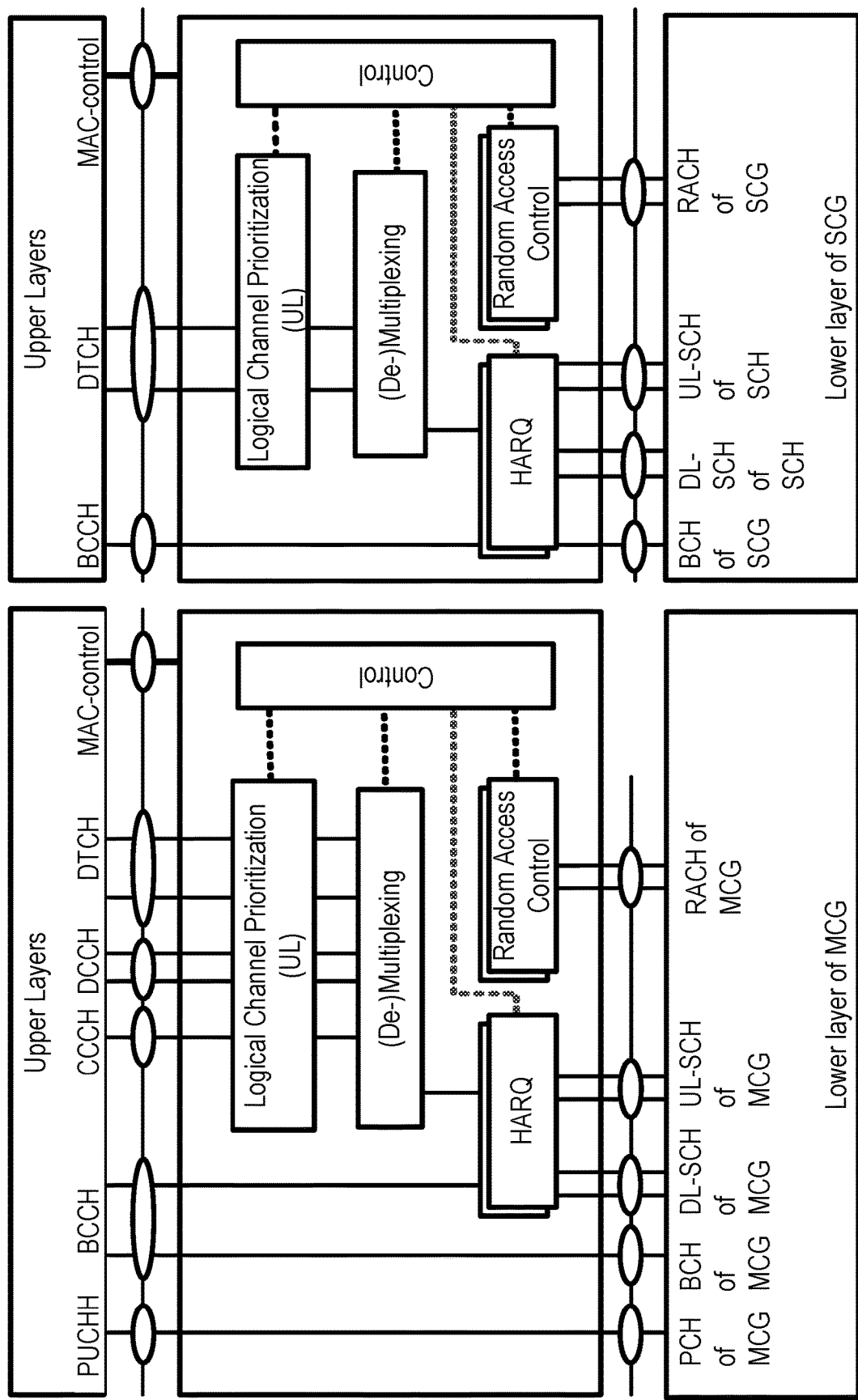
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
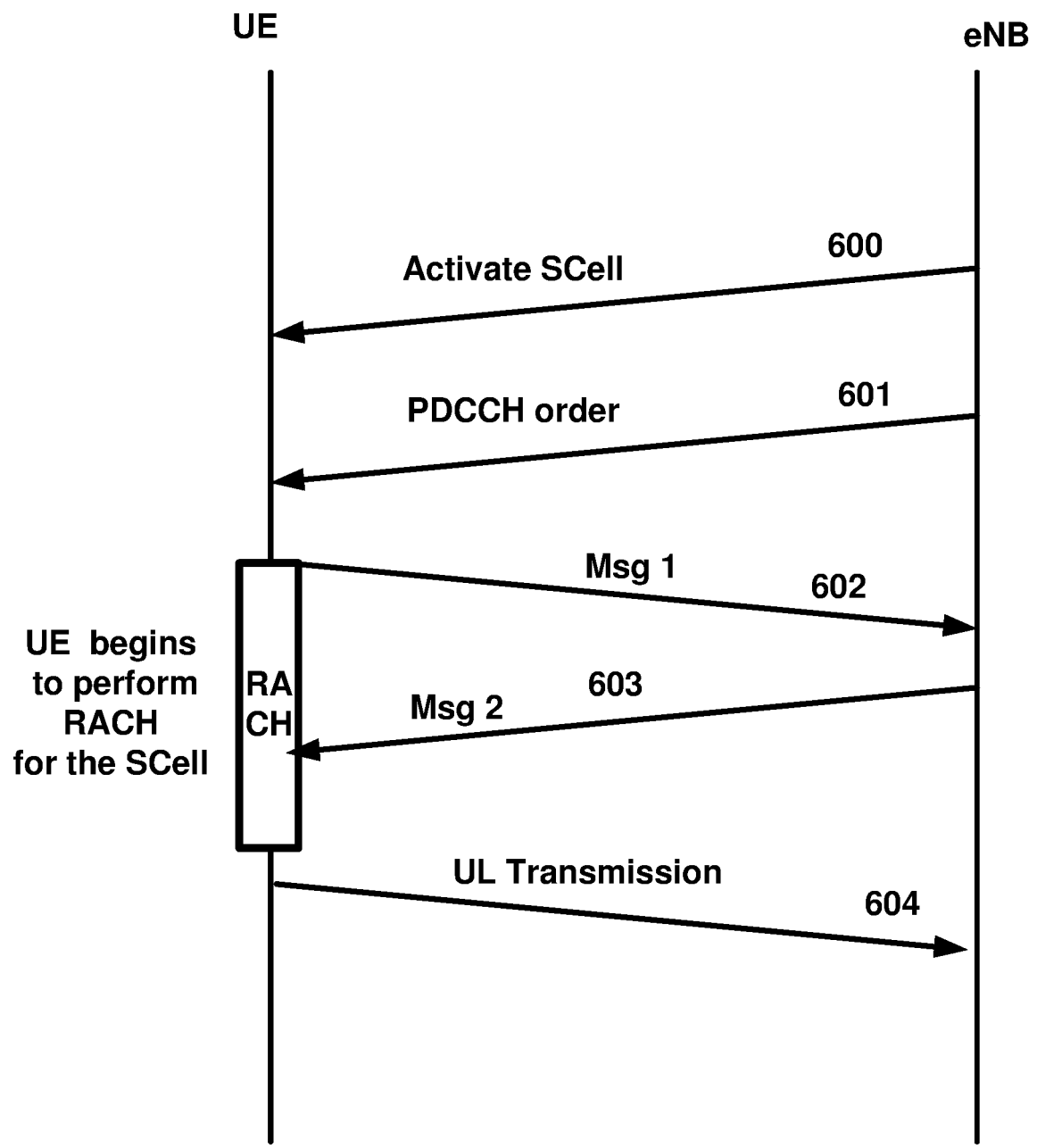
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

In an example, the MAC entity may be configured with one or more SCells. In an example, the network may activate and/or deactivate the configured SCells. The SpCell may always be activated. The network may activate and deactivates the SCell(s) by sending the Activation/Deactivation MAC control element. The MAC entity may maintain a sCellDeactivationTimer timer for a configured SCell. Upon the expiry of sCellDeactivationTimer timer, the MAC entity may deactivate the associated SCell. In an example, the same initial timer value may apply to each instance of the sCellDeactivationTimer and it may be configured by RRC. The configured SCells may initially be deactivated upon addition and after a handover. The configured SCG SCells may initially be deactivated after a SCG change.

In an example, if the MAC entity receives an Activation/Deactivation MAC control element in a TTI activating a SCell, the MAC entity may, in a TTI according to the timing defined below, activate the SCell and apply normal SCell operation including SRS transmissions on the SCell, CQI/PMI/RI/PTI/CRI reporting for the SCell, PDCCH monitoring on the SCell, PDCCH monitoring for the SCell and PUCCH transmissions on the SCell, if configured. The MAC entity may start or restart the sCellDeactivationTimer associated with the SCell and trigger power headroom report (PHR). In an example, if the MAC entity receives an Activation/Deactivation MAC control element in a TTI deactivating a SCell or if the sCellDeactivationTimer associated with an activated SCell expires in the TTI, the MAC entity may, in a TTI according to the timing defined below, deactivate the SCell, stop the sCellDeactivationTimer associated with the SCell and flush all HARQ buffers associated with the SCell.

In an example, when a UE receives an activation command for a secondary cell in subframe n, the corresponding actions above may be applied no later than the minimum requirements and no earlier than subframe n+8, except for the actions related to CSI reporting on a serving cell which may be active in subframe n+8 and the actions related to the sCellDeactivationTimer associated with the secondary cell which may be applied in subframe n+8. The actions related to CSI reporting on a serving cell which is not active in subframe n+8 may be applied in the earliest subframe after n+8 in which the serving cell is active.

In an example, when a UE receives a deactivation command for a secondary cell or the sCellDeactivationTimer associated with the secondary cell expires in subframe n, the corresponding actions above may apply no later than the minimum requirement except for the actions related to CSI reporting on a serving cell which is active which may be applied in subframe n+8.

In an example, if the PDCCH on the activated SCell indicates an uplink grant or downlink assignment or if the PDCCH on the Serving Cell scheduling an activated SCell indicates an uplink grant or a downlink assignment for the activated SCell, the MAC entity may restart the sCellDeactivationTimer associated with the SCell.

In an example, if a SCell is deactivated, the UE may not transmit SRS on the SCell, may not report CQI/PMI/RI/PTI/CRI for the SCell, may not transmit on UL-SCH on the SCell, may not transmit on RACH on the SCell, may not monitor the PDCCH on the SCell, may not monitor the PDCCH for the SCell and may not transmit PUCCH on the SCell.

In an example, the HARQ feedback for the MAC PDU containing Activation/Deactivation MAC control element may not be impacted by PCell interruption due to SCell activation/deactivation. In an example, when SCell is deactivated, the ongoing Random Access procedure on the SCell, if any, may be aborted.

In an example, the Activation/Deactivation MAC control element of one octet may be identified by a MAC PDU subheader with LCID 11000. FIG. 10 shows example Activation/Deactivation MAC control elements. The Activation/Deactivation MAC control element may have a fixed size and may consist of a single octet containing seven C-fields and one R-field. Example Activation/Deactivation MAC control element with one octet is shown in FIG. 10. The Activation/Deactivation MAC control element may have a fixed size and may consist of four octets containing 31 C-fields and one R-field. Example Activation/Deactivation MAC control element of four octets is shown in FIG. 10. In an example, for the case with no serving cell with a serving cell index (ServCellIndex) larger than 7, Activation/Deactivation MAC control element of one octet may be applied, otherwise Activation/Deactivation MAC control element of four octets may be applied. The fields in an Activation/Deactivation MAC control element may be interpreted as follows. Ci: if there is an SCell configured with SCellIndex i, this field may indicate the activation/deactivation status of the SCell with SCellIndex i, else the MAC entity may ignore the Ci field. The Ci field may be set to "1" to indicate that the SCell with SCellIndex i is activated. The Ci field is set to "0" to indicate that the SCell with SCellIndex i is deactivated. R: Reserved bit, set to "0".

Figure 12:
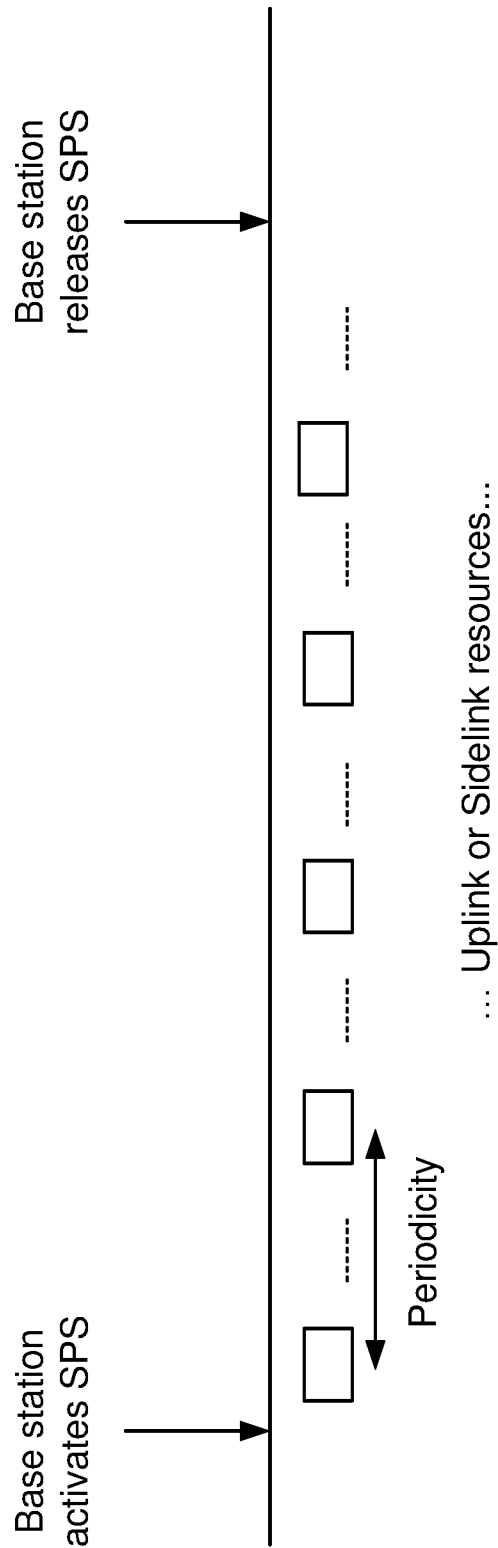
FIG. 12 is an example diagram depicting example uplink SPS activation and release as per an aspect of an embodiment of the present disclosure.

A base station may provide a periodic resource allocation. In a periodic resource allocation, an RRC message and/or a DCI may activate or release a periodic resource allocation. The UE may be allocated in downlink and/or uplink periodic radio resources without the need for transmission of additional grants by the base station. The periodic resource allocation may remain activated until it is released. The periodic resource allocation for example, may be called, semi-persistent scheduling or grant-free scheduling, or periodic multi-subframe scheduling, and/or the like. In this specification, the example term semi-persistent scheduling is mostly used, but other terms may also be equally used to refer to periodic resource allocation, e.g. grant-free scheduling. An example periodic resource allocation activation and release is shown in FIG. 12.

In the downlink, a base station may dynamically allocate resources (PRBs and MCS) to UEs at a TTI via the C-RNTI on PDCCH(s). A UE may monitor the PDCCH(s) in order to find possible allocation when its downlink reception is enabled (e.g. activity governed by DRX when configured). When CA is configured, the same C-RNTI applies to serving cells. Base station may also allocate semi-persistent downlink resources for the first HARQ transmissions to UEs. In an example, an RRC message may indicate the periodicity of the semi-persistent downlink grant. In an example, a PDCCH DCI may indicate whether the downlink grant is a semi-persistent one e.g. whether it can be implicitly reused in the following TTIs according to the periodicity defined by RRC.

In an example, when required, retransmissions may be explicitly signaled via the PDCCH(s). In the sub-frames where the UE has semi-persistent downlink resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its C-RNTI on the PDCCH(s), the PDCCH allocation may override the semi-persistent allocation for that TTI and the UE may not decode the semi-persistent resources.

When CA is configured, semi-persistent downlink resources may be configured for the PCell and/or SCell(s). In an example, PDCCH dynamic allocations for the PCell and/or SCell(s) may override the semi-persistent allocation.

In the uplink, a base station may dynamically allocate resources (PRBs and MCS) to UEs at a TTI via the C-RNTI on PDCCH(s). A UE may monitor the PDCCH(s) in order to find possible allocation for uplink transmission when its downlink reception is enabled (activity governed by DRX when configured). When CA is configured, the same C-RNTI applies to serving cells. In addition, a base station may allocate a semi-persistent uplink resource for the first HARQ transmissions and potentially retransmissions to UEs. In an example, an RRC may define the periodicity of the semi-persistent uplink grant. PDCCH may indicate whether the uplink grant is a semi-persistent one e.g. whether it can be implicitly reused in the following TTIs according to the periodicity defined by RRC.

In an example, in the sub-frames where the UE has semi-persistent uplink resource, if the UE cannot find its C-RNTI on the PDCCH(s), an uplink transmission according to the semi-persistent allocation that the UE has been assigned in the TTI may be made. The network may perform decoding of the pre-defined PRBs according to the pre-defined MCS. Otherwise, in the sub-frames where the UE has semi-persistent uplink resource, if the UE finds its C-RNTI on the PDCCH(s), the PDCCH allocation may override the persistent allocation for that TTI and the UE's transmission follows the PDCCH allocation, not the semi-persistent allocation. Retransmissions may be either implicitly allocated in which case the UE uses the semi-persistent uplink allocation, or explicitly allocated via PDCCH(s) in which case the UE does not follow the semi-persistent allocation.

Vehicular communication services, represented by V2X services, may comprise of the following different types: V2V, V2I, V2N and/or V2P. V2X services may be provided by PC5 interface (sidelink) and/or Uu interface (UE to base station interface). Support of V2X services via PC5 interface may be provided by V2X sidelink communication, which is a mode of communication whereby UEs may communicate with each other directly over the PC5 interface. This communication mode may be supported when the UE is served by E-UTRAN and when the UE is outside of E-UTRA coverage. The UEs authorized to be used for V2X services may perform V2X sidelink communication.

The user plane protocol stack and functions for sidelink communication may be used for V2X sidelink communication. In order to assist the eNB to provide sidelink resources, the UE in RRC_CONNECTED may report geographical location information to the eNB. The eNB may configure the UE to report the complete UE geographical location information based on periodic reporting via the existing measurement report signaling.

In an example, for V2X communication, k SPS (e.g. k=8 or 16, etc) configurations with different parameters may be configured by eNB and SPS configurations may be active at the same time. The activation/deactivation of an SPS configuration may signaled via a PDCCH DCI and/or an RRC message by eNB. The logical channel prioritization for Uu may be used.

For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

In an example, for unicast transmission of V2X messages, the V2X message may be delivered via Non-GBR bearers as well as GBR bearers. In order to meet the QoS requirement for V2X message delivery for V2X services, a Non-GBR QCI value and a GBR QCI value for V2X messages may be used. For broadcasting V2X messages, SC-PTM or MBSFN transmission may be used. In order to reduce SC-PTM/MBSFN latency, shorter (SC-)MCCH repetition period for SC-PTM/MBSFN, modification period for SC-PTM/MBSFN and MCH scheduling period for MBSFN may be supported. Reception of downlink broadcast of V2X messages in different carriers/PLMNs may be supported by having multiple receiver chains in the UE.

In an example embodiment, various DCI formats may be used for SPS scheduling. For example, the DCI format 0 may be used for uplink SPS. In an example, the fields for DCI format 0 may comprise one or more of the following fields: Carrier indicator e.g. 0 or 3 bits. Flag for format0/format1A differentiation e.g. 1 bit, where value 0 may indicate format 0 and value 1 may indicate format 1A. Frequency hopping flag, e.g. 1 bit. This field may be used as the MSB of the corresponding resource allocation field for resource allocation type 1. Resource block assignment and hopping resource allocation, e.g. $\lceil \log_2(N_{RB}^{UL}(N_{RB}^{UL}+1)/2) \rceil$ bits where $N_{RB}^{UL}$ may be the uplink bandwidth configuration in number of resource blocks. Modulation and coding scheme and redundancy version e.g. 5 bits. New data indicator e.g. 1 bit. TPC command for scheduled PUSCH e.g. 2 bits. Cyclic shift for DM RS and OCC index e.g. 3 bits. UL index e.g. 2 bits (this field may be present for TDD operation with uplink-downlink configuration 0). Downlink Assignment Index (DAI) e.g. 2 bits (this field may be present for cases with TDD primary cell and either TDD operation with uplink-downlink configurations 1-6 or FDD operation). CSI request e.g. 1, 2 or 3 bits. The 2-bit field may apply to UEs configured with no more than five DL cells and to UEs that are configured with more than one DL cell and when the corresponding DCI format is mapped onto the UE specific search space given by the C-RNTI, UEs that are configured by higher layers with more than one CSI process and when the corresponding DCI format is mapped onto the UE specific search space given by the C-RNTI, UEs that are configured with two CSI measurement sets by higher layers with the parameter csi-MeasSubframeSet, and when the corresponding DCI format is mapped onto the UE specific search space given by the C-RNTI; the 3-bit field may apply to the UEs that are configured with more than five DL cells and when the corresponding DCI format is mapped onto the UE specific search space given by the C-RNTI; otherwise the 1-bit field may apply. SRS request e.g. 0 or 1 bit. This field may be present in DCI formats scheduling PUSCH which are mapped onto the UE specific search space given by the C-RNTI. Resource allocation type e.g. 1 bit. This field may be present if $N_{RB}^{UL} \leq N_{RB}^{DL}$ where $N_{RB}^{UL}$ may be the uplink bandwidth configuration in number of resource blocks and $N_{RB}^{DL}$ may be the downlink bandwidth configuration in number of resource blocks. In example, one or more fields may be added to a DCI for SPS to enhance SPS scheduling process. In example, one or more of the fields may be replaced with new fields, or new values, or may be interpreted differently for SPS to enhance SPS scheduling process.

A base station may transmit one or more RRC messages to a wireless device to configure SPS. The one or more RRC messages may comprise SPS configuration parameters. Example SPS configuration parameters are presented below. In example, one or more parameters may be added to an RRC message for SPS to enhance SPS scheduling process. In example, one or more some of the parameters for an SPS in an RRC message may be replaced with new parameters, or new values, or may be interpreted differently for SPS to enhance SPS scheduling process. In an example, IE SPS-Config may be used by RRC to specify the semi-persistent scheduling configuration. In an example, the IE SPS-Config may be SEQUENCE {semiPersistSchedC-RNTI: C-RNTI; sps-ConfigDL: SPS-ConfigDL; sps-ConfigUL: SPS-ConfigUL}. SPS-ConfigDL IE may comprise semiPersistSchedIntervalDL, numberOfConfSPS-Processes, n1PUCCH-AN-PersistentList, twoAntennaPortActivated, n1PUCCH-AN-PersistentListP1, and/or other parameters. In an example, SPS-ConfigUL IE may comprise semiPersistSchedIntervalUL, implicitReleaseAfter, p0-NominalPUSCH-Persistent, p0-UE-PUSCH-Persistent, twoIntervalsConfig, p0-PersistentSubframeSet2, p0-NominalPUSCH-PersistentSubframeSet2, p0-UE-PUSCH- and/or PersistentSubframeSet2, and/or other parameters.

In an example, one or more RRC configuration parameters may comprise one or more of the following parameters to configure SPS for a wireless device. In an example, SPS configuration may include MCS employed for packet transmission of an MCS grant. In an example, implicitReleaseAfter IE may be the number of empty transmissions before implicit release, e.g. value e2 may corresponds to 2 transmissions, e3 may correspond to 3 transmissions and so on. In an example, n1PUCCH-AN-PersistentList IE, n1PUCCH-AN-PersistentListP1 IE may be the List of parameter: $n_{PUCCH}^{(1,p)}$ for antenna port P0 and for antenna port P1 respectively. Field n1-PUCCH-AN-PersistentListP1 IE may be applicable if the twoAntennaPortActivated-PUCCH-Format1a1b in PUCCH-ConfigDedicated-v1020 is set to true. Otherwise the field may not be configured.

In an example, numberOfConfSPS-Processes IE may be the number of configured HARQ processes for Semi-Persistent Scheduling. In an example, p0-NominalPUSCH-Persistent IE may be the parameter: $P_{O\_NOMINAL\_PUSCH}^{(0)}$ used in PUSCH power control with unit in dBm and step 1. This field may be applicable for persistent scheduling. If choice setup is used and p0-Persistent is absent, the value of p0-NominalPUSCH for p0-NominalPUSCH-Persistent may be applied. If uplink power control subframe sets are configured by tpc-SubframeSet, this field may apply for uplink power control subframe set 1.

In an example, p0-NominalPUSCH-PersistentSubframeSet2 IE may be the parameter: $P_{O\_NOMINAL\_PUSCH}^{(0)}$ used in PUSCH power control with unit in dBm and step 1. This field may be applicable for persistent scheduling. If p0-PersistentSubframeSet2-r12 is not configured, the value of p0-NominalPUSCH-SubframeSet2-r12 may be applied for p0-NominalPUSCH-PersistentSubframeSet2. E-UTRAN may configure this field if uplink power control subframe sets are configured by tpc-SubframeSet, in which case this field may apply for uplink power control subframe set 2. In an example, p0-UE-PUSCH-Persistent IE may be the parameter: $P_{O\_UE\_PUSCH}^{(0)}$ used in PUSCH power control with unit in dB. This field may be applicable for persistent scheduling. If choice setup is used and p0-Persistent is absent, the value of p0-UE-PUSCH may be applied for p0-UE-PUSCH-Persistent. If uplink power control subframe sets are configured by tpc-SubframeSet, this field may be applied for uplink power control subframe set 1. In an example, p0-UE-PUSCH-PersistentSubframeSet2 IE may be the parameter: $P_{O\_UE\_PUSCH}^{(0)}$ used in PUSCH power control with unit in dB. This field may be applicable for persistent scheduling. If p0-PersistentSubframeSet2-r12 is not configured, the value of p0-UE-PUSCH-SubframeSet2 may be applied for p0-UE-PUSCH-PersistentSubframeSet2. E-UTRAN may configure this field if uplink power control subframe sets are configured by tpc-SubframeSet, in which case this field may apply for uplink power control subframe set 2.

In an example, semiPersistSchedC-RNTI IE may be Semi-Persistent Scheduling C-RNTI. In an example, semiPersistSchedIntervalDL IE may be Semi-persistent scheduling interval in downlink. Its value may be in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, semiPersist-SchedIntervalUL IE may be semi-persistent scheduling interval in uplink. Its value in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, twoIntervalsConfig IE may be trigger of two-intervals-Semi-Persistent Scheduling in uplink. If this field is present, two-intervals-SPS is enabled for uplink. Otherwise, two-intervals-SPS is disabled.

In an example, multiple downlink or uplink SPS may be configured for a cell. In an example, multiple SPS RNTIs may be configured when a plurality of SPSs is configured. A base station may transmit to a UE at least one RRC message comprising SPS configuration parameters comprising a first SPS RNTI and a second SPS RNTI. For example, a first SPS RNTI may be configured for a first SPS configuration (e.g. for VOIP), and a second SPS RNTI may be configured for a second SPS configuration (e.g. for V2X communications). The UE may monitor PDCCH for at least DCIs corresponding to the first SPS RNTI and the second SPS RNTI.

When Semi-Persistent Scheduling is enabled by RRC, at least one or more of the following information may be provided: Semi-Persistent Scheduling C-RNTI(s); Uplink Semi-Persistent Scheduling interval semiPersistSchedIntervalUL, number of empty transmissions before implicit release implicitReleaseAfter, if Semi-Persistent Scheduling is enabled for the uplink; Whether twoIntervalsConfig is enabled or disabled for uplink, for TDD; Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink; and/or other parameters.

When Semi-Persistent Scheduling for uplink or downlink is disabled by RRC, the corresponding configured grant or configured assignment may be discarded.

In an example, after a Semi-Persistent downlink assignment is configured, the MAC entity may consider sequentially that the Nth assignment occurs in the subframe for which: (10*SFN+subframe)=[(10*SFNstart time+subframestart time)+N*semiPersistSchedIntervalDL] modulo 10240. Where SFNstart time and subframestart time may be the SFN and subframe, respectively, at the time the configured downlink assignment were (re)initialized.

In an example, after a Semi-Persistent Scheduling uplink grant is configured, the MAC entity may: if twoIntervalsConfig is enabled by upper layer: set the Subframe_Offset according to Table below. else: set Subframe_Offset to 0. consider sequentially that the Nth grant occurs in the subframe for which: (10*SFN+subframe)=[(10*SFNstart time+subframestart time)+N*semiPersistSchedIntervalUL+Subframe_Offset*(N modulo 2)] modulo 10240. Where SFNstart time and subframestart time may be the SFN and subframe, respectively, at the time the configured uplink grant were (re-)initialised. FIG. 11. shows example subframe offset values.

The MAC entity may clear the configured uplink grant immediately after implicitReleaseAfter number of consecutive MAC PDUs containing zero MAC SDUs have been provided by the Multiplexing and Assembly entity, on the Semi-Persistent Scheduling resource. Retransmissions for Semi-Persistent Scheduling may continue after clearing the configured uplink grant.

In an example embodiment, SPS configurations may be enhanced to support transmission of various V2X traffic and/or voice traffic by a UE. There is a need to support multiple SPS configurations for a UE. For example, a UE supporting V2X may need to support multiple uplink SPS configurations for transmitting various periodic (or semi-periodic) traffic and/or voice traffic in the uplink. Other examples may be provided. For example, CAM messages in V2X may be semi-periodic. In some scenarios, CAM message generation may be dynamic in terms of size, periodicity and timing. Such changes may result in misalignment between SPS timing and CAM timing. There may be some regularity in size and periodicity between different triggers. Enhanced SPS mechanisms may be beneficial to transmit V2X traffic, voice traffic, and/or the like. In an example, various SPS periodicity, for example 100 ms and 1 s may be configured.

In an example, multiple SPS configurations may be configured for UU and/or PC5 interface. An eNB may configure multiple SPS configurations for a given UE. In an example, SPS configuration specific MCS (e.g. MCS as a part of the RRC SPS-configuration) and/or SPS-configuration-specific periodicity may be configured. In an example, some of the SPS configuration parameters may be the same across multiple SPS and some other SPS configuration parameters may be different across SPS configurations. The eNB may dynamically trigger/release the different SPS-configurations employing (E)PDCCH DCIs. In an example, the multiple SPS configurations may be indicated by eNB RRC signaling. The dynamical triggering and releasing may be performed by eNB transmitting (E)PDCCH DCI to the UE employing SPS C-RNTI.

In an example embodiment, a UE may transmit UE SPS assistant information to a base station indicating that the UE does not intend and/or intend to transmit data before a transmission associated to an SPS configuration. The eNB may acknowledge the UE indication. For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

Some example V2X messages are CAM, DENM and BSM. For Example, CAM message may have the following characteristics. Content: status (e.g. time, position, motion state, activated system), attribute (data about dimension, vehicle type and role in the road traffic). Periodicity: typical time difference between consecutive packets generation is bounded to the [0.1, 1] sec range. Length: Variable. For Example, DENM message may have the following characteristics. Content: Contain information related to a variety of events. Periodicity: Event triggers the DENM update. In between two consequent DENM updates, it is repeated with a pre-defined transmission interval. Length: Fixed until DENM update. For Example, BSM message may have the following characteristics. Content: Part I contains some of the basic vehicle state information such as the message ID, vehicle ID, vehicle latitude/longitude, speed and acceleration status. Part II contains two option data frames: VehicleSafetyExtension and VehicleStatus. Periodicity: Periodic, the periodicity may be different considering whether BSM part II is included or not and the different application type. Length: Fixed, with different message size considering whether part II exists or not.

In an example, SPS may be employed for the transmission of BSM, DENMs and CAMs. For example, the UE's speed/position/direction changes within a range. BSM may be periodic traffic with a period of 100 ms. The message size of BSM may be in the range of 132~300 Bytes without certificate and 241~409 Bytes with certificate. DENMs, once triggered, may be transmitted periodically with a given message period which may remain unchanged. The message size of the DENM may be 200~1200 Bytes. If the UE's speed/position/direction does not change or changes within a small range, the CAM generation periodicity may be fixed.

The SPS may be supported for the UL and DL VoIP transmission. In the current SPS specification, the base station may configure SPS periodicity via dedicated RRC signaling. The periodicity of VoIP packet is generally fixed.

The UE may transmit traffic associated with multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets. Once the AS layer of UE receives the V2X packets from upper layer, the UE may trigger V2X packet transmissions on the corresponding SPS grant. Multiple UL SPS configurations may be configured for the UE.

The eNB may configure different SPS C-RNTIs for different SPS processes of the UE. SPS activation and release mechanism may be implemented. Employing at least one or more SPS RNTIs, the eNB may trigger which SPS process is activated or released. In an example implementation, in order to support multiple SPS configurations different SPS C-RNTIs may be configured for different SPS traffic types. For example, a first SPS C-RNTI may be configured for SPS configuration to transmit voice traffic, a second SPS C-RNTI may be configured for SPS configuration to transmit a V2X traffic. An eNB may transmit one or more RRC messages comprising multiple SPS configuration parameters. The multiple SPS configuration parameters may comprise multiple SPS-RNTI parameters for multiple SPS traffic types (e.g. multiple UL SPS configurations).

In the current LTE standard, a maximum of one downlink SPS and/or one uplink SPS may be configured for the PCell. Configuration of multiple SPSs are not supported for the PCell or any other cell. An SPS RNTI is configured for the UE to support one DL SPS configuration and/or one UL SPS configuration. The current SPS-Config IE comprises: semiPersistSchedRNTL: RNTI; sps-ConfigDL: SPS-ConfigDL; sps-ConfigUL: SPS-ConfigUL. Example embodiments enhance SPS configuration and processes to enable multiple SPS configuration for downlink, uplink and/or sidelink of a cell.

In an example, CAM message generation may be dynamic in terms of size, periodicity and timing. Such changes may result in misalignment between SPS timing and CAM timing. There may be some regularity in size and periodicity between different triggers. UE assistance may be needed to trigger and/or employ SPS.

Figure 17:
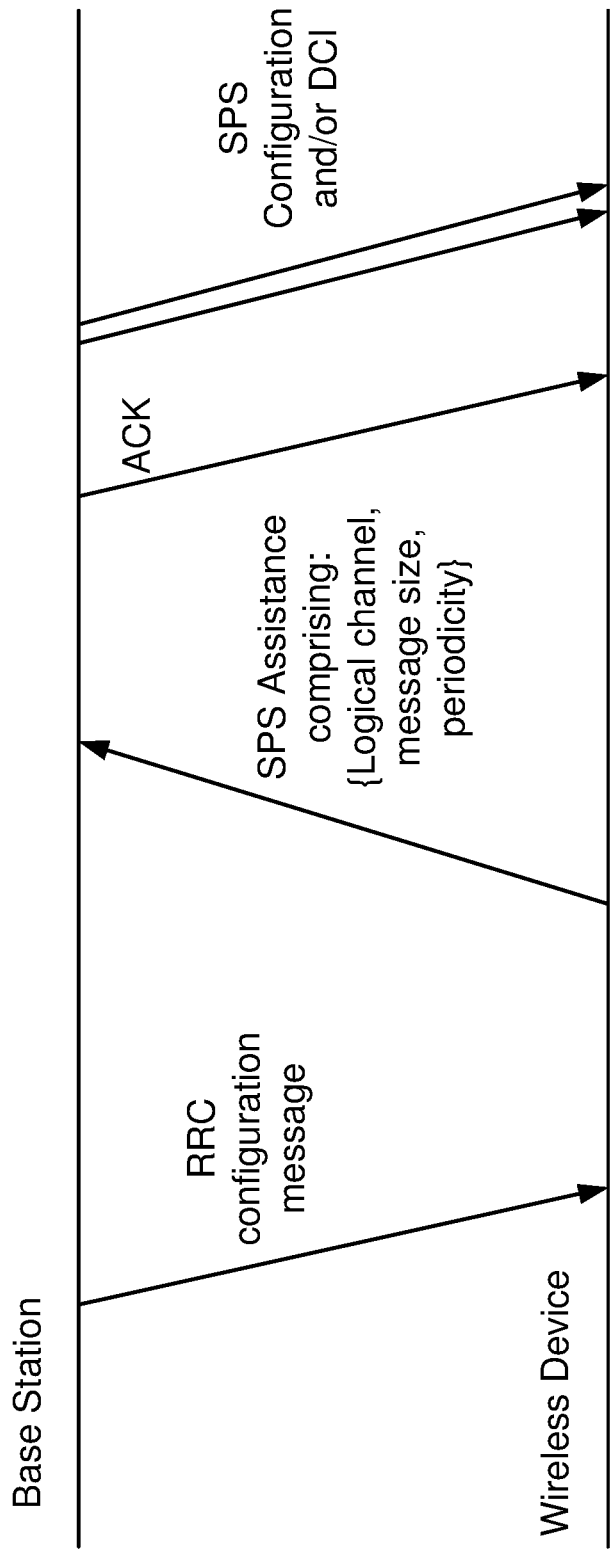
FIG. 17 is an example diagram depicting example signaling flow as per an aspect of an embodiment of the present disclosure.

FIG. 17 shows an example signaling flow for configuring and transmitting UE SPS assistance. In an example embodiment, a base station may transmit one or more RRC messages to configure reporting of UE assistance information. A UE may transmit UE SPS assistance information to a base station indicating that the UE intends to transmit data associated to an SPS configuration. In response, the base station may transmit to the UE an acknowledgement to the UE indication. A UE may provide UE assistance information to a base station for V2X communications. The UE assistance information may include parameters related to SPS traffic and configurations. Triggering of UE assistance information transmission may be left to UE implementation. For instance, the UE may be allowed to report the UE assistance information when change in an estimated periodicity and/or a timing offset of packet arrival occurs.

In an example, a base station may provide one or more SPS configurations for the UE via RRC signaling. SPS configurations may be for transmission of SPS traffic via a downlink, an uplink and/or via a sidelink. When a UE needs to transmit a type of message employing SPS, the UE may report UE SPS assistance information about one or more SPS traffic types to the base station. UE SPS assistance information may indicate at least one of the following SPS assistance parameters for an SPS traffic type. The SPS assistance parameters may indicate at least one of the following: message type, logical channel, traffic/message size, SPS configuration index, traffic type, and/or traffic periodicity. The base station may transmit an SPS transmission grant (e.g. DCI activating an SPS) based on the UE assistance report. The base station may provide an SPS DCI grant for an SPS configuration and SPS radio resources based on the assistance information transmitted by the UE. After receiving the grant, the UE may initialize the corresponding SPS configuration and may transmit the data via the radio resources allocated to the UE. The UE assistance information may enable the base station to determine logical channels and traffic priority and size. The base station may configure/activate the corresponding SPS for the UE. For example, legacy mechanisms do not provide UE SPS assistance information comprising at least one logical channel and other assistance parameters. This improved process enhances SPS transmission efficiency in the uplink.

In an example, multiple SPSs may be activated in parallel. For example, a new service may be triggered while a previous service is on-going. In an example, the UE may transmit an assistance message to the base station indicating new information about new messages (SPS traffic) for transmission. The base station may provide a second SPS transmission grant for transmission of the new service/message(s). The UE may select the second SPS configuration and corresponding resources for transmission of new SPS traffic. In an example, a previous SPS grant and a new SPS grant may continue in parallel.

In an example, a UE may transmit traffic associated with multiple V2X services, which may require different periodicity and packet sizes. The SPS TB size and period may be adapted to different V2X services. Multiple parallel SPS processes may be activated in parallel at the UE. Different SPS processes may differ in the number of allocated resource blocks (RBs) and/or SPS periodicity and may correspond to different types of V2X packets. Once the radio layer of UE receives the V2X packets from a V2X application, the UE may trigger V2X packet transmissions on the corresponding SPS grant. Multiple UL SPS configurations may be configured for a UE.

When configuration of multiple SPSs are required, legacy mechanisms may be extended to support multiple SPSs. The base station may configure different SPS RNTIs for different SPS processes of the UE. SPS activation and release mechanism may be implemented. The base station may trigger which SPS process is activated or released employing at least one or more SPS RNTIs. In an example implementation, in order to support multiple SPS configurations different SPS RNTIs may be configured for different SPS configurations. For example, a first SPS RNTI may be configured for SPS configuration to transmit a first V2X traffic, a second SPS RNTI may be configured for SPS configuration to transmit a second V2X traffic. A base station may transmit one or more RRC messages comprising multiple SPS configuration parameters. The multiple SPS configuration parameters may comprise multiple SPS-RNTI parameters for multiple SPS configurations (e.g. multiple UL SPS configurations). Some of the example embodiments may implement multiple SPS RNTIs, and some may implement a single SPS RNTI.

A UE configured with multiple SPS RNTIs may need to monitor search space of PDCCH for multiple SPS RNTIs. When the number of required SPS configurations increases, this mechanism may increase UE processing requirements and/or power consumption. Extension of legacy mechanisms, for implementation of multiple SPS configurations, increases UE processing requirements and battery power consumption. In an example, a UE may be configured with many SPS configurations (e.g. 4, or 8, etc) for different types of V2X traffic. There is a need to improve SPS configuration and activation/release mechanisms in a base station and wireless device when multiple SPSs are configured. Example embodiments may increase signaling overhead, however the potential benefits outweight the increased overhead when V2X communication is enabled. Example embodiments improve base station and UE implementations, enhance network performance, reduce UE monitoring requirements, and reduce battery power consumption, when multiple SPSs are configured for a given UE for transmission of SPS traffic via an uplink (UL) or a sidelink (SL).

In an example, multiple downlink, uplink, and/or sidelink SPSs may be configured for a cell. In an example, one or more SPS RNTIs may be configured when a plurality of SPSs are configured. In an example, an RRC message may comprise an index identifying an SPS configuration of a cell. In an example, the DCI employing SPS RNTI and triggering an SPS may include the index of the SPS that is triggered (initialized, activated) or released (deactivated). For example, the DCI activating or releasing an uplink SPS corresponding to a V2X SPS traffic may comprise an UL SPS configuration index field (e.g. 3 bits) identifying the SPS configuration corresponding the SPS configuration index. SPS configuration index may indicate the index of one of one or more SL/UL SPS configurations. Using this enhanced mechanism multiple SPSs may be configured using the same SPS RNTI (e.g. for V2X traffic). This may reduce UE battery power consumption and provide flexibility in configuring multiple SPSs.

Figure 14:
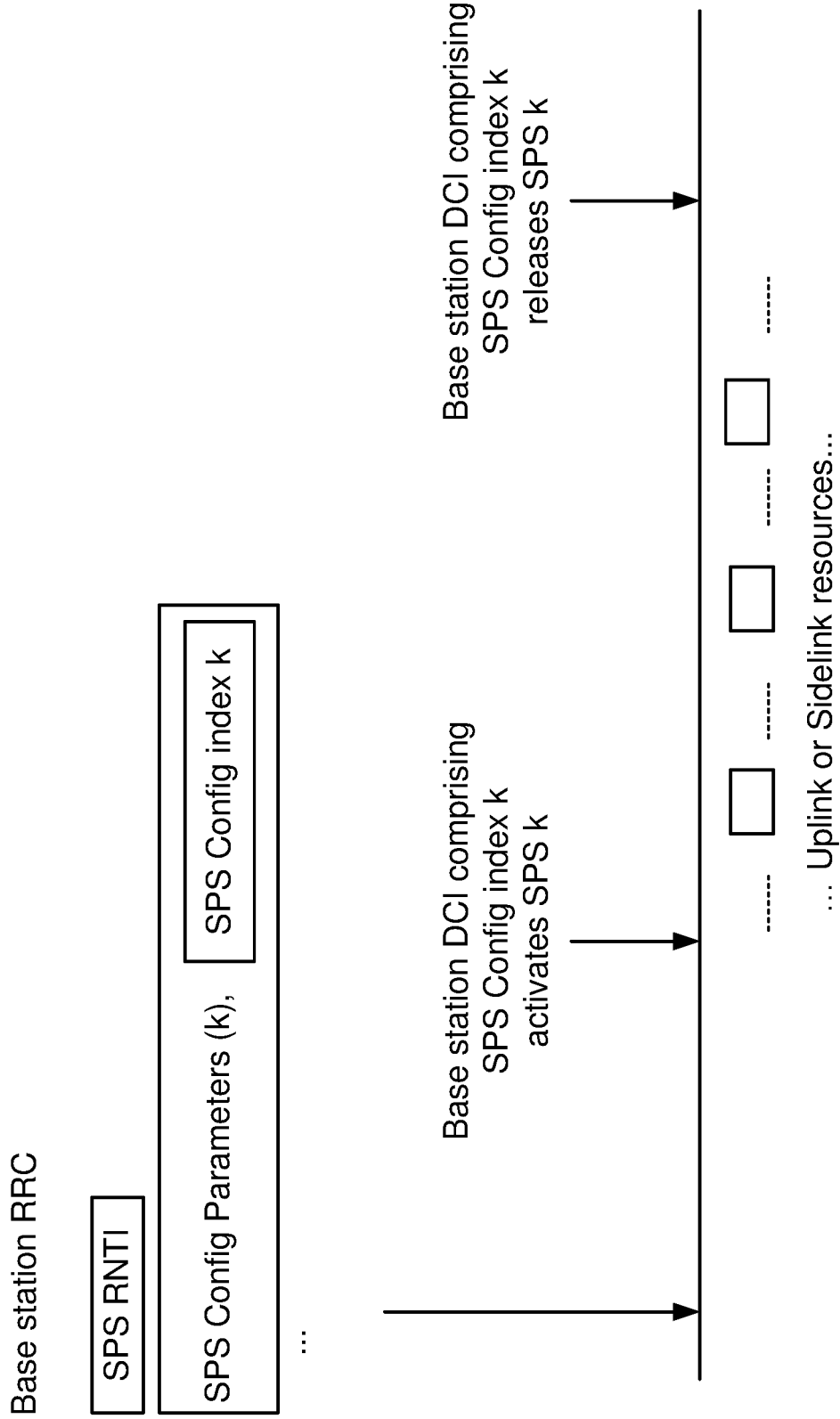
FIG. 14 is an example diagram depicting example RRC configuration and example DCIs as per an aspect of an embodiment of the present disclosure.

In an example embodiment, when one or more SPS grant configurations are configured for a UE, for example, when one or more SPS-ConfigUL and/or SPS-ConfigSL are configured on a cell or when one or more SPS grant configurations are configured within an SPS-ConfigUL and/or SPS-ConfigSL, RRC configuration parameters may comprise an SPS configuration index. One or more uplink SPS configuration parameters may be assigned to (associated with) the same SPS RNTI. Different SPS configurations (e.g. having different SPS periodicity) may be assigned to the same SPS RNTI, and may be identified by different SPS configuration indexes. In an example embodiment, one or more SPS configurations (e.g. multiple periodicity, MCS, and/or other parameters) may be triggered employing the same SPS RNTI, and using different SPS configuration indexes. FIG. 14 shows an example RRC configuration and example DCIs activating and releasing an SPS for an uplink or a sidelink. A similar mechanism may be applied to the downlink.

The example mechanism may be applied to downlink, uplink and/or sidelink SPS configurations. For example, when one or more SPS grant configurations are configured for transmission of various V2X traffic via sidelink by a UE, for example, when one or more SPS configurations are configured for a sidelink of a cell, RRC configuration parameters may comprise an SPS RNTI for the sidelink, and one or more SPS configuration indexes (each associated with a sidelink SPS RRC configuration). One or more uplink SPS configuration parameters may be assigned to (associated with) the same sidelink SPS RNTI for sidelink SPS activation and release. Different SPS configurations (e.g. having different periodicity) may be assigned to the same sidelink SPS RNTI, and may be identified by different SPS configuration indexes. In an example embodiment, one or more sidelink SPS configurations (e.g. multiple periodicity, MCS, and/or other parameters) may be triggered employing the same sidelink SPS RNTI for transmission of SPS V2X traffic via a sidelink.

In an example, SPS-ConfigUL1 may be assigned SPS RNTI and SPS-ConfigIndex1, and SPS-ConfigUL2 may be assigned SPS RNTI and SPS-ConfigIndex2. A base station may transmit one or more RRC messages comprising configuration parameters of one or more cells (e.g. PCell and/or SCell(s)). The configuration parameters may comprise configuration parameters for one or more SPSs. The configuration parameters may comprise the SPS RNTI, SPS-ConfigIndex1 and SPS-ConfigIndex2.

In an example, SPS-ConfigUL IE may comprise an SPS RNTI and an SPS-ConfigIndex1 and an SPS-ConfigIndex2. One or more first SPS configuration parameters may be associated with SPS-ConfigIndex1 and one or more second SPS configuration parameters may be associated with SPS-ConfigIndex2. Example of SPS configuration parameters maybe periodicity, HARQ parameter(s), MCS, grant size, and/or any other SPS configuration parameter presented in RRC SPS configuration. A base station may transmit one or more RRC messages comprising configuration parameters of one or more cells (e.g. PCell and/or SCell(s)). The configuration parameters may include configuration parameters for one or more SPSs. The configuration parameters may comprise the SPS RNTI, SPS-ConfigIndex1 and SPS-ConfigIndex2.

The UE configured with SPS configurations may monitor PDCCH and search for a DCI associated with the SPS RNTI (e.g. scrambled with SPS-RNTI). The base station may transmit a DCI associated to SPS RNTI to the UE to activate or release an SPS grant. The UE may decode a DCI associated with the SPS RNTI. The DCI may comprise one or more fields comprising information about the grant. The DCI may further comprise an SPS configuration index. The SPS configuration index may determine which one of the SPS configurations are activated or released.

Some of example fields in the DCI grants for an SPS in a legacy system is employed. Many of fields are marked by N/A. In an example embodiment, one of the existing fields (e.g. one of the N/A fields), or a new field may be introduced in a DCI for indicating the SPS configuration index. An SPS configuration index field in the DCI may identify which one of the SPS configurations is activated or released. The UE may transmit or receive data according the grant and SPS configuration parameters.

In an example embodiment, a wireless device may receive at least one message comprising: a semi-persistent scheduling (SPS) cell radio network temporary identifier (RNTI); a first SPS configuration parameter(s); a second SPS configuration parameter(s); a first SPS configuration index value associated with the first SPS configuration parameters; and a second SPS configuration index value associated with the second SPS configuration parameters. The wireless device may receive a downlink control information (DCI) associated with the SPS RNTI. The DCI comprises one or more fields of an SPS grant and an SPS configuration index value. The wireless device may transmit/receive SPS traffic on radio resources identified in the SPS grant considering the SPS configuration parameters associated with the SPS configuration index value. The SPS configuration parameter associated with the SPS configuration index may include, for example, SPS periodicity, MCS, radio resource parameters, and/or other SPS parameters included in SPS configurations.

Figure 15:
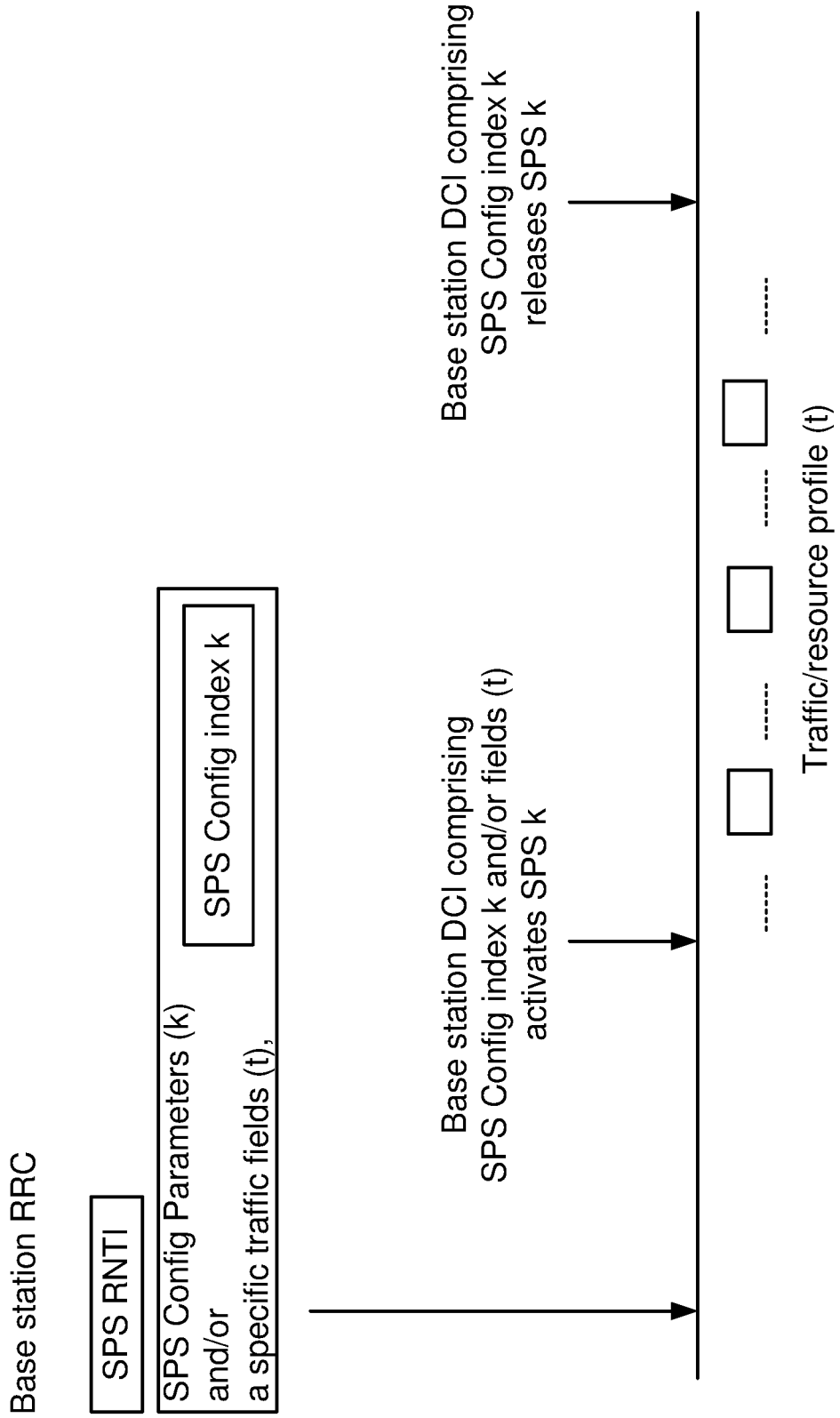
FIG. 15 is an example diagram depicting example RRC configuration and example DCIs as per an aspect of an embodiment of the present disclosure.

In an example embodiment, an SPS grant may be for a specific message type. In current mechanisms, SPS configuration parameters and/or an SPS DCI grant do(es) not comprise information on traffic types associated with the grant. In an example embodiment, a wireless device may receive at least one message comprising: a semi-persistent scheduling (SPS) cell radio network temporary identifier (RNTI); and a sequence of one or more SPS configuration IEs. An SPS configuration IE may comprise SPS configuration parameters, SPS configuration index, and/or one or more fields indicating a traffic/resource profile (e.g. traffic index value) associated with the SPS configuration parameters. The index for the traffic type may be a logical channel identifier, bearer identifier, V2X traffic type identifier, a service type, a radio resource type and/or the like. The one or more fields may also determine a relative priority of the traffic type compared with other traffics. The wireless device may receive a downlink control information (DCI) associated with the SPS RNTI. The DCI may comprise at least one of SPS Config index and/or traffic/resource profile fields. Example embodiments may increase signaling overhead, however the potential benefits outweight the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 15 shows an example SPS configuration and example activation/release DCIs for transmission of various traffic types. When RRC SPS configuration parameters and/or one or more DCI fields indicate traffic/resource profile, the UE may transmit uplink data including the corresponding traffic type in the corresponding SPS grant.

In an example, SPS configurations may include a sequence of various configuration parameters. In an example embodiment, a wireless device may receive at least one message comprising: a semi-persistent scheduling (SPS) cell radio network temporary identifier (RNTI); a sequence of one or more SPS configuration parameters, e.g. periodicities. In an example, each of the one or more SPS configurations parameters (e.g. SPS Config 1E comprising a periodicity IE value) may be associated with an SPS configuration index. The wireless device may receive a downlink control information (DCI) associated with the SPS RNTI. The DCI may comprise one or more fields of an SPS grant (e.g. a first SPS configuration index value). The wireless device may activate (transmit/receive) SPS traffic on radio resources identified in the SPS grant considering the SPS configuration parameters (e.g. associated with the first SPS configuration index value). In an example, the DCI may comprise one or more fields comprising traffic/resource profile parameters.

Figure 16:
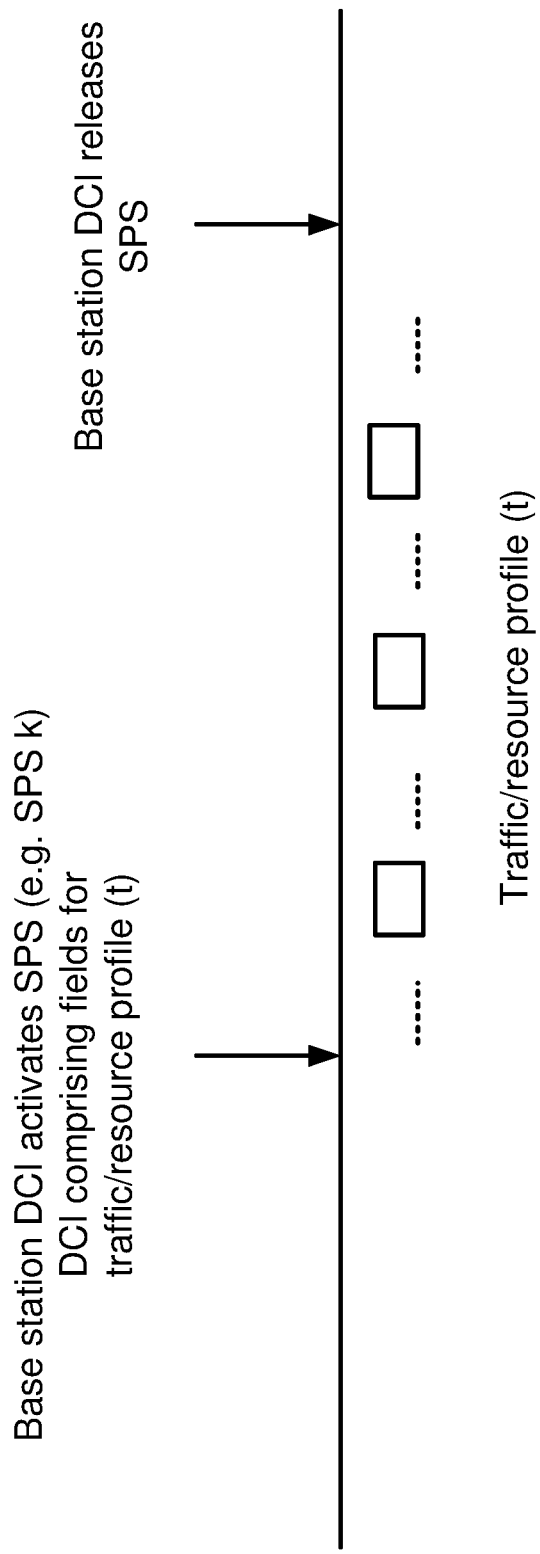
FIG. 16 is an example diagram depicting example DCIs as per an aspect of an embodiment of the present disclosure.

The DCI may comprise one or more fields indicating a traffic/resource profile (e.g. traffic/resource index value) associated with the SPS configuration parameters. The index for the traffic type may be a logical channel identifier, bearer identifier, V2X traffic type identifier, a service type, a radio resource type and/or the like. In an example, the one or more fields may also determine a relative priority of the traffic type compared with other traffics. Example embodiments may increase signaling overhead, however the potential benefits outweight the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 16 shows an example activation/release DCIs for transmission of various traffic types. When one or more DCI fields indicate traffic/resource profile, the UE may transmit uplink data including the corresponding traffic type in the corresponding SPS grant.

Example embodiments may be employed when one or more SPS RNTIs are configured. A given SPS traffic (message type) may be transmitted with various periodicity depending on vehicle speed or other parameters. Example embodiments enable updating SPS grant configuration without the need for reconfiguring SPS grants. Example embodiments may be employed for activation or release of an SPS configuration.

Figure 13:
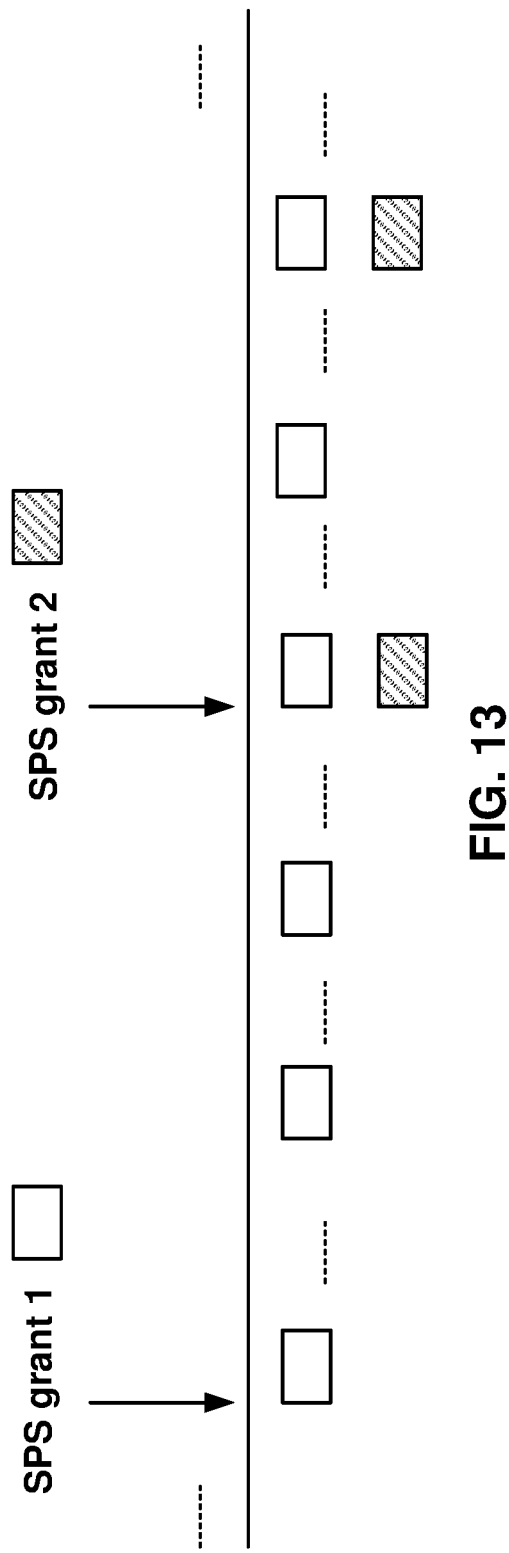
FIG. 13 is an example diagram depicting example multiple parallel SPSs as per an aspect of an embodiment of the present disclosure.

In an example, multiple SPSs may be activated in parallel. For example, a new SPS may be triggered while a previous SPS is on-going. In an example, the UE may transmit to a base station a message comprising assistant information indicating that the UE requires new SPS resources for transmission of new messages. The assistant information may comprise information about at least one SPS traffic type, e.g. logical channel, periodicity, message size, and/or the like. The base station may provide an SPS grant for the new service/message(s). The UE may employ an SPS configuration and a corresponding SPS resources for uplink transmission of a corresponding traffic. In an example, a previous SPS grant and a new SPS grant may be employed in parallel. FIG. 13 shows an example when multiple SPS grants are activated in parallel. A base station may transmit SPS grant 1 in a first subframe for transmission of a first SPS traffic. The base station may transmit SPS grant 2 in a second subframe for transmission of a second SPS traffic. The first SPS grant and the second SPS grant may have different parameters, for example, may comprise different RBs assignments, may have different periodicity, may have different DCI and RRC configuration parameter(s), and/or the like. In an example embodiment, an instance of the first SPS grant and an instance of the second SPS grant may overlap in the same subframe.

In an example embodiment, a base station scheduling mechanism may avoid or reduce the possibility of such a scenario. Such limitation may add additional complexity and constraint on base station scheduling mechanism and may reduce overall spectral efficiency in the uplink. There is a need to implement mechanisms for a UE and/or base station to enhance uplink transmission mechanisms when multiple uplink SPS grants coincide in the same subframe and/or TTI.

In an example embodiment, multiple uplink SPSs are configured on a cell, for example, with different periodicity, or other parameters. In an example, some of the RRC parameters may be the same for various SPS configurations on a cell. For example, when multiple SPSs are configured on a cell, the SPSs may employ the same p0-Persistent, and/or p0-PersistentSubframeSet2-r12 to enable the same uplink power calculation configuration for multiple SPSs on the cell. In an example, some other parameters, such as twoIntervalsConfig, implicitReleaseAfter, and/or MCS (if configured as an RRC parameter) may be the same across more than one SPS configuration. Multiple SPS configurations may have the same common parameters, and have its own SPS specific parameter.

In an example, DCI format 0 may be used for the scheduling of PUSCH in one UL cell. Other DCI formats may be used for downlink or uplink SPS grants. When multiple SPS are activated in parallel, some instances of the SPSs may coincide in the same subframe. The UE may be able to transmit on both grants in the same subframe when some of the transmission parameters are the same across SPS grants. For example, the UE may transmit on multiple grants in the same subframe, when the grants have the same MCS, and/or same hopping pattern. In an example, additional limitations may apply. For example, two grants may need to have the same Cyclic shift for DM RS and OCC index, and/or may need to have adjacent RB assignments. In an example embodiment, a base station scheduling mechanism may consider these constraints when activating parallel SPSs on a cell (for example, when an instance of SPS grants coincides on the same subframe). In an example, parallel transmission based on multiple grants on a subframe may be implemented.

In an example, a UE may aggregate multiple grants in a subframe. For example, the UL PUSCH transmit power may be calculated considering the common RRC configuration parameters, aggregated RBs for both grants, and power control parameters for the cell on the subframe containing both grants. The UE may add the number of RBs in the first grant and the second grant to calculate the number of RBs for uplink transmission. The UE may consider the same MCS for both grants in calculating the power. If the two grants have the same MCS, the MCS may be either MCS of the grants. If the two grants have different MCSs, the UE may consider the more stringent MCS (lower modulation and coding), MCS of the higher priority grant, or one of the two MCS according to a UE implementation rule. The UE may transmit both grants employing the same MCS that is employed for power control calculations. In an example, a MAC TB may be transmitted on the resources assigned in the aggregate of multiple grants. The base station may transmit an ACK for the received TB. In an example, MAC TBs of each grant may be built and transmitted on the associated grant. When multiple TBs are transmitted, the base station may transmit different ACK/NACK for different grants.

In an example, when multiple SPS grants coincide in the same subframe, the UE may calculate the power of each grant separately based on PUSCH power calculation formula. Example PUSCH power calculation method is shown in below. Other example formula and scenarios are described in the Appendix.

$$P_{PUSCH,c}(i) = \min\left\{\begin{array}{c} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{array}\right\}$$

In the event that the sum of the powers of multiple SPS grants in the subframe exceeds PcMAX, the UE may scale the transmit powers so that the sum of the powers is below the PcMAX. In an example, the UE may assign a higher priority to power of one of the grants compared with the other one(s). In an example, the UE may use a predetermined rule to determine the priority, e.g., based on the grant priority, size of the grant, MCS, and/or timing of the grant.

In an example, the UE may calculate the PUSCH power of PUSCH for each grant without considering PcMAX. The UE may add the power of PUSCHs, and when the total power exceeds PcMAX, the UE may employ a scaling rule to scale the transmit powers, so that transmit power on a cell does not exceed PcMAX.

$$P_{PUSCH,c}(i) = \min\left\{\begin{array}{c} P_{CMAX,c}(i), \\ P_{PUSCH,c}(i)_{grant1} + P_{PUSCH,c}(i)_{grant2} \end{array}\right\}$$

In an example, when multiple SPS grants coincide in the same subframe, the UE may employ some of the grant parameters (e.g. MCS, and/or power parameters) of a selected grant (e.g. a grant with a higher priority). In an example, the UE may select one of the grants based on criteria, e.g. the grants that was received first, higher priority grant, larger grant, grant associated with a logical channel with higher priority and/or according to a predefined implementation rule. The UE may use some the parameters of the selected grant for uplink transmission for multiple grants. The UE may calculate the power based on the parameters of the selected grant, e.g. employing the above example methods.

In an example, when multiple SPS grants coincide in the same subframe, the UE may transmit uplink TBs employing a selected grant (e.g. a grant with a higher priority). The UE may drop other grant(s). In an example, the UE may select one of the grants based on criteria, e.g. the grants that was received first, the higher priority grant, the larger grant, grant associated with a logical channel with higher priority and/or according to a predefined implementation rule. The UE may transmit uplink signals employing the selected grant. The UE may drop/ignore other grant(s) and may not transmit uplink signals (TBs) in the other grant(s). The base station may be configured with this rule, and may not expect to receive TBs in a grant that is dropped/ignored.

In an example, when multiple SPS grants coincide in the same subframe n, the UE may transmit uplink TBs employing a selected grant (e.g. a grant with a higher priority) in the subframe n. The UE may shift other grant(s) and employ those grants for subframe n+k, e.g. k=1 (other values fork may also implemented, e.g. k=−1, 2, etc). In an example, the UE may select one of the grants based on criteria, e.g. the grants that was received first, the higher priority grant, the larger grant, and/or according to a predefined implementation rule. The UE may transmit uplink signals in subframe n employing the selected grant. The UE may employ the other grant(s) for subframe n+k, and may transmit uplink signals (TBs) for the other grant(s) in subframe n+k. For example, k=1 for a second grant, and k=2 for a third grant. This mechanism may be preconfigured in the UE and base station, the base station may expect to receive TB(s) for the other grant in subframe n+k, and may not schedule those resources for other UEs.

Example embodiments may be preconfigured in the UE and base station, the base station may expect to receive TB(s) according to the example mechanism. Some of the examples may be combined, and different UEs may implement different example implementations based on UE configuration and/or capability.

In an example, to transmit on the UL-SCH, the MAC entity may need a valid uplink grant except for non-adaptive HARQ retransmissions. In an example, the MAC entity may receive the uplink grant dynamically on the PDCCH or in a Random Access Response. In an example, the uplink grant may be configured semi-persistently. In an example, the MAC layer may receive HARQ information from lower layers. In an example, when the physical layer is configured for uplink spatial multiplexing, the MAC layer may receive up to two grants (one per HARQ process) for the same TTI from lower layers.

In an example, the MAC entity may have a C-RNTI, a Semi-Persistent Scheduling C-RNTI, or a Temporary C-RNTI. The MAC entity may, for a TTI and for a Serving Cell belonging to a TAG that has a running timeAlignmentTimer, receive an uplink grant for the TTI and the Serving Cell on the PDCCH for the MAC entity's C-RNTI or Temporary C-RNTI or the MAC entity may receive an uplink grant for the TTI in a Random Access Response. In an example, if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant, the MAC entity may consider the NDI to have been toggled for the corresponding HARQ process regardless of the value of the NDI. The MAC entity may deliver the uplink grant and the associated HARQ information to the HARQ entity for the TTI.

In an example, the Serving Cell may be the SpCell. An uplink grant for the TTI may be received for the SpCell on the PDCCH of the SpCell for the MAC entity's Semi-Persistent Scheduling C-RNTI and the NDI in the received HARQ information may be 1. The MAC entity may consider the NDI for the corresponding HARQ process not to have been toggled. In an example, the MAC entity may deliver the uplink grant and the associated HARQ information to the HARQ entity for the TTI.

In an example, the Serving Cell may be the SpCell and an uplink grant for the TTI may be received for the SpCell on the PDCCH of the SpCell for the MAC entity's Semi-Persistent Scheduling C-RNTI. The NDI in the received HARQ information may be 0 and PDCCH contents may indicate SPS release. In an example, the MAC entity may clear the configured uplink grant (if any).

In an example, the Serving Cell may be the SpCell. An uplink grant for the TTI may be received for the SpCell on the PDCCH of the SpCell for the MAC entity's Semi-Persistent Scheduling C-RNTI. The NDI in the received HARQ information may be 0 and PDCCH may not indicate SPS release. The MAC entity may store the uplink grant and the associated HARQ information as configured uplink grant. The MAC entity may initialize (if not active) or re-initialize (if already active) the configured uplink grant to start in the TTI and to recur according to the semi-persistent scheduling rules. In an example, if UL HARQ operation is asynchronous, the MAC entity may set the HARQ Process ID to the HARQ Process ID associated with the TTI. The MAC entity may consider the NDI bit for the corresponding HARQ process to have been toggled. The MAC entity may deliver the configured uplink grant and the associated HARQ information to the HARQ entity for the TTI.

In an example, the Serving Cell may be the SpCell and an uplink grant for the TTI may be configured for the SpCell. In an example, if UL HARQ operation is asynchronous, the MAC entity may set the HARQ Process ID to the HARQ Process ID associated with the TTI. The MAC entity may consider the NDI bit for the corresponding HARQ process to have been toggled. The MAC entity may deliver the configured uplink grant, and the associated HARQ information to the HARQ entity for the TTI. In an example, the period of configured uplink grants may be expressed in TTIs.

In an example, the MAC entity may receive both a grant in a Random Access Response and a grant for its C-RNTI or Semi persistent scheduling C-RNTI requiring transmissions on the SpCell in the same UL subframe. The MAC entity may choose to continue with either the grant for its RA-RNTI or the grant for its C-RNTI or Semi persistent scheduling C-RNTI.

In an example, when a configured uplink grant is indicated during a measurement gap and indicates an UL-SCH transmission during a measurement gap, the MAC entity may process the grant but may not transmit on UL-SCH. When a configured uplink grant is indicated during a Sidelink Discovery gap for reception and indicates an UL-SCH transmission during a Sidelink Discovery gap for transmission with a SL-DCH transmission, the MAC entity may process the grant but may not transmit on UL-SCH.

In the legacy SPS procedures (as specified in 3GPP TS 36.321 v13.2 2016-6), for configured uplink grants, the HARQ Process ID associated with this TTI may be derived from the following equation for asynchronous UL HARQ operation: HARQ Process ID=[floor(CURRENT_TTI/semiPersistSchedIntervalUL)] modulo numberOfConfUlSPS-Processes, where CURRENT_TTI=[(SFN*10)+subframe number] and it may refer to the subframe where the first transmission of a bundle takes place.

In an example, there may be one HARQ entity at the MAC entity for a Serving Cell with configured uplink, which may maintain a number of parallel HARQ processes allowing transmissions to take place continuously while waiting for the HARQ feedback on the successful or unsuccessful reception of previous transmissions.

In an example, there may be fixed maximum number of parallel HARQ processes per HARQ entity. In an example, NB-IoT may have one UL HARQ process. In an example, when the physical layer is configured for uplink spatial multiplexing, there may be two HARQ processes associated with a given TTI. Otherwise there may be one HARQ process associated with a given TTI.

At a given TTI, if an uplink grant is indicated for the TTI, the HARQ entity may identify the HARQ process(es) for which a transmission may take place. In an example, the HARQ entity may route the received HARQ feedback (ACK/NACK information), MCS and resource, relayed by the physical layer, to the appropriate HARQ process(es).

In an example asynchronous HARQ operation, a HARQ process may be associated with a TTI based on the received UL grant except for UL grant in RAR. In an example, except for NB-IoT, an asynchronous HARQ process may be associated with a HARQ process identifier. For UL transmission with UL grant in RAR, HARQ process identifier 0 may be used. HARQ feedback may not be applicable for asynchronous UL HARQ.

In an example, when TTI bundling is configured, the parameter TTI_BUNDLE_SIZE may provide the number of TTIs of a TTI bundle. TTI bundling operation may rely on the HARQ entity for invoking the same HARQ process for a transmission that is part of the same bundle. In an example, within a bundle, HARQ retransmissions may be non-adaptive and may be triggered without waiting for feedback from previous transmissions according to TTI_BUNDLE_SIZE. The HARQ feedback of a bundle may be received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle may also be a TTI bundle. TTI bundling may not be supported when the MAC entity is configured with one or more SCells with configured uplink. In an example, uplink HARQ operation may be asynchronous for NB-IoT UEs, BL UEs or UEs in enhanced coverage except for the repetitions within a bundle.

In an example, for a TTI, the HARQ entity may identify the HARQ process(es) associated with the TTI. For an identified HARQ process, an uplink grant may be indicated for the process and the TTI. In an example, the received grant may not be addressed to a Temporary C-RNTI on PDCCH. In an example, the NDI provided in the associated HARQ information may be toggled compared to the value in the previous transmission of this HARQ process. If the uplink grant is received on PDCCH for the C-RNTI and the HARQ buffer of the identified process is empty; or if the uplink grant was received in a Random Access Response, if there is a MAC PDU in the Msg3 buffer and the uplink grant was received in a Random Access Response: the MAC entity may obtain the MAC PDU to transmit from the Msg3 buffer and otherwise, the MAC entity may obtain the MAC PDU to transmit from the Multiplexing and assembly entity. The MAC entity may deliver the MAC PDU and the uplink grant and the HARQ information to the identified HARQ process; an dinstruct the identified HARQ process to trigger a new transmission. Otherwise, the MAC entity may deliver the uplink grant and the HARQ information (redundancy version) to the identified HARQ process; and instruct the identified HARQ process to generate an adaptive retransmission.

For a TTI, the HARQ entity may identify the HARQ process(es) associated with the TTI, and for an identified HARQ process, if an uplink grant has not been indicated for the process and the TTI, and if the HARQ buffer of this HARQ process is not empty, the MAC entity may instruct the identified HARQ process to generate a non-adaptive retransmission. In an example, a HARQ process may be associated with a HARQ buffer.

In an example, new transmissions may be performed on the resource and with the MCS indicated on PDCCH or Random Access Response. Adaptive retransmissions may be performed on the resource and, if provided, with the MCS indicated on PDCCH. Non-adaptive retransmission may be performed on the same resource and with the same MCS as was used for the last made transmission attempt. In an example, for asynchronous HARQ operation, UL retransmissions may be triggered by adaptive retransmission grants, except for retransmissions within a bundle.

Implementation of the current SPS mechanisms and HARQ procedures when multiple SPS configurations are supported may result in errors in HARQ retransmissions and inefficient use of HARQ process IDs. There is a need to improve the HARQ process when multiple SPSs are configured. Example embodiments improve uplink transmission efficiency and throughput when multiple SPSs are configured.

In an example embodiment, an eNB may transmit to a UE at least one RRC message comprising configuration parameters of one or more cells. The configuration parameters may comprise SPS configuration parameters. SPS configuration parameters may comprise an offset for an SPS configuration. In an example, a SPS configuration may be assigned HARQ Process ID offset.

Figure 18:
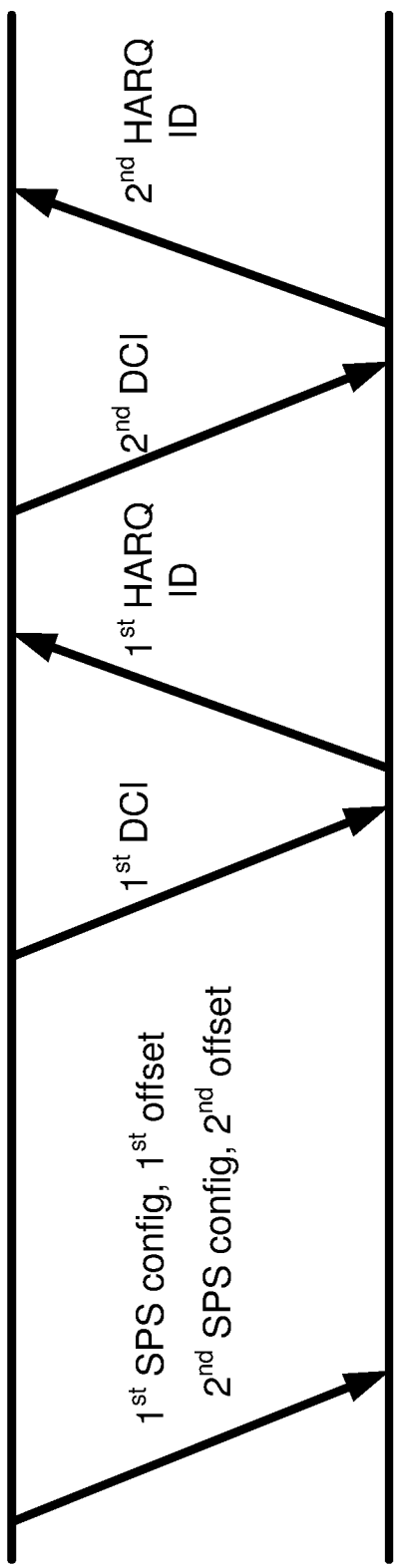
FIG. 18 is an example procedure for determining HARQ process identifier as per an aspect of an embodiment of the present disclosure.

In an example embodiment, eNB may configure with RRC a parameter that indicates HARQ Process ID offset (e.g., HARQProcessIDOffset) for a SPS on a serving cell. RRC may configure other SPS parameters, e.g., SemiPersistentIntervalUL, numberOfConfUlSPS-Processes, implicitReleaseAfter, p0-Persistent, twoIntervalConfig, etc. for the SPS on the serving cell. In an example, some of the SPS parameters may be common among the configured SPSs (on a serving cell and/or across the serving cells) and some may be configured for one or more of the configured SPSs (e.g., a single SPS). In an example, for configured uplink grants of an SPS on a serving cell, the HARQ Process ID associated with this TTI may be derived from the following equation for asynchronous UL HARQ operation: HARQ Process ID=[floor(CURRENT_TTI/semiPersistSchedIntervalUL)] modulo numberOfConfUlSPS-Processes+HARQProcessIDOffset where CURRENT_TTI=[(SFN*10)+subframe number] and it may refer to the subframe where the first transmission of a bundle takes place. The parameters semiPersistSchedIntervalUL, numberOfConfUlSPS-Processes and HARQProcessIDOffset may be RRC configured for the SPS on the serving cell. Other equations may be used to derive the HARQ Process ID using a HARQ Process ID offset parameter. An example procedure is shown in FIG. 18. The wireless device receives configuration parameters for a first SPS and a second SPS. The configuration parameters for the first SPS may comprise a first HARQ process offset value. The configuration parameters for the second SPS may comprise a second HARQ process offset value. The wireless device may receive a first DCI activating the first SPS and a second DCI activating the second SPS. The wireless device may determine a first HARQ process ID associated with a first transmission corresponding to the first SPS at least based on the first HARQ process offset value. The wireless device may determine a second transmission associated with the second SPS at least based on the second HARQ process offset value.

In an example, an eNB may configure two SPSs for a UE on a serving cell and may configure the values of numberOfConfUlSPS-Processes and HARQProcessIDOffset as 2 and 0 respectively for the first SPS. The eNB may configure the values of numberOfConfUlSPS-Processes and HARQProcessIDOffset as 3 and 2 respectively for the second SPS. The HARQ Process IDs for the configured uplink grants of the first SPS take the values 0, 1, 0, 1, 0, 1, 0, 1, . . . consecutively in their associated TTIs and the HARQ Process IDs for the configured uplink grants of the second SPS take the values 2, 3, 4, 2, 3, 4, 2, 3, 4, . . . consecutively in their associated TTIs.

In an example, a method may be used that comprises receiving, by a wireless device, at least one message comprising configuration parameters of one or more semi-persistent scheduling (SPS) grants. The at least one message may be one or more RRC messages. The configuration parameters may comprise one or more plurality HARQ identifier (IDs) offsets comprising a HARQ process identifier offset for an SPS grant; The HARQ process identifier offset may take integer values between 0 and a maximum value. The method may comprise receiving by the wireless device a DCI indicating the SPS grant. The wireless device may validate DCI as SPS grant using a SPS PDCCH validation procedure. The method may comprise transmitting a first transport block (TB) associated with a first HARQ procedure with a first HARQ process identifier equal to an initial value modulo a number of HARQ processes plus the HARQ process identifier offset; and transmitting a second TB subsequent to the first transport block in resources of the SPS grant, the second TB associated with a second HARQ procedure with a second HARQ process identifier equal to a second value modulo the number of HARQ processes plus the HARQ process identifier offset, and the second value may be equal to an increment of the first value.

In an example embodiment, an eNB may transmit to a UE at least one RRC message comprising configuration parameters of one or more cells. The configuration parameters may comprise SPS configuration parameters. SPS configuration parameters may comprise parameters for a sequence of SPS grant configurations.

In an example embodiment, an eNB may configure with RRC a sequence of SPS grant configurations. SPS grant configurations may be ordered (e.g. sequentially). An SPS grant may implicitly (e.g. based on the order in the sequence, based on the order of RNTI values, or based on other SPS related parameters) or explicitly (e.g., using configuration parameters, e.g. SPSSeqID) indicate a SPS sequence ID for a SPS on a serving cell. RRC may configure other SPS parameters, e.g., SemiPersistentIntervalUL, numberOfConfUlSPS-Processes, implicitReleaseAfter, p0-Persistent, twoIntervalConfig, etc. for the SPS on the serving cell. In an example, some of the SPS parameters may be common among the configured SPSs (on a serving cell and/or across the serving cells) and some may be configured for one or more of the configured SPSs (e.g., a single SPS).

In an example, the UE may derive HARQ Process ID offset for a SPS. The HARQ process ID offset may be calculated by the UE according to a pre-defined rule. In an example, the HARQ process ID offset may be calculated as sum of numberOfConfUlSPS-Processes for the SPSs configured on the serving cell with smaller SPS sequence ID (or preceding in order according to other ordered parameters). In an example, the HARQ Process ID Offset for a SPS configured on a serving cell with SPS Sequence ID (or order) 3 may be sum of numberOfConfUlSPS-Processes for the SPSs configured on the serving cell with SPS Sequence IDs (or order) less than 3. SPS sequence IDs may start from zero or one. In an example, for configured uplink grants of an SPS on a serving cell, the HARQ Process ID associated with this TTI may be derived from the following equation for asynchronous UL HARQ operation:

$$\text{HARQ Process ID} = [\text{floor}(\text{CURRENT\_TTI}/\text{semiPersistSchedIntervalUL})] \text{ modulo numberOfConfUlSPS-Processes} + \text{HARQ Process ID Offset}$$

where CURRENT_TTI=[(SFN*10)+subframe number] and it may refer to the subframe where the first transmission of a bundle takes place. The parameters semiPersistSchedIntervalUL, numberOfConfUlSPS-Processes may be RRC configured for the SPS on the serving cell and HARQ Process ID Offset may be derived by the UE. Other equations may be used to derive the HARQ Process ID using a HARQ Process ID offset parameter.

In an example, eNB may configure two SPSs for a UE on a serving cell and may configure the values of numberOfConfUlSPS-Processes as 2 and 3 for the first and second SPS respectively. In an example, eNB may implicitly (e.g. based on the order in the sequence, based on the order of RNTI values, or based on other SPS related parameters) or explicitly (e.g., using an RRC configuration parameter, e.g., SPSSeqID) indicate and/or configure SPS sequence ID for the first and second SPS as 1 and 2 respectively. The UE may derive the HARQ Process ID offset for the first SPS as 0 and the HARQ Process ID offset for the second SPS as 2. The HARQ Process IDs for the configured uplink grants of the first SPS take the values 0, 1, 0, 1, 0, 1, 0, 1, . . . consecutively in their associated TTIs and the HARQ Process IDs for the configured uplink grants of the second SPS take the values 2, 3, 4, 2, 3, 4, 2, 3, 4, . . . consecutively in their associated TTIs.

In an example, a method may be used that comprises receiving, by a wireless device, at least one message comprising configuration parameters of a sequence of one or more semi-persistent scheduling (SPS) grants. The at least one message may be one or more RRC messages. The configuration parameters may comprise one or more number HARQ processes comprising a number HARQ process for an SPS grant. The method may comprise receiving a DCI indicating the SPS grant. The wireless device may validate DCI as SPS grant using a SPS PDCCH validation procedure. The method may comprise transmitting a first transport block (TB) associated with a first HARQ procedure with a first HARQ process identifier equal to an initial value modulo a number of HARQ processes plus a HARQ process identifier offset, the HARQ process identifier offset being calculated by the wireless device; and transmitting a second TB subsequent to the first transport block in resources of the SPS grant, the second TB associated with a second HARQ procedure with a second HARQ process identifier equal to a second value modulo the number of HARQ processes plus the HARQ process identifier offset, and the second value may be equal to an increment of the first value.

In an example, the HARQ process identifier offset in the above method may be calculated employing at least one of the one or more number HARQ processes for a second SPS grant. In an example, the HARQ process identifier offset for the nth SPS grant may be calculated as sum of the number of HARQ processes of first up to (n−1)th SPS grant.

In an example, in the above method, the HARQ process identifier offset may be zero for a first SPS grant.

In an example embodiment, an eNB may transmit to a UE at least one RRC message comprising configuration parameters of one or more cells. The configuration parameters may comprise SPS configuration parameters. SPS configuration parameters may comprise parameters for one or more SPS grant configurations. In an example, RRC may configure SPS parameters, e.g., SemiPersistentIntervalUL, numberOfConfUlSPS-Processes, implicitReleaseAfter, p0-Persistent, twoIntervalConfig, etc. for a SPS on the serving cell. In an example, some of the SPS parameters may be common among the configured SPSs (on a serving cell and/or across the serving cells) and some may be configured for one or more of the configured SPSs (e.g., a single SPS).

Figure 19:
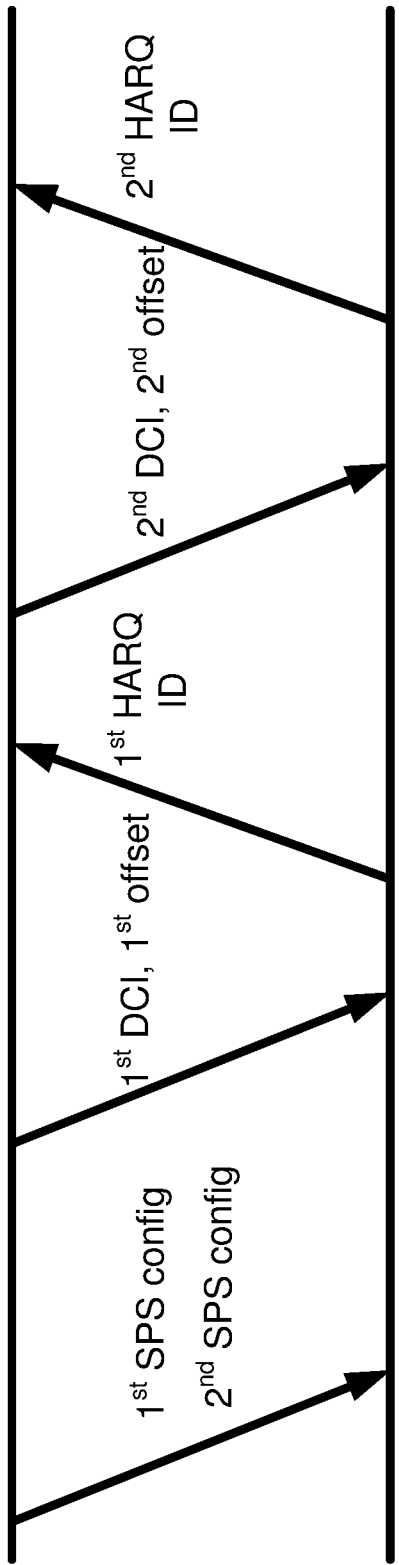
FIG. 19 is an example procedure for determining HARQ process identifier as per an aspect of an embodiment of the present disclosure.

In an example, eNB may indicate the HARQ Process ID offset in the DCI that initializes a SPS on a serving cell. In an example, a field in the DCI that initializes the SPS (e.g., DCI format 0) may be reserved to explicitly indicate the HARQ Process ID Offset for the SPS. In an example, one of the existing fields in the DCI that initializes the SPS (e.g., 'Modulation and coding scheme and redundancy version' or 'TPC command' or 'Cyclic shift for DMRS and OCC index' or another field) may be reused to indicate the HARQ Process ID Offset. An example procedure is shown in FIG. 19. The wireless device receives configuration parameters for a first SPS and a second SPS. The wireless device may receive a first DCI activating the first SPS and a second DCI activating the second SPS. The first DCI may indicate a first HARQ process offset value. The second DCI may indicate a second HARQ process offset value. The wireless device may determine a first HARQ process ID associated with a first transmission corresponding to the first SPS at least based on the first HARQ process offset value. The wireless device may determine a second transmission associated with the second SPS at least based on the second HARQ process offset value.

In an example, for configured uplink grants of an SPS on a serving cell, the HARQ Process ID associated with this TTI may be derived from the following equation for asynchronous UL HARQ operation:

HARQ Process ID=[floor(CURRENT_TTI/semiPersistSchedIntervalUL)] modulo numberOfConfUlSPS-Processes+HARQ Process ID Offset where CURRENT_TTI=[(SFN*10)+subframe number] and it may refer to the subframe where the first transmission of a bundle takes place. The parameters semiPersistSchedIntervalUL, numberOfConfUlSPS-Processes may be RRC configured for the SPS on the serving cell and HARQ Process ID Offset may be indicated to the UE by the DCI that initializes the SPS. Other equations may be used to derive the HARQ Process ID using a HARQ Process ID offset parameter.

In an example, eNB may configure two SPSs for a UE on a serving cell and may configure the values of numberOfConfUlSPS-Processes as 2 and 3 for the first and second SPS respectively. In an example, eNB may indicate in the DCIs that initializes the first and second SPS the HARQ process ID offset values as 0 and 2 respectively. The HARQ Process IDs for the configured uplink grants of the first SPS take the values 0, 1, 0, 1, 0, 1, 0, 1, . . . consecutively in their associated TTIs and the HARQ Process IDs for the configured uplink grants of the second SPS take the values 2, 3, 4, 2, 3, 4, 2, 3, 4, . . . consecutively in their associated TTIs.

In an example, a method may be used that comprises receiving, by a wireless device, at least one message comprising configuration parameters of one or more semi-persistent scheduling (SPS) grants. The at least one message may be one or more RRC messages. The configuration parameters may comprise one or more number HARQ processes comprising a number HARQ process for an SPS grant. The method may comprise receiving a DCI indicating the SPS grant. The wireless device may validate DCI as SPS grant using a SPS PDCCH validation procedure. In an example, DCI format 0 may be used to indicate the SPS grant. The DCI grant may comprise a HARQ Process ID offset. In an example, one of the existing fields in the DCI (e.g., 'Modulation and coding scheme and redundancy version' or 'TPC command' or 'Cyclic shift for DMRS and OCC index' or another field) may be reused to indicate the HARQ Process ID Offset. The method may comprise transmitting a first transport block (TB) associated with a first HARQ procedure with a first HARQ process identifier equal to an initial value modulo the number HARQ Process plus the HARQ process identifier offset; and transmitting a second TB subsequent to the first transport block in resources of the SPS grant, the second TB associated with a second HARQ procedure with a second HARQ process identifier equal to a second value modulo the number HARQ Process plus the HARQ process identifier offset, and the second value may be equal to an increment of the first value.

In an example embodiment, an eNB may transmit to a UE at least one RRC message comprising configuration parameters of one or more cells. The configuration parameters may comprise SPS configuration parameters. SPS configuration parameters may comprise parameters for one or more SPS grant configurations.

In an example embodiment, eNB may configure with RRC (or a UE maybe pre-configured with) a set of possible HARQ Process ID offset values for a SPS on a serving cell (or a common set that may be used for one or more SPSs on a serving cell or a common set that may be used for SPSs across serving cells). RRC may configure other SPS parameters, e.g., SemiPersistentIntervalUL, numberOfConfUl-SPS-Processes, implicitReleaseAfter, p0-Persistent, twoIntervalConfig, etc. for the SPS on the serving cell. In an example, some of the SPS parameters may be common among the configured SPSs (on a serving cell and/or across the serving cells) and some may be configured for one or more of the configured SPSs (e.g., a single SPS). In an example, the DCI that initializes the SPS (e.g., DCI format 0) may indicate the HARQ Process ID offset for a SPS by pointing to one of the values in the configured set of possible HARQ Process ID offset values for the SPS. In an example, one of the existing fields in the DCI that initializes the SPS (e.g., 'Modulation and coding scheme and redundancy version' or 'TPC command' or 'Cyclic shift for DMRS and OCC index' or another field) may be reused to point to one of the values in the set of possible HARQ Process ID Offset values.

In an example, for configured uplink grants of an SPS on a serving cell, the HARQ Process ID associated with this TTI may be derived from the following equation for asynchronous UL HARQ operation:

HARQ Process ID=[floor(CURRENT_TTI/semiPersistSchedIntervalUL)] modulo numberOfConfUlSPS-Processes+HARQ Process ID Offset where CURRENT_TTI=[(SFN*10)+subframe number] and it may refer to the subframe where the first transmission of a bundle takes place. The parameters semiPersistSchedIntervalUL, numberOfConfUlSPS-Processes may be RRC configured for the SPS on the serving cell and HARQ Process ID Offset may be indicated to the UE by the DCI that initializes the SPS by pointing to one of the RRC configured set of possible HARQ Process ID offset values. Other equations may be used to derive the HARQ Process ID using a HARQ Process ID offset parameter.

In an example, eNB may configure two SPSs for a UE on a serving cell and may configure the values of numberOfConfUlSPS-Processes as 2 and 3 for the first and second SPS respectively. The eNB may RRC configure the sets of possible HARQ process ID offset values for the first and second SPS as {0, 2} and {0, 2, 4} respectively. Other sets may be configured or a common set may be configured for both SPSs. In an example, eNB may indicate, in the DCIs that initializes the first and second SPS, the HARQ process ID offset values as 0 and 2 respectively by pointing to the first value in the first set in the first DCI and second value in the second set in the second DCI. The HARQ Process IDs for the configured uplink grants of the first SPS take the values 0, 1, 0, 1, 0, 1, 0, 1, . . . consecutively in their associated TTIs and the HARQ Process IDs for the configured uplink grants of the second SPS take the values 2, 3, 4, 2, 3, 4, 2, 3, 4, . . . consecutively in their associated TTIs.

In an example, a method may be used that comprises receiving, by a wireless device, at least one message comprising configuration parameters of one or more semi-persistent scheduling (SPS) grants. The at least one message may be one or more RRC messages. The configuration parameters may comprise one or more number HARQ processes comprising a number HARQ process for an SPS grant; one or more sets of possible HARQ process ID offsets comprising the set of possible HARQ process ID offset for the SPS grant. The method may comprise receiving a DCI indicating the SPS grant. The wireless device may validate DCI as SPS grant using a SPS PDCCH validation procedure. In an example, DCI format 0 may be used to indicate the SPS grant. The DCI grant may comprise a pointer to one of the values in the set of possible HARQ process ID offsets that indicates a HARQ process ID offset for the SPS grant. In an example, one of the existing fields in the DCI (e.g., 'Modulation and coding scheme and redundancy version' or 'TPC command' or 'Cyclic shift for DMRS and OCC index' or another field) may be reused to point to one of the values in the set of possible HARQ Process ID Offsets. The method may comprise transmitting a first transport block (TB) associated with a first HARQ procedure with a first HARQ process identifier equal to an initial value modulo the number HARQ Process plus the HARQ process identifier offset; and transmitting a second TB subsequent to the first transport block in resources of the SPS grant, the second TB associated with a second HARQ procedure with a second HARQ process identifier equal to a second value modulo the number HARQ Process plus the HARQ process identifier offset, and the second value may be equal to an increment of the first value.

In an example embodiment, an eNB may transmit to a UE at least one RRC message comprising configuration parameters of one or more cells. The configuration parameters may comprise SPS configuration parameters. SPS configuration parameters may comprise parameters for one or more SPS grant configurations.

In an example embodiment, eNB may configure with RRC SPS configuration parameters, e.g., SemiPersistentIntervalUL, numberOfConfUlSPS-Processes, implicitReleaseAfter, p0-Persistent, twoIntervalConfig, etc. for the SPS on the serving cell. In an example, some of the SPS parameters may be common among the configured SPSs (on a serving cell and/or across the serving cells) and some may be configured for one or more of the configured SPSs (e.g., a single SPS). In an example, eNB may configure with RRC a set of HARQ processes for a SPS: {Process_0, Process_1, . . . , Process_(K−1)} where K=numberOfConfUlSPS-Processes and the set of HARQ processes may for a SPS may be consecutive or non-consecutive. In an example, RRC may configure disjoint sets for different configured SPSs.

In an example, for configured uplink grants of an SPS on a serving cell, the HARQ Process ID associated with this TTI may be the ith process in the configured set of HARQ Processes for the SPS (e.g., Process_i) where i=[floor(CURRENT_TTI/semiPersistSchedIntervalUL)] modulo numberOfConfUlSPS-Processes, and CURRENT_TTI=[(SFN*10)+subframe number] and it may refer to the subframe where the first transmission of a bundle takes place. The parameters semiPersistSchedIntervalUL, numberOfConfUlSPS-Processes may be RRC configured for the SPS on the serving cell.

In an example, eNB may configure two SPSs for a UE on a serving cell and may configure the values of numberOfConfUlSPS-Processes as 2 and 3 for the first and second SPS respectively and the sets of HARQ process IDs as {0, 1} and {2, 3, 4} for the first and second SPS respectively. The HARQ Process IDs for the configured uplink grants of the first SPS take the values 0, 1, 0, 1, 0, 1, . . . consecutively in their associated TTIs and the HARQ Process IDs for the configured uplink grants of the second SPS take the values 2, 3, 4, 2, 3, 4, 2, 3, 4, . . . consecutively in their associated TTIs.

In an example, a method may be used that comprises receiving, by a wireless device, at least one message comprising configuration parameters of one or more semi-persistent scheduling (SPS) grants. The at least one message may be one or more RRC messages. The configuration parameters may comprise one or more number HARQ processes comprising a number HARQ process for an SPS grant; one or more sets of HARQ process IDs comprising the set of HARQ process IDs for the SPS grant. The method may comprise receiving a DCI indicating the SPS grant. The wireless device may validate DCI as SPS grant using a SPS PDCCH validation procedure. In an example, DCI format 0 may be used to indicate the SPS grant. The method may comprise transmitting a first transport block (TB) associated with a first HARQ procedure with a first HARQ process identifier equal to the nth element of the set of HARQ Processes for the SPS grant and the value of n is equal to a first value modulo the number HARQ Process; transmitting a second transport block (TB) associated with a second HARQ procedure with a second HARQ process identifier equal to the mth element of the set of HARQ Processes for the SPS grant and the value of m is equal to a second value modulo the number HARQ Process, and the second value is an increment of the first value.

In an example embodiment, an eNB may transmit to a UE at least one RRC message comprising configuration parameters of one or more cells. The configuration parameters may comprise SPS configuration parameters. SPS configuration parameters may comprise parameters for one or more SPS grant configurations.

In an example embodiment, eNB may configure with RRC SPS configuration parameters, e.g., SemiPersistentIntervalUL, numberOfConfUlSPS-Processes, implicitReleaseAfter, p0-Persistent, twoIntervalConfig, etc. for the SPS on the serving cell. In an example, some of the SPS parameters may be common among the configured SPSs (on a serving cell and/or across the serving cells) and some may be configured for one or more of the configured SPSs (e.g., a single SPS). In an example, eNB may configure with RRC a parameter that indicates total number of UL SPS processes on a serving cell for the SPSs configured on the serving cell (e.g., maxULSPSProcess). In an example, HARQ Processes 0, 1, . . . , maxULSPSProcess−1 may be sequentially assigned to consecutive SPS transmissions where the SPS transmissions may correspond to the same or different SPS configurations. In an example, an SPS HARQ ID offset may be configured (e.g. via RRC) and HARQ process IDs for SPS transmissions may start from the offset value instead of starting from zero (e.g. offset, . . . , maxULSPSProcess−1+offset).

The UE may sequentially increase the HARQ Process ID for SPS transmissions and set the HARQ Process ID for the nth SPS transmission as follows: HARQ Process ID (n)= (HARQ Process ID (n−1)+1) modulo maxULSPSProcess where HARQ Process ID (n−1) and HARQ Process ID (n) are the HARQ process IDs used for the (n−1)th and nth SPS transmission respectively and the (n−1)th and nth SPS transmissions may correspond to the same or different SPS configurations.

In an example, a similar equation may be implemented: HARQ Process ID (i)=(HARQ Process ID (i−1)+delta_i) modulo maxULSPSProcess wherein i is a subframe number, and delta_i may be 1 when SPS is transmitted in the subframe and zero when no SPS grant is in the subframe i. SPS transmissions may correspond to the same or different SPS configurations. HARQ Process ID (i) may be applicable if there is an SPS grant in subframe i.

Figure 20:
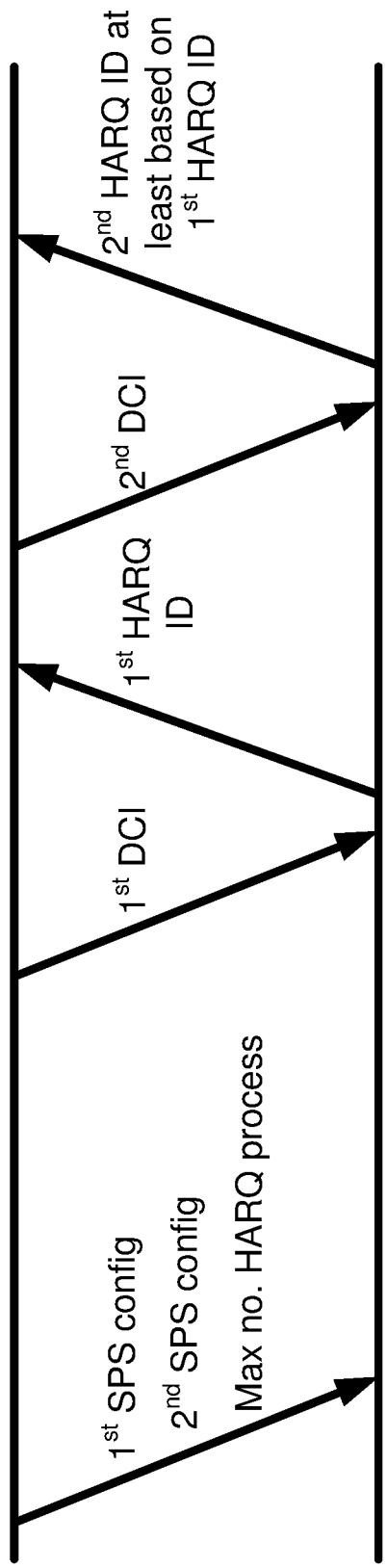
FIG. 20 is an example procedure for determining HARQ process identifier as per an aspect of an embodiment of the present disclosure.

An example procedure is shown in FIG. 20. A wireless device may receive one or more messages comprising configuration parameters for a first SPS, configuration parameters for a second SPS and a maximum number of uplink HARQ processes shared among the first SPS and the second SPS. The wireless device may receive a first DCI activating the first SPS. The wireless device may determine a first HARQ process ID corresponding to a first transmission associated with the first SPS. The wireless device may receive a second DCI activating the second SPS. The wireless device may determine a second HARQ process ID corresponding to a second transmission associated with the second SPS. The second HARQ process ID may be based, at least in part, on the first HARQ process ID.

In an example, HARQ Process ID may be started with 0 (e.g., HARQ Process ID (0)=0) when a first SPS of one or more SPS grants are activated. In an example, HARQ Process ID may continue to sequentially increase using the above equation after a new SPS is activated or an existing SPS is released. In an example, when all of the activated SPSs are released, the HARQ Process ID may reset and start from 0 for a transmission of the next SPS activation. In an example, when all of the activated SPSs are either released or RRC updates their configuration (e.g., updates the Semi-PersistentIntervalUL), the HARQ Process ID may reset and start from 0 for the next SPS transmission.

In an example, eNB may configure and initialize three SPSs for a UE on a serving cell and may configure maxUL-SPSProcess as 4. The HARQ Process IDs for the configured uplink grants may take values 0, 1, 2, 3, 0, 1, 2, 3, 0, 1, 2, 3, . . . independent of which SPS configuration a configured uplink grant belongs to.

In an example, a method may be used that comprises receiving, by a wireless device, at least one message comprising configuration parameters of one or more semi-persistent scheduling (SPS) grants. The at least one message may be one or more RRC messages. The configuration parameters may comprise a maximum number of HARQ process for SPS transmissions on a serving cell. The method may comprise receiving one or more DCIs indicating one or more SPS grants. The wireless device may validate a DCI as SPS grant using a SPS PDCCH validation procedure. In an example, DCI format 0 may be used to indicate the SPS grant. The method may comprise transmitting a first transport block (TB) associated with a first HARQ procedure with a first HARQ process identifier; transmitting a second transport block (TB) associated with a second HARQ procedure with a second HARQ process identifier equal to the first HARQ process identifier plus one modulo the maximum number of HARQ process for SPS transmissions.

In an example, in the above method, the HARQ process identifier for the first SPS transmission may be equal to 0. In an example, in the above method, the HARQ process identifiers for consecutive SPS transmissions may continue to sequentially increase after a new SPS is activated or an existing SPS is released. In an example, in the above method, when the activated SPSs are released, the HARQ Process identifier may reset and start from 0 for the next SPS transmission. In an example, in the above method, when the activated SPSs are either released or RRC updates their configuration, the HARQ Process ID may reset and start from 0 for the next SPS transmission.

In an example embodiment, UE may derive a parameter max UL SPS Processes as sum of the RRC configured parameters numberOfConfUlSPS-Processes for the configured SPSs on a serving cell. In an example, the parameter max UL SPS Processes may be derived by the UE as sum of the RRC configured parameters numberOfConfUlSPS-Processes for the active SPSs on the serving cell. In an example, HARQ Processes 0, 1, . . . , (max UL SPS Processes)−1 may be sequentially assigned to consecutive SPS transmissions where the SPS transmissions may correspond to the same or different SPS configurations. In an example, an SPS HARQ ID offset may be configured (e.g. via RRC) and HARQ process IDs for SPS transmissions may start from the offset value instead of starting from zero (e.g. offset, . . . , maxULSPSProcess−1+offset).

The UE may sequentially increase the HARQ Process ID for SPS transmissions and set the HARQ Process ID for nth SPS transmission as follows: HARQ Process ID (n)= (HARQ Process ID (n−1)+1) modulo (max UL SPS Processes) where HARQ Process ID (n−1) and HARQ Process ID (n) are the HARQ process IDs used for the (n−1)th and nth SPS transmission respectively and the (n−1)th and nth SPS transmissions may correspond to the same or different SPS configurations.

In an example, a similar equation may be implemented: HARQ Process ID (i)=(HARQ Process ID (i−1)+delta_i) modulo maxULSPSProcess wherein i is a subframe number, and delta_i may be 1 when SPS is transmitted in the subframe and zero when no SPS grant is in the subframe i. SPS transmissions may correspond to the same or different SPS configurations. HARQ Process ID (i) may be applicable if there is an SPS grant in subframe i.

In an example, HARQ Process ID may be started with 0 (e.g., HARQ Process ID (0)=0). In an example, HARQ Process ID may continue to sequentially increase using the above equation after a new SPS is activated or an existing SPS is released. In an example, when all of the activated SPSs are released, the HARQ Process ID may reset and start from 0 for the next SPS transmission. In an example, when all of the activated SPSs are either released or RRC updates their configuration (e.g., updates the SemiPersistentInterva-lUL), the HARQ Process ID may reset and start from 0 for the next SPS transmission.

In an example, eNB may configure and initialize three SPSs for a UE on a serving cell and the parameter numberOfConfUlSPS-Processes may be 2, 2 and 4 for the first, second and third SPS respectively. The HARQ Process IDs for the configured uplink grants may take values 0, 1, 2, 3, 4, 5, 6, 7, 0, 1, 2, 3, . . . independent of which SPS configuration a configured uplink grant belongs to.

In an example, a method may be used that comprises receiving, by a wireless device, at least one message comprising configuration parameters of one or more semi-persistent scheduling (SPS) grants. The at least one message may be one or more RRC messages. The configuration parameters may comprise one or more number HARQ processes comprising a number HARQ process for an SPS grant. The method may comprise receiving one or more DCIs indicating one or more SPS grants. The wireless device may validate a DCI as SPS grant using a SPS PDCCH validation procedure. In an example, DCI format 0 may be used to indicate the SPS grant. The method may comprise deriving by the wireless device a maximum number of HARQ process for SPS transmissions. The method may comprise transmitting a first transport block (TB) associated with a first HARQ procedure with a first HARQ process identifier; transmitting a second transport block (TB) associated with a second HARQ procedure with a second HARQ process identifier equal to the first HARQ process identifier plus one modulo the maximum number of HARQ process for SPS transmissions.

In an example, the maximum number of HARQ process for SPS transmissions in the above method may be derived by the UE as sum of number HARQ process for the one or more SPS grant. In an example, the maximum number of HARQ process for SPS transmissions in the above method may be derived by the UE as sum of number HARQ process for the one or more SPS grant that are active. In an example, in the above method, the HARQ process identifier for the first SPS transmission may be equal to 0. In an example, in the above method, the HARQ process identifiers for consecutive SPS transmissions may continue to sequentially increase after a new SPS is activated or an existing SPS is released. In an example, in the above method, when all of the activated SPSs are released, the HARQ Process identifier may reset and start from 0 for the next SPS transmission. In an example, in the above method, when all of the activated SPSs are either released or RRC updates their configuration, the HARQ Process ID may reset and start from 0 for the next SPS transmission.

According to various embodiments, a device (such as, for example, a wireless device, off-network wireless device, a base station, and/or the like), may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 21:
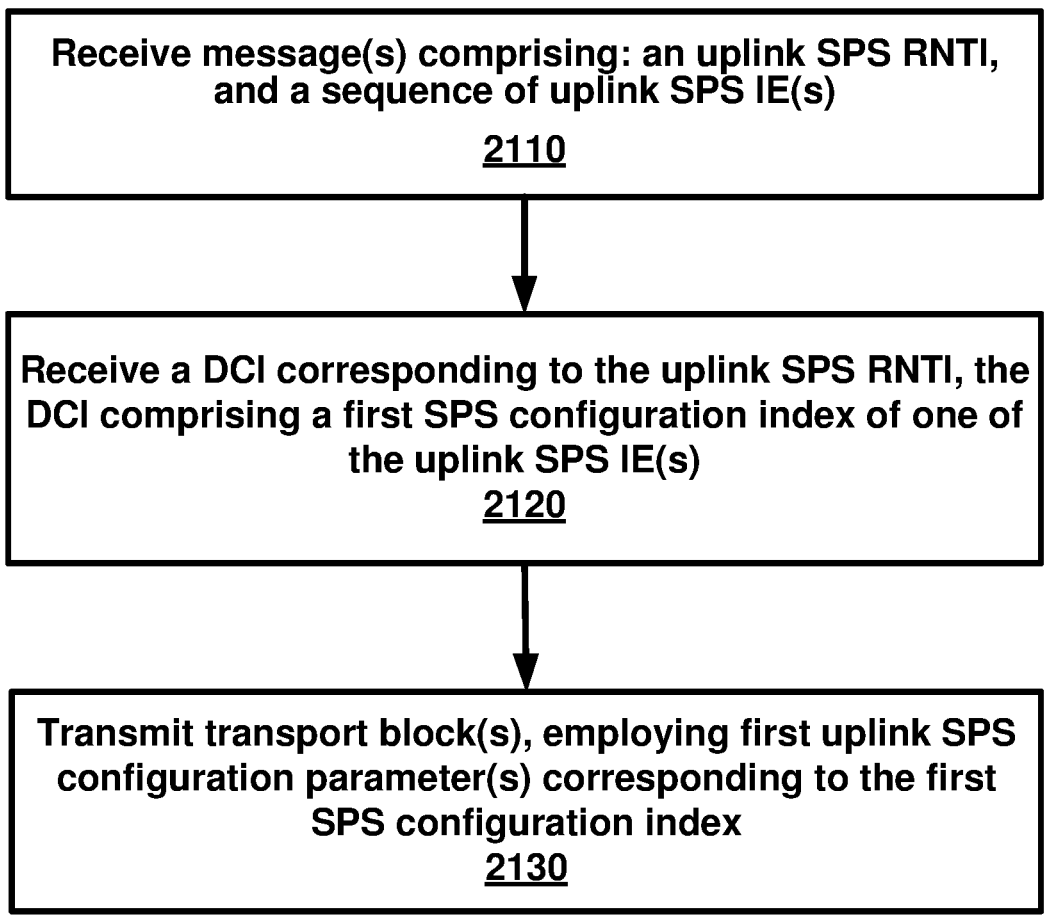
FIG. 21 is an example diagram depicting example signaling flow as per an aspect of an embodiment of the present disclosure.

FIG. 21 is an example flow diagram as per an aspect of an embodiment of the present disclosure. At 2110, a wireless device may receive at least one message. The at least one message may comprise: an uplink semi persistent scheduling (SPS) radio network temporary identifier (RNTI), and a sequence of at least one uplink SPS information element (IE). An uplink SPS IE of the sequence may comprise: at least one uplink SPS configuration parameter comprising an uplink SPS interval, and an SPS configuration index for the at least one uplink SPS configuration parameter. At 2120, a downlink control information (DCI) corresponding to the uplink SPS RNTI may be received. The DCI may comprise a first SPS configuration index of one of the at least one uplink SPS IE. At 2130, at least one transport block may be transmitted employing at least one first uplink SPS configuration parameter corresponding to the first SPS configuration index.

According to an embodiment, the DCI may indicate activation of the at least one first uplink SPS configuration. The DCI may further comprise at least one resource parameter. The transmission of the at least one transport block in a subframe may further employ the at least one resource parameter. The subframe may be determined employing a first uplink SPS interval of the at least one first uplink SPS configuration parameter.

According to an embodiment, the at least one uplink SPS configuration parameter may comprise at least one parameter indicating one or more traffic types corresponding to the uplink SPS IE. According to an embodiment, the at least one uplink SPS configuration parameter may comprise at least one logical channel identifier corresponding to the uplink SPS IE. According to an embodiment, the DCI may further comprise at least one of: a carrier indicator field, a frequency hopping flag, a first field indicating resource block assignment and hopping resource allocation, a second field indicating modulation and coding scheme and redundancy version, at least one field indicating one or more traffic types, a new data indicator field, or a transmit power control (TPC) field.

According to an embodiment, the at least one RRC message may further comprise: a side link SPS RNTI, and a sequence of at least one sidelink SPS IE. The sidelink SPS IE may comprise: a sidelink SPS configuration index indicating an index of at least one sidelink SPS configuration parameter, and the at least one sidelink SPS configuration parameter.

According to an embodiment, the at least one RRC message may comprise: a second SPS RNTI, and at least one second SPS configuration parameter corresponding to the second SPS RNTI. According to an embodiment, the wireless device may further transmit, to a base station, a message comprising SPS assistance information comprising: at least one logical channel, at least one message size, and at least one traffic periodicity.

According to an embodiment, the at least one SPS configuration parameter may comprise at least one of: a number of configured hybrid automatic repeat request (HARD) processes, or at least one transmit power parameter.

Figure 22:
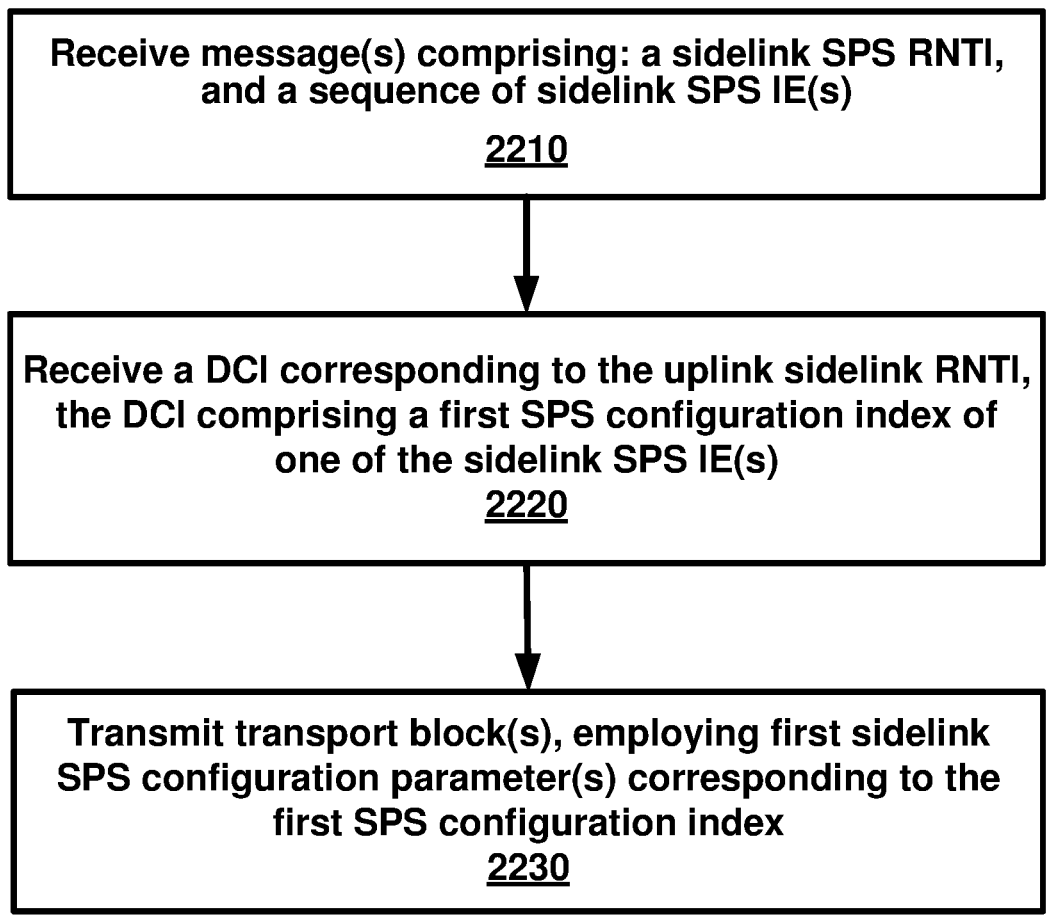
FIG. 22 is an example diagram depicting example signaling flow as per an aspect of an embodiment of the present disclosure.

FIG. 22 is an example flow diagram as per an aspect of an embodiment of the present disclosure. At 2210, a wireless device may receive at least one message. The at least one message may comprise: a sidelink semi persistent scheduling (SPS) radio network temporary identifier (RNTI), and a sequence of at least one sidelink SPS information element (IE). The sidelink SPS IE may comprise: at least one sidelink SPS configuration parameter. The at least one sidelink SPS configuration parameter may comprise a sidelink SPS interval, and an SPS configuration index for the at least one sidelink SPS configuration parameter. At 2220, a downlink control information (DCI) corresponding to the sidelink SPS RNTI may be received. The DCI may comprise a first SPS configuration index of one of the at least one sidelink SPS IE. At 2230, at least one transport block may be transmitted employing at least one first sidelink SPS configuration parameter corresponding to the first SPS configuration index.

According to an embodiment, the DCI may indicate activation of the at least one first sidelink SPS configuration. The DCI may further comprises at least one resource parameter. The transmitting of the at least one transport block in a subframe may further employ the at least one resource parameter. The subframe may be determined employing a first sidelink SPS interval of the at least one first sidelink SPS configuration parameter.

According to an embodiment, the at least one sidelink SPS configuration parameter may comprise at least one parameter indicating one or more traffic types corresponding to the sidelink SPS IE. According to an embodiment, the at least one sidelink SPS configuration parameter may comprise at least one logical channel identifier corresponding to the sidelink SPS IE. According to an embodiment, the DCI may further comprise at least one of: a carrier indicator field, a frequency hopping flag, a first field indicating resource block assignment and hopping resource allocation, a second field indicating modulation and coding scheme and redundancy version, at least one field indicating one or more traffic types, a new data indicator field, or a transmit power control (TPC) field.

According to an embodiment, the at least one RRC message may comprise: an uplink SPS RNTI, and a sequence of at least one uplink SPS IE. An uplink SPS IE may comprise: an uplink SPS configuration index indicating an index of at least one uplink SPS configuration parameter, and the at least one uplink SPS configuration parameter.

According to an embodiment, the at least one RRC message may comprise: a second SPS RNTI, and at least one second SPS configuration parameter corresponding to the second SPS RNTI. According to an embodiment, the sidelink SPS RNTI may be employed for V2X communications. According to an embodiment, the at least one SPS configuration parameter may comprise at least one of: a number of configured hybrid automatic repeat request (HARD) processes, or at least one transmit power parameter.

Figure 23:
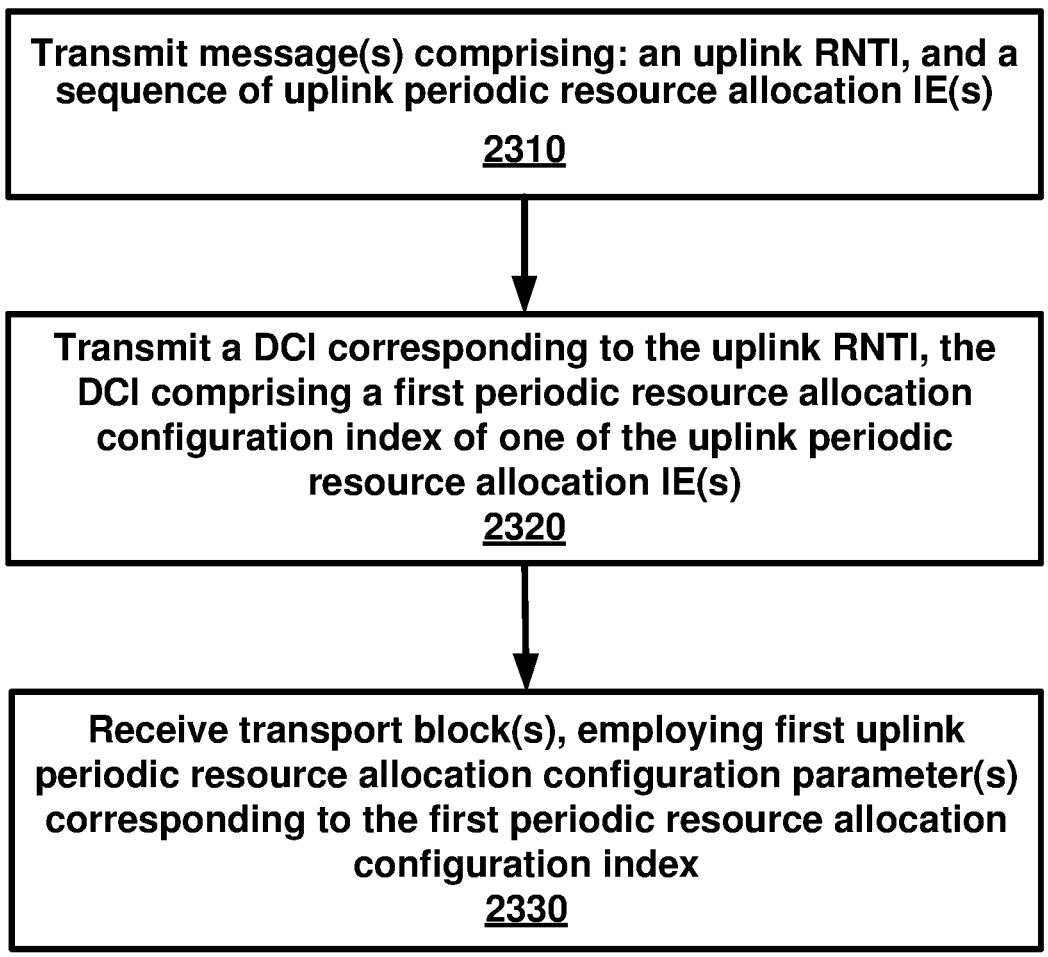
FIG. 23 is an example diagram depicting example signaling flow as per an aspect of an embodiment of the present disclosure.

FIG. 23 is an example flow diagram as per an aspect of an embodiment of the present disclosure. At 2310, a base station may transmit at least one message. The at least one message may comprise: an uplink periodic resource allocation radio network temporary identifier (RNTI), and a sequence of at least one uplink periodic resource allocation information element (IE). The uplink periodic resource allocation IE may comprise: at least one uplink periodic resource allocation configuration parameter, and a periodic resource allocation configuration index for the at least one uplink periodic resource allocation configuration parameter. At 2320, a downlink control information (DCI) corresponding to the uplink periodic resource allocation RNTI may be transmitted. The DCI may comprise a first periodic resource allocation configuration index of one of the at least one uplink periodic resource allocation IE. At 2330, at least one transport block may be received employing at least one first uplink periodic resource allocation configuration parameter corresponding to the first periodic resource allocation configuration index.

According to an embodiment, a second DCI corresponding to the uplink periodic resource allocation RNTI may be transmitted. The second DCI may be configured to cause release of the at least one uplink periodic resource allocation configuration. The second DCI may comprise the first periodic resource allocation configuration index.

Figure 24:
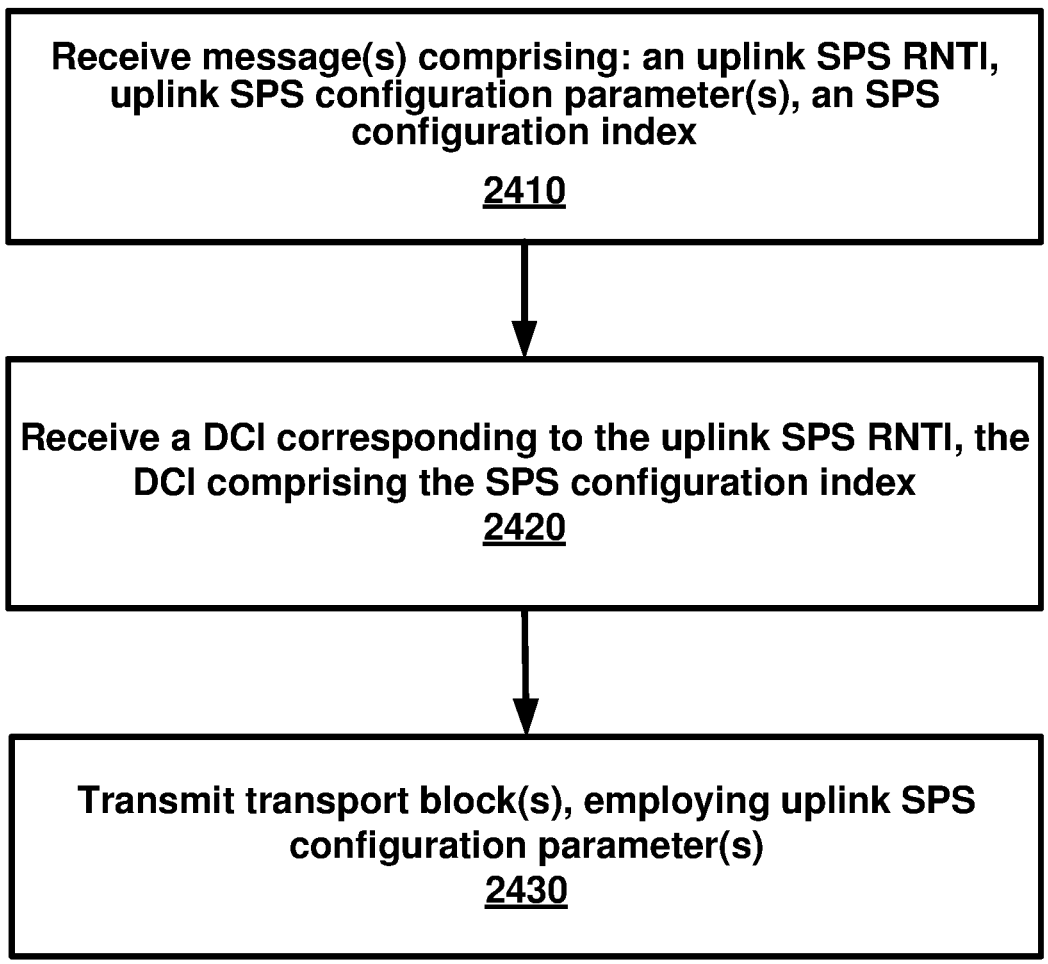
FIG. 24 is an example diagram depicting example signaling flow as per an aspect of an embodiment of the present disclosure.

FIG. 24 is an example flow diagram as per an aspect of an embodiment of the present disclosure. At 2410, a wireless device may receive at least one message. The at least one message may comprise: an uplink semi persistent scheduling (SPS) radio network temporary identifier (RNTI), and at least one uplink SPS configuration parameter. The at least one uplink SPS configuration parameter may comprise an uplink SPS interval, and an SPS configuration index for the at least one uplink SPS configuration parameter. At 2420, a downlink control information (DCI) corresponding to the uplink SPS RNTI may be received. The DCI may comprise the SPS configuration index. At 2430, at least one transport block may be transmitted employing the at least one uplink SPS configuration parameter.

Figure 25:
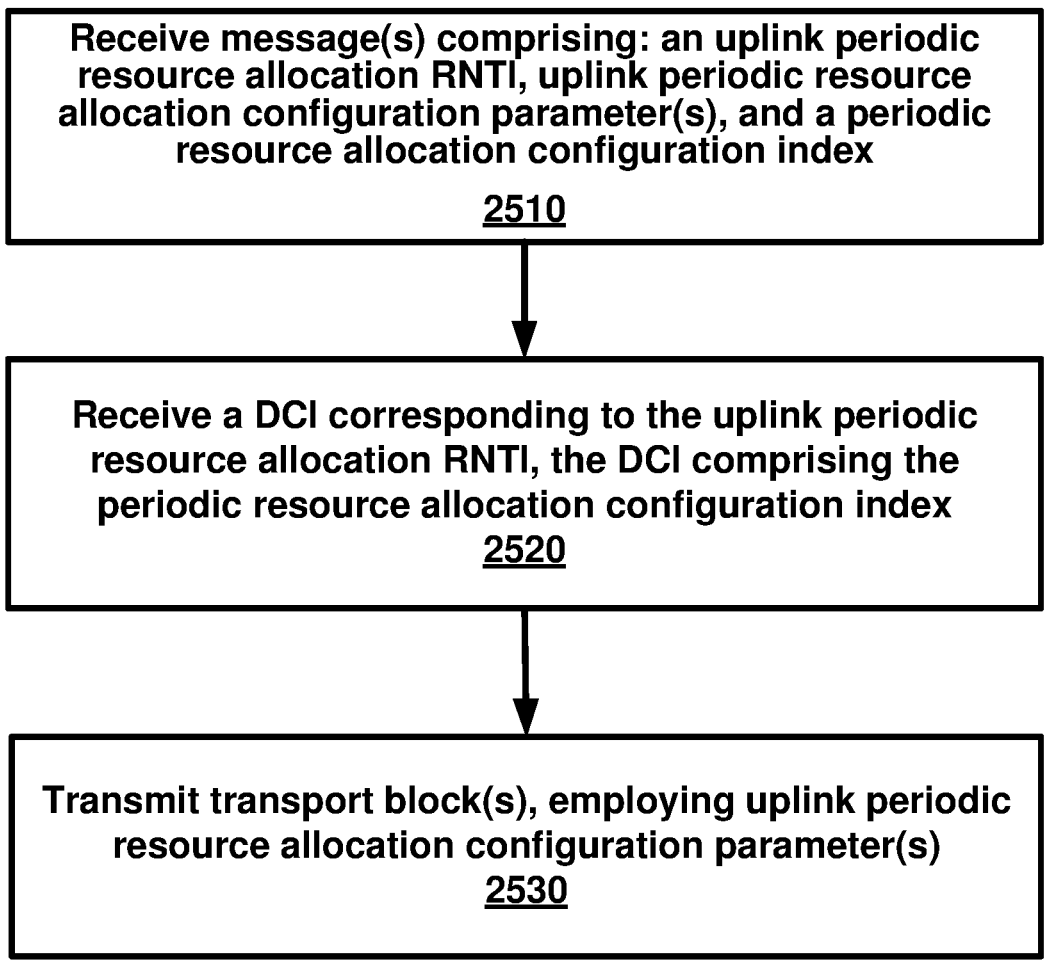
FIG. 25 is an example flow diagram as per an aspect of an embodiment of the present disclosure.

FIG. 25 is an example flow diagram as per an aspect of an embodiment of the present disclosure. At 2510, a wireless device may receive at least one message. The at least one message may comprise: an uplink periodic resource allocation radio network temporary identifier (RNTI), at least one uplink periodic resource allocation configuration parameter comprising an uplink periodic resource allocation interval, and a periodic resource allocation configuration index for the at least one uplink periodic resource allocation configuration parameter. At 2520, a downlink control information (DCI) corresponding to the uplink periodic resource allocation RNTI may be received. The DCI may comprise the periodic resource allocation configuration index. At 2530, at least one transport block may be transmitted employing the at least one uplink periodic resource allocation configuration parameter.

Figure 26:
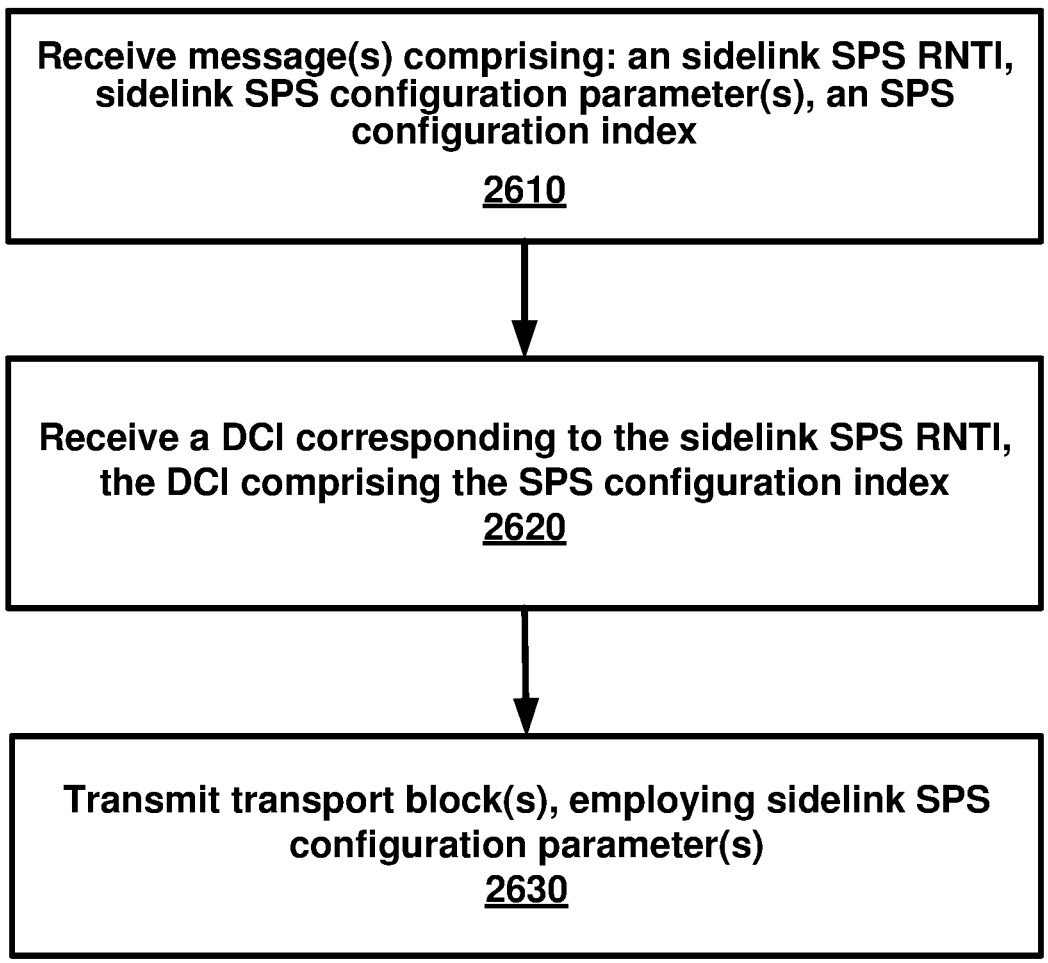
FIG. 26 is an example flow diagram as per an aspect of an embodiment of the present disclosure.

FIG. 26 is an example flow diagram as per an aspect of an embodiment of the present disclosure. At 2610, a wireless device may receive at least one message. The at least one message may comprise: a sidelink semi persistent scheduling (SPS) radio network temporary identifier (RNTI), at least one sidelink SPS configuration parameter comprising a sidelink SPS interval, and an SPS configuration index for the at least one sidelink SPS configuration parameter. At 2620, a downlink control information (DCI) corresponding to the sidelink SPS RNTI may be received. The DCI may comprise the SPS configuration index. At 2630, at least one transport block may be transmitted employing the at least one sidelink SPS configuration parameter.

Figure 27:
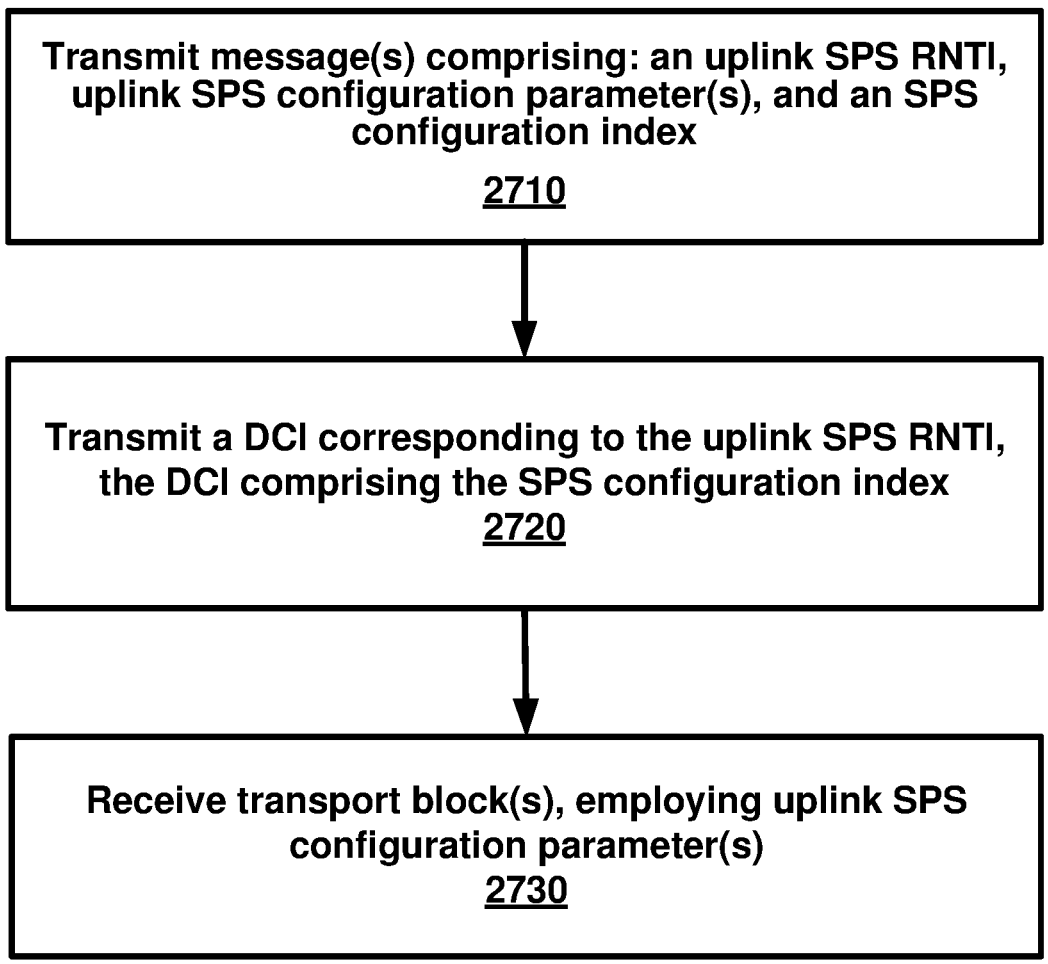
FIG. 27 is an example flow diagram as per an aspect of an embodiment of the present disclosure.

FIG. 27 is an example flow diagram as per an aspect of an embodiment of the present disclosure. At 2710, a base station may transmit at least one message. The at least one message may comprise: an uplink semi persistent scheduling (SPS) radio network temporary identifier (RNTI), at least one uplink SPS configuration parameter, and an SPS configuration index for the at least one uplink SPS configuration parameter. At 2720, a downlink control information (DCI) corresponding to the uplink SPS RNTI may be received. The DCI may comprise the SPS configuration index. At 2730, at least one transport block may be received employing the at least one uplink SPS configuration parameter.

Figure 28:
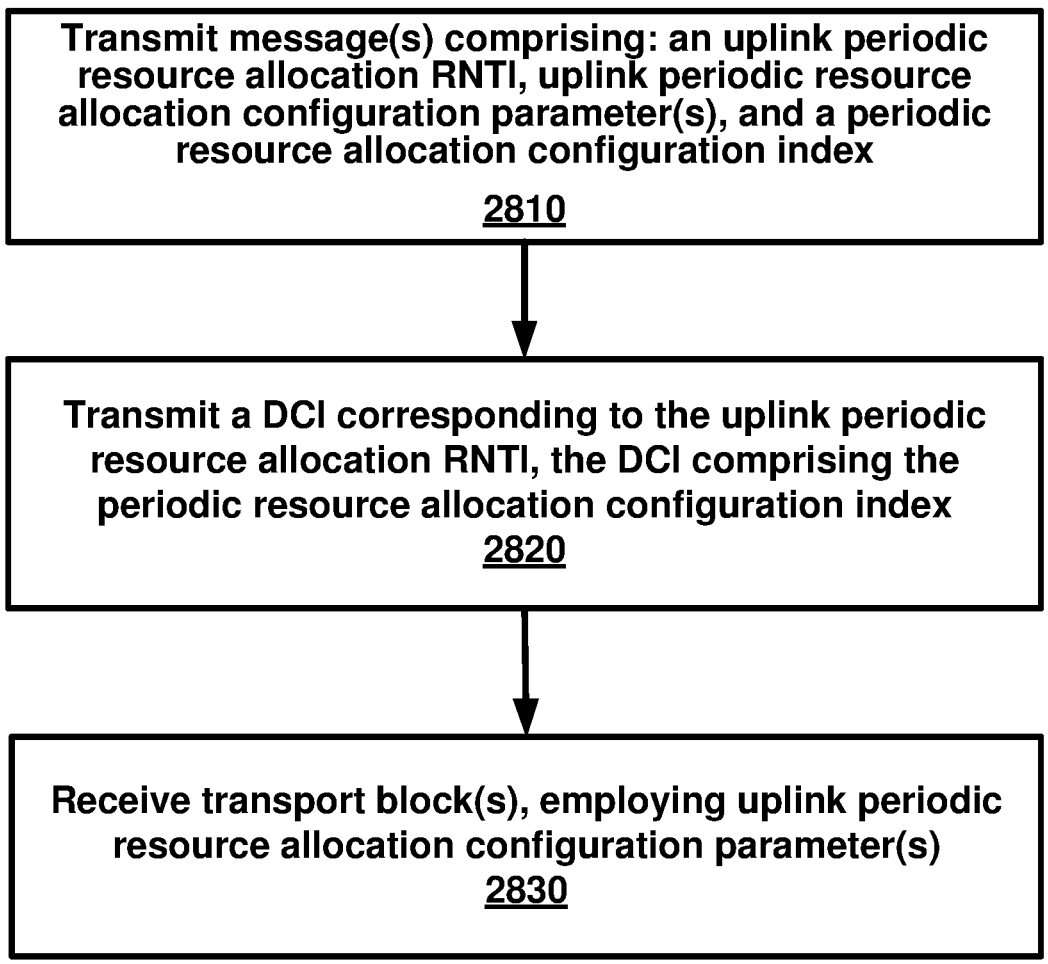
FIG. 28 is an example flow diagram as per an aspect of an embodiment of the present disclosure.

FIG. 28 is an example flow diagram as per an aspect of an embodiment of the present disclosure. At 2810, a base station may transmit at least one message. The at least one message may comprise: an uplink periodic resource allocation radio network temporary identifier (RNTI), at least one uplink periodic resource allocation configuration parameter, and a periodic resource allocation configuration index for the at least one uplink periodic resource allocation configuration parameter. At 2820, a downlink control information (DCI) corresponding to the uplink periodic resource allocation RNTI may be transmitted. The DCI may comprise the periodic resource allocation configuration index. At 2830, at least one transport block may be received employing the at least one uplink periodic resource allocation configuration parameter.

Figure 29:
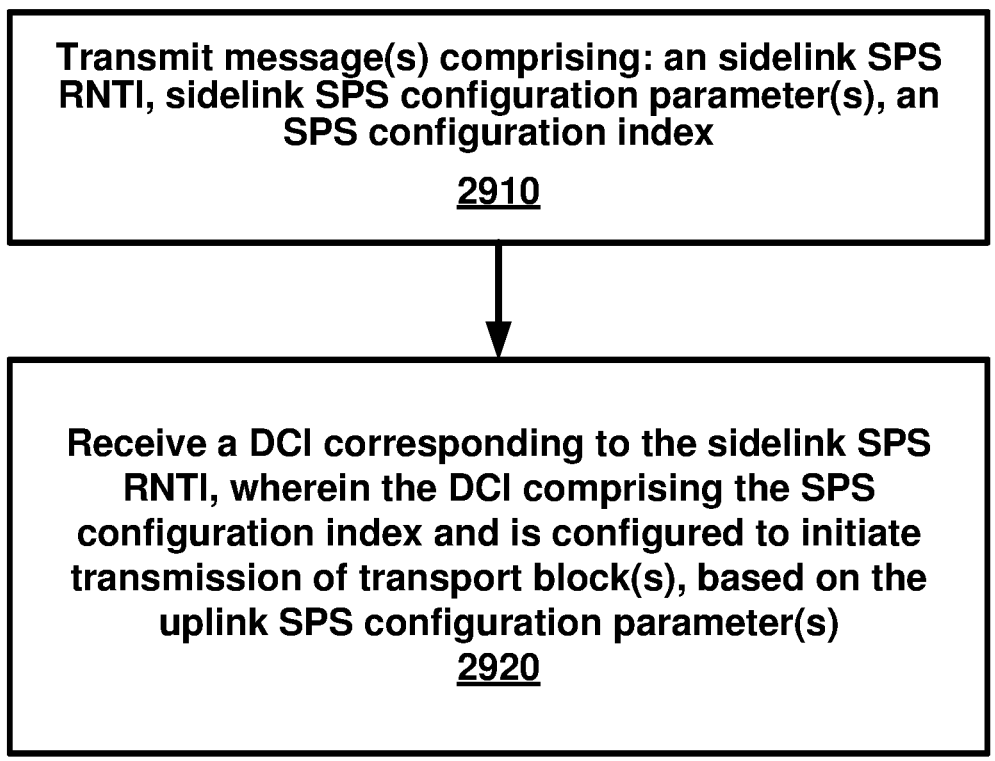
FIG. 29 is an example flow diagram as per an aspect of an embodiment of the present disclosure.

FIG. 29 is an example flow diagram as per an aspect of an embodiment of the present disclosure. At 2910, a base station may transmit at least one message. The at least one message may comprise: a sidelink semi persistent scheduling (SPS) radio network temporary identifier (RNTI), at least one sidelink SPS configuration parameter comprising a sidelink SPS interval, and an SPS configuration index for the at least one sidelink SPS configuration parameter. At 2920, a downlink control information (DCI) corresponding to the sidelink SPS RNTI may be transmitted. The DCI may comprise the SPS configuration index, and is configured to initiate transmission of at least one transport block, based on the at least one uplink SPS configuration parameter.

Figure 30:
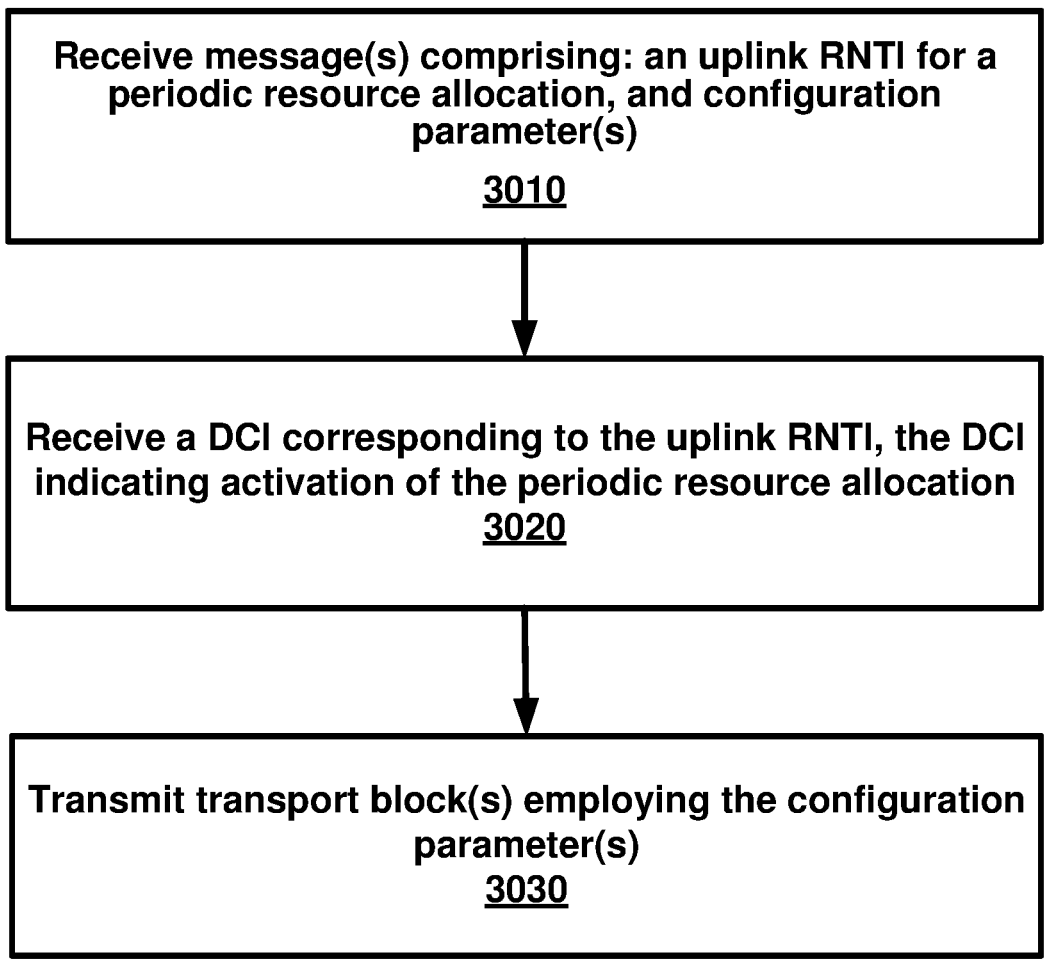
FIG. 30 is an example flow diagram as per an aspect of an embodiment of the present disclosure.

FIG. 30 is an example flow diagram as per an aspect of an embodiment of the present disclosure. At 3010, a wireless device may receive at least one message. The at least one message may comprise: an uplink radio network temporary identifier (RNTI) for a periodic resource allocation, and at least one configuration parameter for the periodic resource allocation. The at least one configuration parameter may comprise: an uplink interval parameter, and at least one first parameter indicating one or more traffic types. At 3020, a downlink control information (DCI) corresponding to the uplink RNTI may be received. The DCI may indicate activation of the periodic resource allocation. At 3030, at least one transport block comprising data of the one or more traffic types may be transmitted employing the at least one configuration parameter.

According to an embodiment, at least one parameter may comprise at least one logical channel identifier. According to an embodiment, a second DCI corresponding to the uplink RNTI may be received. The second DCI may release the periodic resource allocation.

According to an embodiment, the at least one message may further comprise a periodic resource allocation configuration index indicating an index of the at least one configuration parameter. According to an embodiment, the DCI may further comprise the periodic resource allocation configuration index.

According to an embodiment, uplink transmission in resources indicated by the DCI may be skipped when uplink buffers of the wireless device does not include data of the one or more traffic types. According to an embodiment, the DCI may comprise at least one resource parameter. According to an embodiment, the transmitting of the at least one transport block in a subframe may further employ the at least one resource parameter. According to an embodiment, the subframe may be determined employing the uplink interval parameter. According to an embodiment, the at least one configuration parameter may comprise at least one of: a number of configured hybrid automatic repeat request (HARD) processes, or at least one transmit power parameter.

Figure 31:
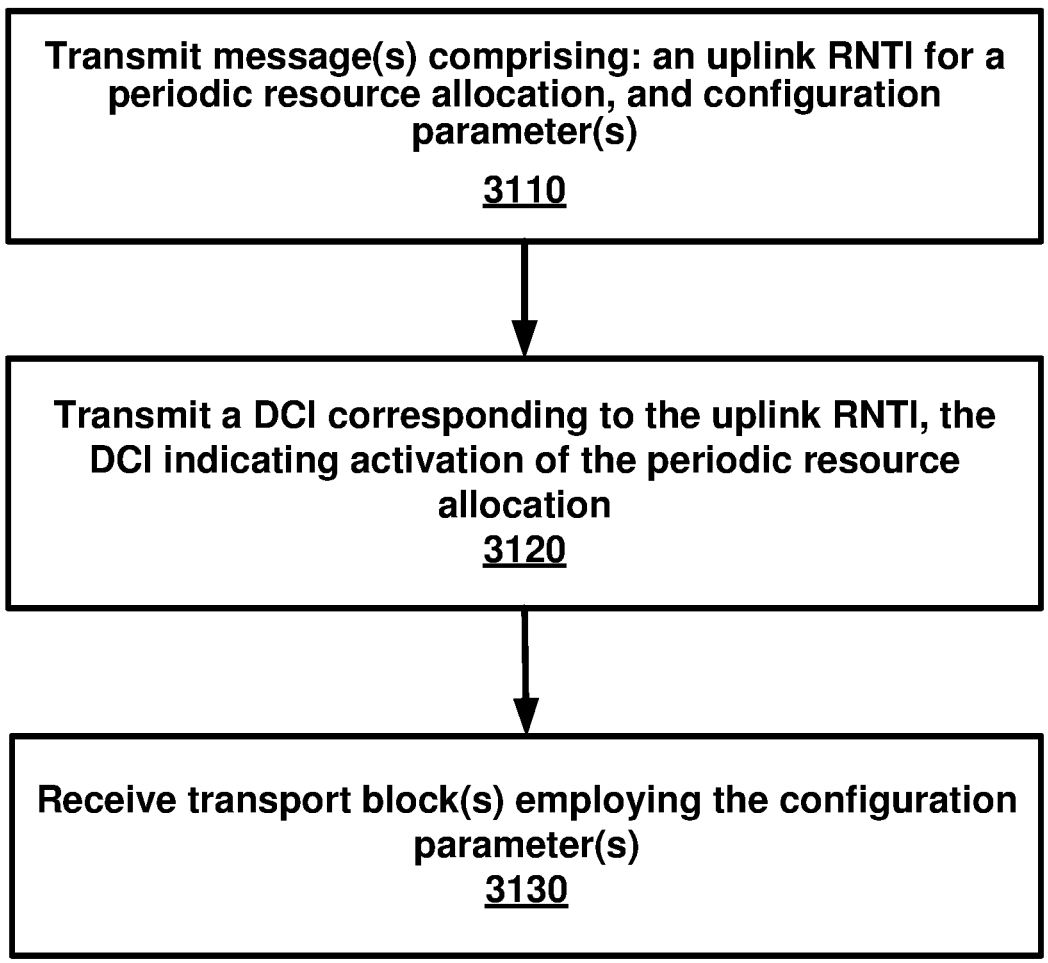
FIG. 31 is an example flow diagram as per an aspect of an embodiment of the present disclosure.

FIG. 31 is an example flow diagram as per an aspect of an embodiment of the present disclosure. At 3110, a base station may transmit at least one message. The at least one message may comprise: an uplink radio network temporary identifier (RNTI) for a periodic resource allocation, and at least one configuration parameter for the periodic resource allocation. The at least one configuration parameter may comprise: an uplink interval parameter, and at least one parameter indicating one or more traffic types. At 3120, a downlink control information (DCI) corresponding to the uplink RNTI may be transmitted. The DCI may indicate activation of the periodic resource allocation. At 3130, at least one transport block comprising data of the one or more traffic types may be received employing the at least one configuration parameter.

According to an embodiment, at least one parameter may comprise at least one logical channel identifier. According to an embodiment, at least a second DCI corresponding to the uplink RNTI may be received. The DCI may release the periodic resource allocation.

According to an embodiment, the at least one message may further comprise a periodic resource allocation configuration index indicating an index of the at least one configuration parameter, and the DCI may comprise the periodic resource allocation configuration index. According to an embodiment, uplink transmission in resources indicated by the DCI may be skipped when uplink buffers of the wireless device does not include data of the one or more traffic types.

According to an embodiment, the DCI may comprise at least one resource parameter. According to an embodiment, the transmitting of the at least one transport block in a subframe may further employ the at least one resource parameter. According to an embodiment, the subframe may be determined employing the uplink interval parameter. According to an embodiment, the at least one configuration parameter may comprise at least one of: a number of configured hybrid automatic repeat request (HARD) processes, or at least one transmit power parameter.

Figure 32:
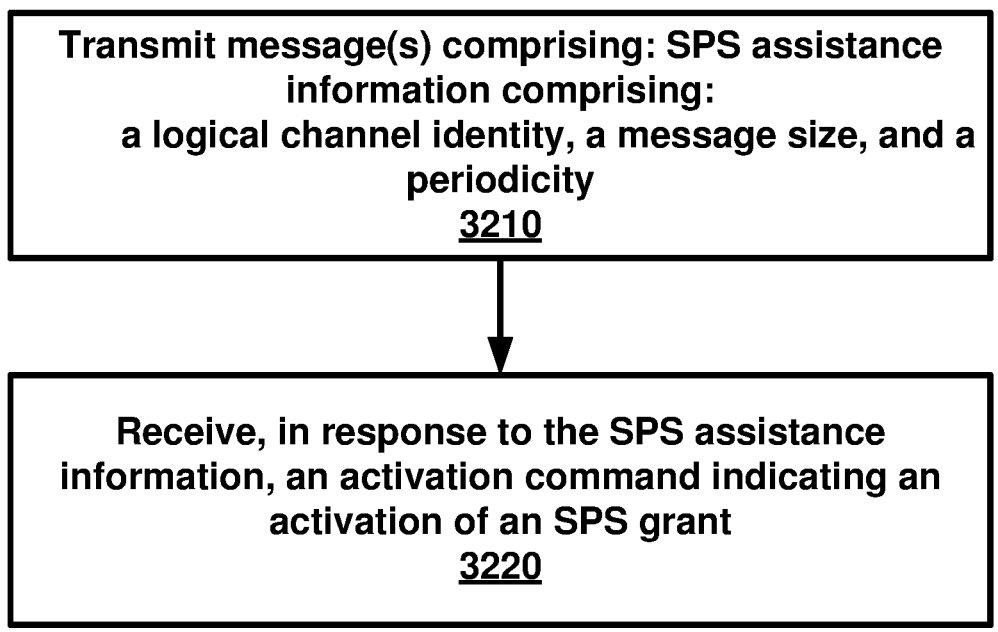
FIG. 32 is an example flow diagram as per an aspect of an embodiment of the present disclosure.

FIG. 32 is an example flow diagram as per an aspect of an embodiment of the present disclosure. At 3210, a wireless device may receive at least one message. The at least one message may comprise: one or more semi persistent scheduling (SPS) assistance information comprising: a logical channel identity associated with an SPS traffic, a message size associated with the SPS traffic, and a periodicity associated with the SPS traffic. In response to the SPS assistance information, an activation command indicating an activation of an SPS grant may be received at 3220. One or more parameters in the SPS grant may be based on the SPS assistance information.

Figure 33:
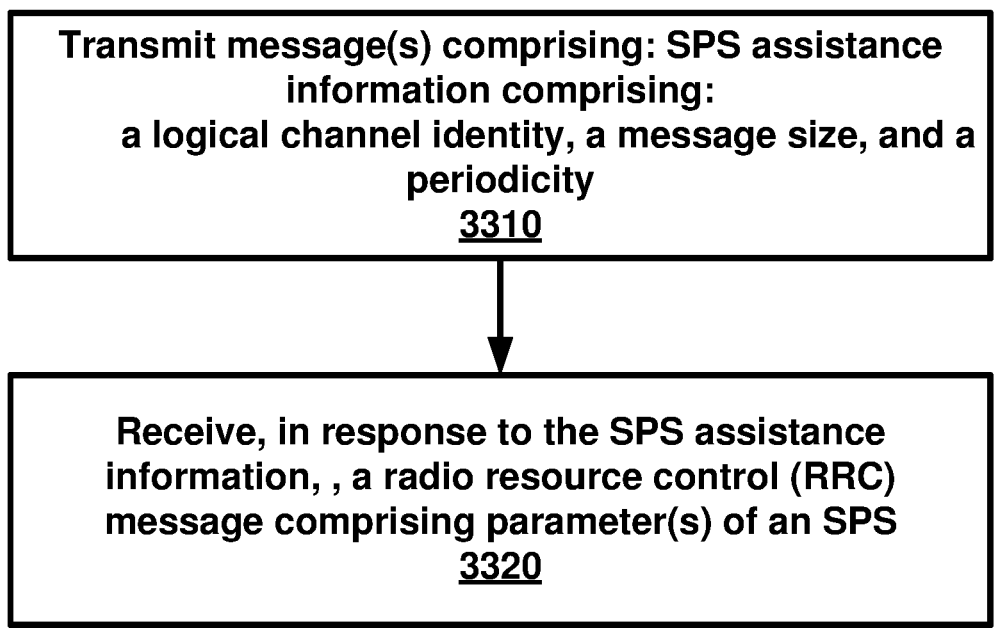
FIG. 33 is an example flow diagram as per an aspect of an embodiment of the present disclosure.

FIG. 33 is an example flow diagram as per an aspect of an embodiment of the present disclosure. At 3310, a wireless device may receive at least one message. The at least one message may comprise one or more semi persistent scheduling (SPS) assistance information comprising: a logical channel identity associated with an SPS traffic, a message size associated with the SPS traffic, and a periodicity associated with the SPS traffic. In response to the SPS assistance information, a radio resource control (RRC) message comprising one or more configuration parameters of an SPS may be received at 3320. The one or more configuration parameters in the SPS grant may be based on the SPS assistance information.

Figure 34:
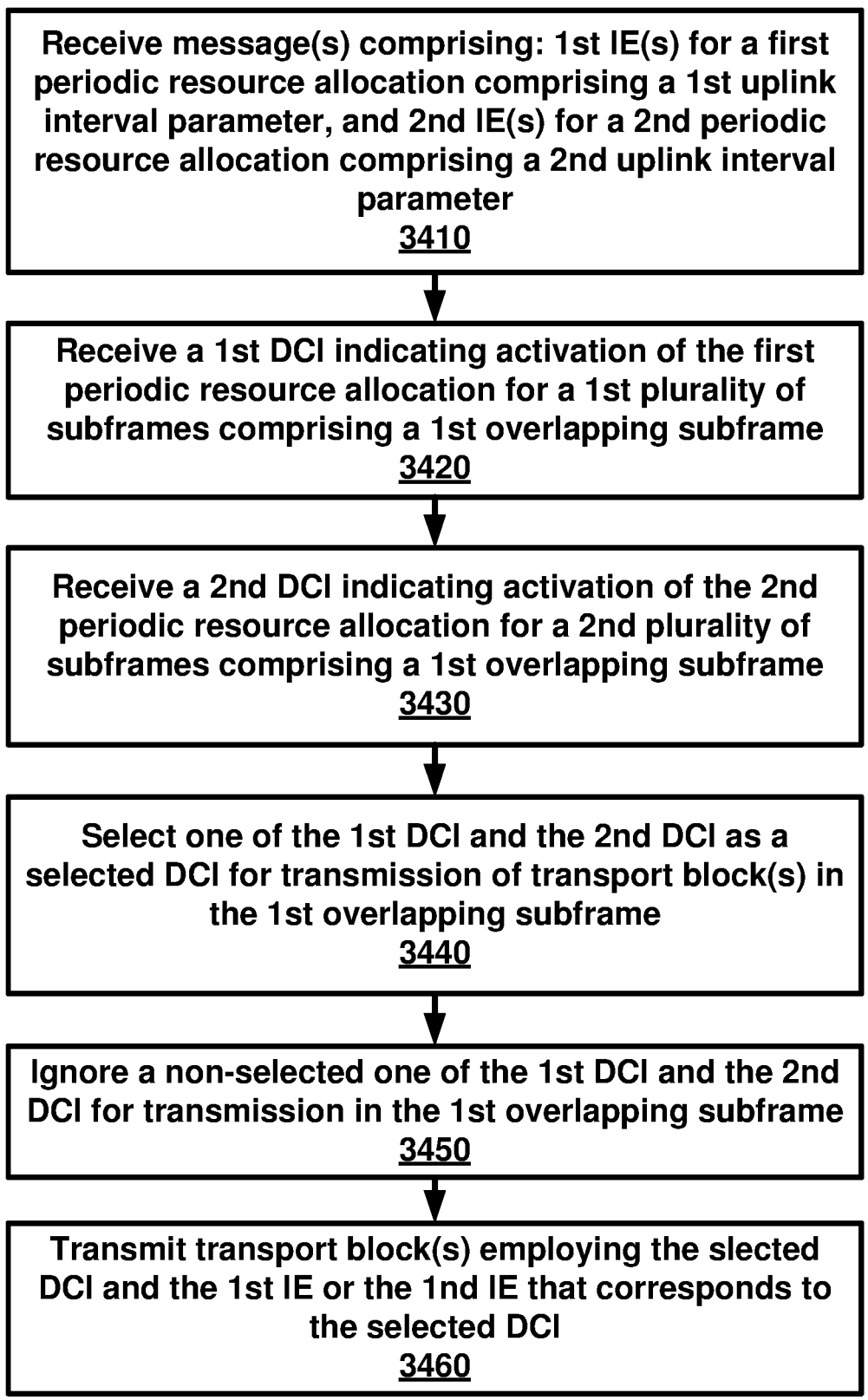
FIG. 34 is an example flow diagram as per an aspect of an embodiment of the present disclosure.

FIG. 34 is an example flow diagram as per an aspect of an embodiment of the present disclosure. At 3410, a wireless device may receive at least one message. The at least one message may comprise: at least one first information element (IE) for a first periodic resource allocation, and at least one second IE for a second periodic resource allocation. The at least one first IE may comprise a first uplink interval parameter. The at least one second IE may comprise a second uplink interval parameter. A first downlink control information (DCI) indicating activation of the first periodic resource allocation for a first plurality of subframes comprising a first overlapping subframe may be received at 3420. A second DCI indicating activation of the second periodic resource allocation for a second plurality of subframes comprising the first overlapping subframe may be received at 3430.

At 3430, one of the first DCI and the second DCI may be selected as a selected DCI for transmission of at least one transport block in the first overlapping subframe.

At 3450, a non-selected one of the first DCI and the second DCI may be ignored for transmission in the first overlapping subframe. The at least one transport block may be transmitted at 3460 employing: the selected DCI, and the at least one first IE or the at least one second IE that corresponds to the selected DCI.

According to an embodiment, the selecting of the one of the first DCI and the second DCI as the selected DCI for transmission of the at least one transport block in the first overlapping subframe may be based on one or more criteria. According to an embodiment, the at least one first IE may comprise at least one parameter indicating one or more first traffic types. The at least one second IE may comprise at least one parameter indicating one or more first traffic types. The one or more criteria may depend on a priority of the one or more first traffic types and the one or more second traffic types. According to an embodiment, the one or more criteria may depend on one or more parameters in the first DCI and the second DCI. According to an embodiment, the one or more criteria may depend on one or more parameters in the at least one first IE and the at least one second IE. According to an embodiment, the one or more criteria may depend on the first uplink interval parameter and the second uplink interval parameter. According to an embodiment, the one or more criteria may depend on a first radio resource assignment associated with the first DCI and a second radio resource assignment associated with the second DCI.

Figure 35:
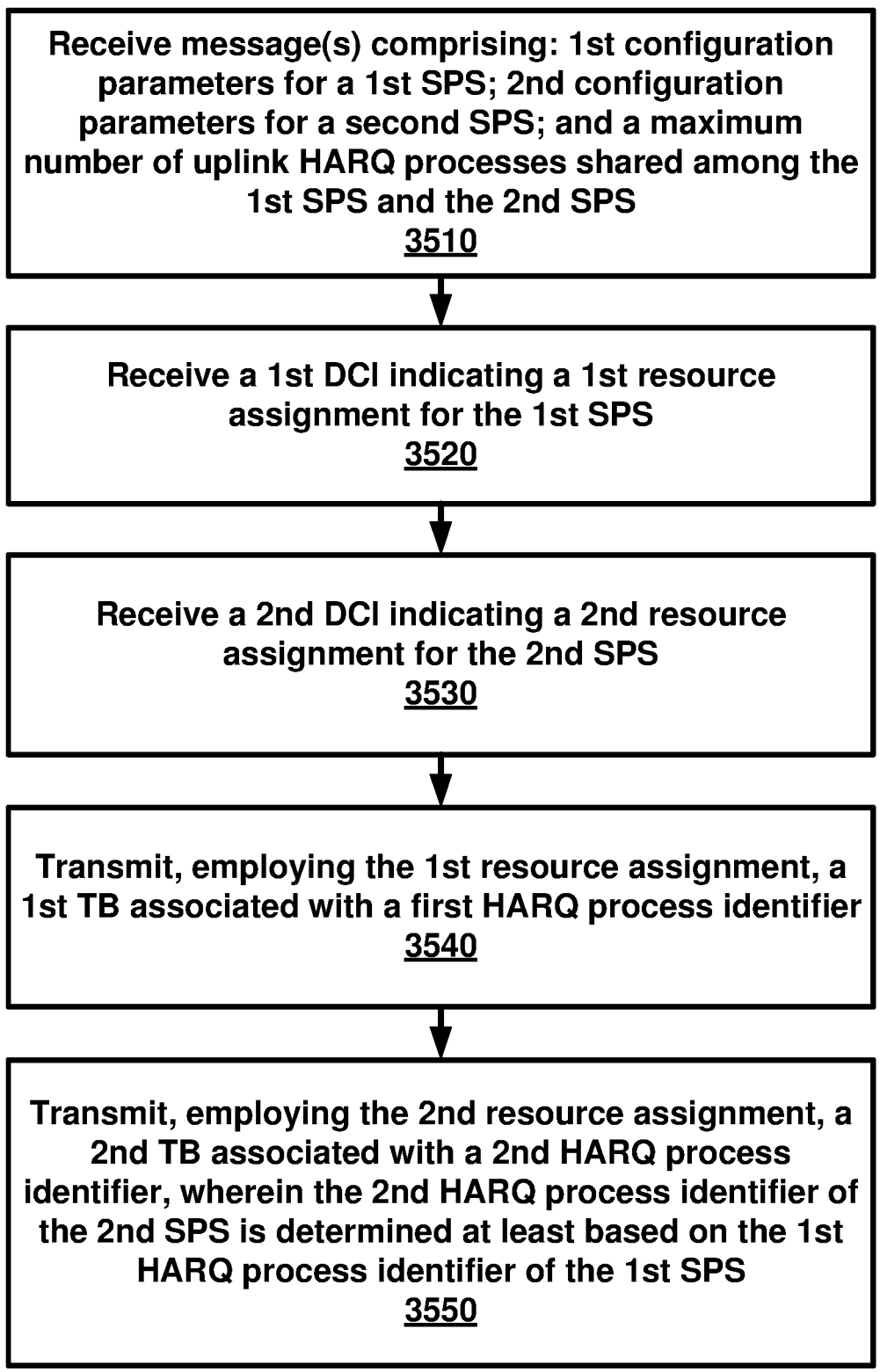
FIG. 35 is an example flow diagram as per an aspect of an embodiment of the present disclosure.

FIG. 35 is an example flow diagram as per an aspect of an embodiment of the present disclosure. At 3510, a wireless device may receive at least one message. The at least one message may comprise: first configuration parameters for a first semi-persistent scheduling (SPS), second configuration parameters for a second SPS, and a maximum number of uplink hybrid automatic repeat request (HARQ) processes shared among the first SPS and the second SPS. A first downlink control information (DCI) indicating a first resource assignment for the first SPS may be received at 3520. A second DCI indicating a second resource assignment for the second SPS may be received at 3530. A first transport block (TB) associated with a first HARQ process identifier may be transmitted, employing the first resource assignment, at 3540. A second TB associated with a second HARQ process identifier may be transmitted, employing the second resource assignment, at 3550. The second HARQ process identifier of the second SPS may be determined at least based on the first HARQ process identifier of the first SPS.

According to an embodiment, the first configuration parameters and the second configuration parameters may comprise the maximum number of uplink HARQ processes. According to an embodiment, the first configuration parameters may comprise a first interval value and the second configuration parameters may comprise a second interval value. According to an embodiment, the one or more messages may further comprise third configuration parameters shared among the first SPS and the second SPS. According to an embodiment, the second HARQ process identifier may be (the first HARQ process identifier plus a first number) modulo (the maximum number of uplink HARQ processes). According to an embodiment, the first number may be one in response to the second TB being a next SPS TB to the first TB. According to an embodiment, the first number may be zero in response to the wireless device not transmitting the first TB. According to an embodiment, the one or more messages may further comprise at least one offset value.

Figure 36:
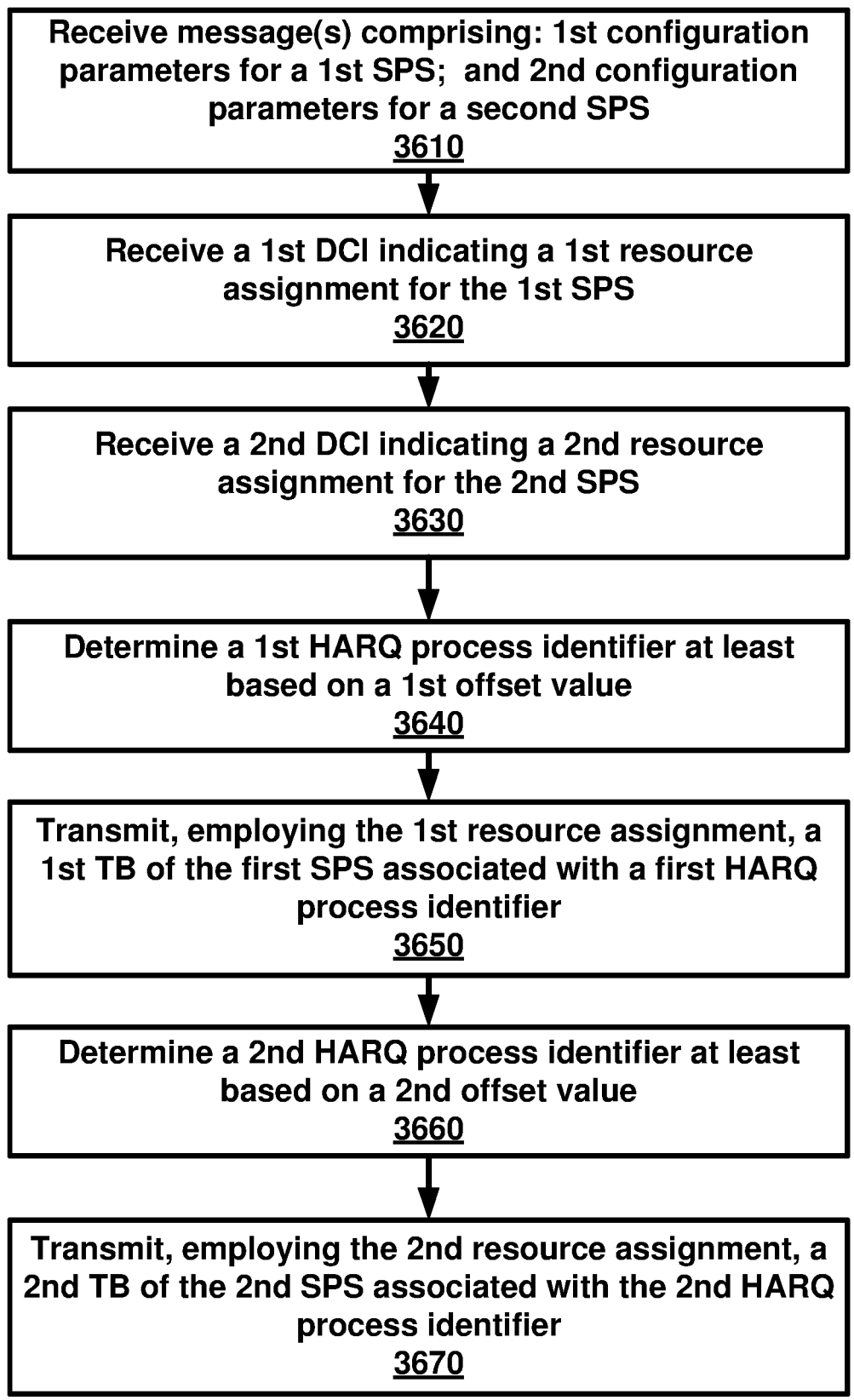
FIG. 36 is an example flow diagram as per an aspect of an embodiment of the present disclosure.

FIG. 36 is an example flow diagram as per an aspect of an embodiment of the present disclosure. At 3610, a wireless device may receive at least one message. The at least one message may comprise first configuration parameters for a first semi-persistent scheduling (SPS) and second configuration parameters for a second SPS. A first downlink control information (DCI) indicating a first resource assignment for the first SPS may be received at 3620. A second DCI indicating second resource assignment for the second SPS may be received at 3630. At 3640, a first hybrid automatic repeat request (HARQ) process identifier may be determined at least based on a first offset value. At 3650, a first transport block (TB) of the first SPS associated with the first HARQ process identifier may be transmitted employing the first resource assignment. A second HARQ process identifier may be determined at 3660, at least based on a second offset value. The second offset value may be different from the first offset value. At 3670, a second TB of the second SPS associated with the second HARQ process identifier may be transmitted employing the second resource assignment.

According to an embodiment, the first configuration parameters may indicate the first offset value and the second configuration parameters indicate the second offset value. According to an embodiment, the first DCI may indicate the first offset value and the second DCI indicates the second offset value. According to an embodiment, the first one or more messages may comprise a plurality of offset values comprising the first offset value and the second offset value and the first DCI may comprise a first index to the first offset value and the second DCI may comprise a second index to the second offset value. According to an embodiment, the first offset value and the second offset value may be obtained at least based on a first sequence identifier associated with the first SPS and a second sequence identifier associated with the second SPS. According to an embodiment, the second offset value may be the first offset value plus a first parameter of the first configuration parameters. According to an embodiment, the one or more messages may comprise the first SPS sequence identifier and the second SPS sequence identifier. According to an embodiment, the first sequence identifier and the second sequence identifier may be obtained at least based on the first configuration parameters and the second configuration parameters. According to an embodiment, the first offset value may be zero. According to an embodiment, the first configuration parameters may comprise a first interval value and the second configuration parameters may comprise a second interval value. According to an embodiment, the first configuration parameters may comprise a first number of uplink SPS processes and the second configuration parameters may comprise a second number of uplinks SPS processes. According to an embodiment, the one or more messages may further comprise third configuration parameters shared among the first SPS and the second SPS.

Figure 37:
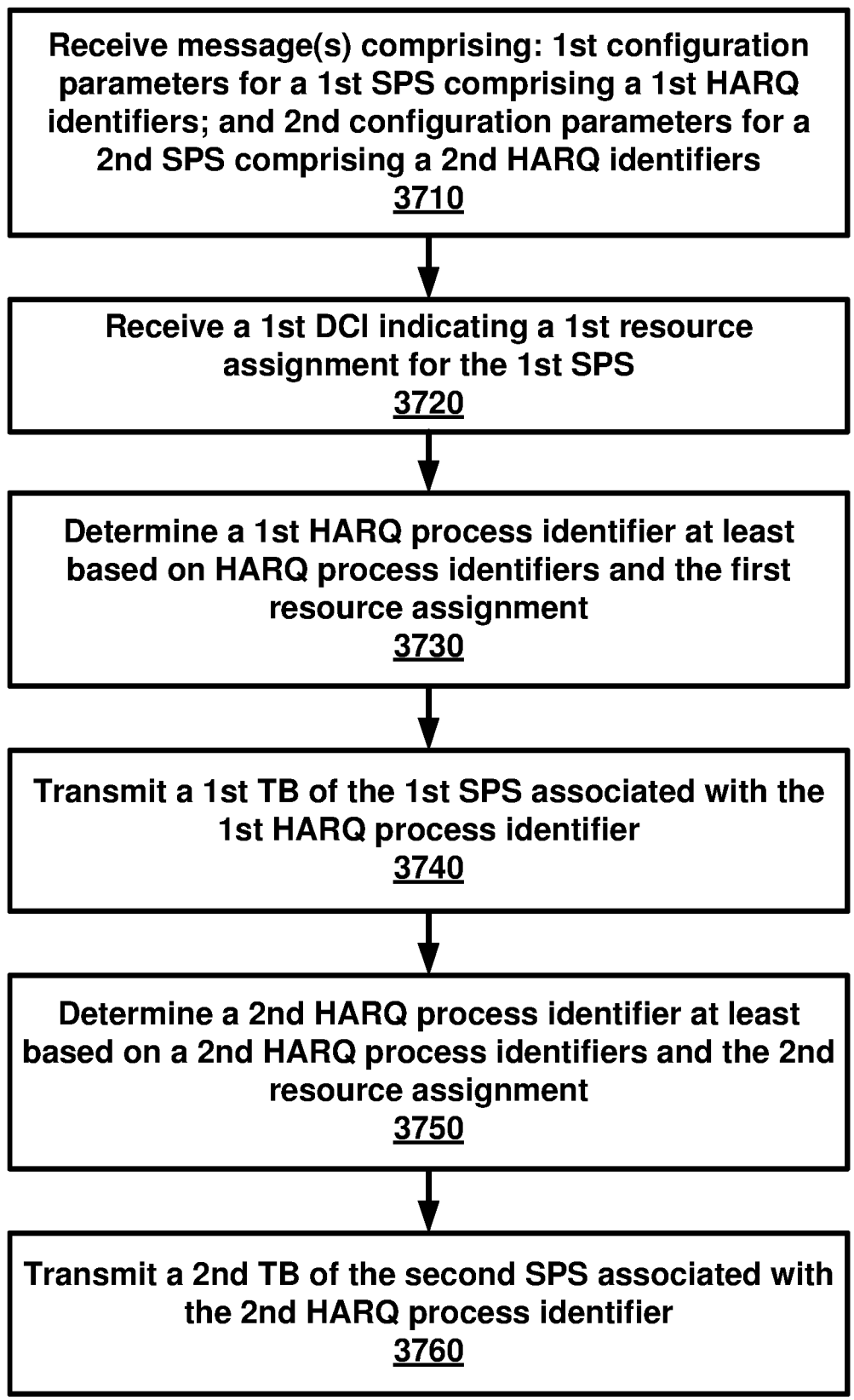
FIG. 37 is an example flow diagram as per an aspect of an embodiment of the present disclosure.

FIG. 37 is an example flow diagram as per an aspect of an embodiment of the present disclosure. At 3710, a wireless device may receive at least one message. The at least one message may comprise: first configuration parameters for a first semi-persistent scheduling (SPS) comprising a first plurality of hybrid automatic repeat request (HARQ) identifiers, and second configuration parameters for a second SPS comprising a second plurality of HARQ identifiers. A first downlink control information (DCI) comprising first resource assignment for the first SPS may be received at 3720. At 3730, a first HARQ process identifier may be determined at least based on the first plurality of HARQ process identifiers and the first resource assignment. A first transport block (TB) of the first SPS associated with the first HARQ process identifier may be transmitted at 3740. At 3750, a second HARQ process identifier may be determined at least based on the second plurality of HARQ process identifiers and the second resource assignment. A second TB of the second SPS associated with the second HARQ process identifier may be transmitted at 3760.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages. In an example, an IE may be a sequence of first parameters (first IEs). The sequence may comprise one or more first parameters. For example, a sequence may have a length max_length (e.g. 1, 2, 3, etc). A first parameter in the sequence may be identified by the parameter index in the sequence. The sequence may be ordered.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
receiving, by a wireless device, at least one radio resource control message comprising uplink periodic resource allocation configuration parameters indicating a hybrid automatic repeat request (HARQ) process identifier offset;
determining a HARQ process identifier for a current transmission time interval based on the HARQ process identifier offset; and
transmitting a transport block associated with a HARQ process identified by the HARQ process identifier.

2. The method of claim 1, wherein the determining further comprises determining the HARQ process identifier for the current transmission time interval as a sum of the HARQ process identifier offset and a result of an initial value modulo a number of uplink HARQ processes.

3. The method of claim 2, wherein the initial value is equal to the floor of the current transmission time interval divided by an uplink interval.

4. The method of claim 1, wherein the uplink periodic resource allocation configuration parameters further indicate the number of uplink HARQ processes and the uplink interval.

5. A wireless device, comprising:
one or more processors; and
memory storing instructions that, when executed by the one or more processors, cause the wireless device to:
receive at least one radio resource control message comprising uplink periodic resource allocation configuration parameters indicating a hybrid automatic repeat request (HARQ) process identifier offset;
determine a HARQ process identifier for a current transmission time interval based on the HARQ process identifier offset; and
transmit a transport block associated with a HARQ process identified by the HARQ process identifier.

6. The wireless device of claim 5, wherein the instructions, when executed by the one or more processors, further cause the wireless device to determine the HARQ process identifier for the current transmission time interval as a sum of the HARQ process identifier offset and a result of an initial value modulo a number of uplink HARQ processes.

7. The wireless device of claim 6, wherein the initial value is equal to the floor of the current transmission time interval divided by an uplink interval.

8. The wireless device of claim 5, wherein the uplink periodic resource allocation configuration parameters further indicate the number of uplink HARQ processes and the uplink interval.

9. A method comprising:
  transmitting, by a base station, at least one radio resource control message comprising uplink periodic resource allocation configuration parameters indicating a hybrid automatic repeat request (HARQ) process identifier offset;
  determining a HARQ process identifier for a current transmission time interval based on the HARQ process identifier offset; and
  receiving a transport block associated with a HARQ process identified by the HARQ process identifier.

10. The method of claim 9, wherein the determining further comprises determining the HARQ process identifier for the current transmission time interval as a sum of the HARQ process identifier offset and a result of an initial value modulo a number of uplink HARQ processes.

11. The method of claim 10, wherein the initial value is equal to the floor of the current transmission time interval divided by an uplink interval.

12. The method of claim 9, wherein the uplink periodic resource allocation configuration parameters further indicate the number of uplink HARQ processes and the uplink interval.

13. A base station, comprising:
  one or more processors; and
  memory storing instructions that, when executed by the one or more processors, cause the base station to perform the actions of the method of claim 9.

* * * * *